(12) United States Patent
Morinaga

(10) Patent No.: US 10,003,747 B2
(45) Date of Patent: Jun. 19, 2018

(54) IMAGING APPARATUS

(71) Applicant: HOYA CORPORATION, Tokyo (JP)

(72) Inventor: Takahiro Morinaga, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 107 days.

(21) Appl. No.: 15/298,668

(22) Filed: Oct. 20, 2016

(65) Prior Publication Data

US 2017/0118411 A1  Apr. 27, 2017

(30) Foreign Application Priority Data

Oct. 26, 2015 (JP) .................................. 2015-210066

(51) Int. Cl.
| | | |
|---|---|---|
| H04N 5/225 | (2006.01) | |
| G06F 3/041 | (2006.01) | |
| H04N 5/232 | (2006.01) | |
| G02B 27/64 | (2006.01) | |

(52) U.S. Cl.
CPC ....... *H04N 5/23287* (2013.01); *G02B 27/646* (2013.01); *H04N 5/2251* (2013.01); *H04N 5/2254* (2013.01)

(58) Field of Classification Search
CPC .... G06F 3/0416; G06F 1/1643; G06F 3/0412; G06F 1/1694; G06F 3/04886; H04N 5/23216; H04N 5/2258
USPC .................................................... 348/208.11
See application file for complete search history.

(56) References Cited

U.S. PATENT DOCUMENTS

| | | | |
|---|---|---|---|
| 8,023,812 B2 | 9/2011 | Suzuka | |
| 9,335,560 B2 | 5/2016 | Nomura et al. | |
| 9,338,357 B2 | 5/2016 | Nomura et al. | |
| 2007/0041721 A1* | 2/2007 | Ito ...................... | H04N 5/23287 396/55 |
| 2007/0127907 A1* | 6/2007 | Iwasaki ................ | G02B 27/646 396/144 |
| 2008/0291540 A1* | 11/2008 | Nakamura ........... | G02B 27/648 359/554 |

(Continued)

FOREIGN PATENT DOCUMENTS

| | | |
|---|---|---|
| JP | 2008-070770 A | 3/2008 |
| JP | 2012-177755 A | 9/2012 |

(Continued)

*Primary Examiner* — Tuan Ho
*Assistant Examiner* — Chan Nguyen
(74) *Attorney, Agent, or Firm* — Greenblum & Bernstein, P.L.C.

(57) ABSTRACT

An imaging apparatus includes a movable member supporting an imaging device; a stationary member supporting the movable member to allow the movable member to spherically swing about a point on an optical axis of the imaging device; first and second actuators which apply two driving forces to the movable member in different tilting directions to vary an inclination of the optical axis; and a third actuator which applies a driving force to the movable member in a rotational direction about the optical axis. The first, second and third actuators are provided as three separate actuators installed at intervals in a circumferential direction about the optical axis, in an initial state of the movable member in the spherical-swinging operation relative to the stationary member. Part of each of the first, second and third actuators lies on a cylindrical surface centered on the optical axis in the initial state.

22 Claims, 36 Drawing Sheets

(56) References Cited

U.S. PATENT DOCUMENTS

| | | | |
|---|---|---|---|
| 2010/0067889 A1* | 3/2010 | Suzuki | G02B 27/646 |
| | | | 396/55 |
| 2010/0202766 A1 | 8/2010 | Takizawa et al. | |
| 2011/0013029 A1* | 1/2011 | Akutsu | G03B 5/00 |
| | | | 348/208.11 |
| 2013/0321919 A1 | 12/2013 | Nakayama | |
| 2015/0215541 A1 | 7/2015 | Nomura et al. | |

FOREIGN PATENT DOCUMENTS

| | | |
|---|---|---|
| JP | 5096496 B2 | 12/2012 |
| JP | 2013-246414 A | 12/2013 |

* cited by examiner

IMAGING APPARATUS

BACKGROUND OF THE INVENTION

1. Field of the Invention

The present invention relates to an imaging apparatus equipped with an anti-shake (image shake correction/image stabilizing/shake reduction) system.

2. Description of the Related Art

Imaging apparatuses of recent years usually incorporate an anti-shake (image shake correction/image stabilizing/ shake reduction) system for reduction of image shake caused by vibrations such as hand shake. Typical anti-shake systems detect vibrations applied to the imaging apparatus and/or variations in the orientation thereof, and shift an anti-shake optical element such as at least part (e.g., a lens group) of an imaging optical system or an image sensor relative to the optical axis (i.e., move the anti-shake optical element in a plane orthogonal to the optical axis) or tilt the anti-shake optical element relative to the optical axis so as to cancel out the effect of the vibrations and the orientation variations.

Voice coil motors or the like which are superior in responsiveness are used as actuators (anti-shake drive actuators) in an anti-shake driving operation of the anti-shake optical element. Voice coil motors for use in an anti-shake driving operation in imaging apparatuses include: a magnet(s) which is mounted to one of a movable member and a stationary member that movably supports the movable member; and a coil(s) which is mounted to the other of the movable member and the stationary member to be positioned within the magnetic field of the magnet. The movable member holds the anti-shake optical element that moves during an anti-shake (image-stabilizing) operation, and the movable member is driven to reduce image shake by electromagnetic force generated by the passage of electric current through the coil.

The anti-shake drive actuators need to be installed at positions that do not interrupt the optical path of the imaging optical system; in order to satisfy this requirement, a structure in which the anti-shake drive actuators are disposed outside the optical path in different radial directions from an optical axis of the imaging optical system (disclosed in Japanese Unexamined Patent Publication No. 2012-177755 (Patent Literature 1), Japanese Patent Publication No. 5,096, 496 (Patent Literature 2) and Japanese Unexamined Patent Publication No. 2008-70770 (Patent Literature 3)) and a structure in which the anti-shake drive actuators are disposed on an extension of the optical path (disclosed in Japanese Unexamined Patent Publication No. 2013-246414 (Patent Literature 4)) have been proposed.

In recent years, due to increased diversification of the use of imaging apparatuses, it has been required to improve improve the operation specifications (driving amount, driving speed and flexibility in driving direction) of the anti-shake optical element. For instance, the anti-shake optical element is shifted (moved) in a plane orthogonal to an optical axis in the anti-shake system disclosed in Patent Literature 1, whereas the anti-shake optical element is made to perform a rolling operation in which the anti-shake optical element is driven to roll (rotate about the optical axis thereof) in Patent Literature 3. Furthermore, in Patent Literatures 2 and 4, movement of the anti-shake optical element is complicated; namely, a triaxial drive type anti-shake system which makes the anti-shake optical element perform the aforementioned rolling operation in addition to a tilting operation in which the anti-shake optical element is driven to produce motion including components in the pitching and yawing directions has been proposed. In this triaxial drive type anti-shake system, it is difficult to achieve a compact and powerful actuator(s) or an actuator(s) which has superior weight balance and a small load during operation.

In the case where a voice coil motor is used as an anti-shake drive actuator, if the gap (distance) between each magnet and the associated coil varies greatly during anti-shake driving operation, it is difficult to obtain a stable thrust force, which makes the anti-shake driving operation difficult to control. In addition, if the gap between each magnetic sensor which detects the state of anti-shake driving operation (variations of the magnetic field) and the associated magnet varies greatly, a great influence is exerted on the sensitivity of the magnetic sensor. As a result, it may be required to use powerful and large-size magnet(s) and coil(s), and/or the degree of difficulty in control of the anti-shake driving operation may increase. Accordingly, in the case where the anti-shake drive actuator(s) of an anti-shake system is a voice coil motor(s), there has conventionally been the challenging task of reducing such gap variations as much as possible.

SUMMARY OF THE INVENTION

The present invention has been devised in view of the above described problems and provides an imaging apparatus that is capable of making an anti-shake optical element perform a tilting operation and a rolling operation with the use of compact actuators (anti-shake drive actuators) which are superior in driving performance.

According to an aspect of the present invention, an imaging apparatus is provided, including a movable member configured to support at least a part of an imaging device, for obtaining object images; a stationary member configured to support the movable member in a manner to allow the movable member to spherically swing about a predetermined point on an optical axis of an optical system of the imaging device; a first actuator and a second actuator which apply two driving forces to the movable member in different tilting directions to vary an inclination of the optical axis; and a third actuator which applies a driving force to the movable member in a rotational direction about the optical axis. The first actuator, the second actuator and the third actuator are provided as three separate actuators installed at intervals in a circumferential direction about the optical axis, in an initial state in which the movable member is positioned at an initial position in the spherical-swinging operation with respect to the stationary member. Part of each of the first actuator, the second actuator and the third actuator lies on a cylindrical surface centered on the optical axis in the initial state.

In the initial state, it is desirable for a center of the third actuator in the circumferential direction to be positioned within an angular range of 60 through 180 degrees about the optical axis with respect to each center of the first actuator and the second actuator in the circumferential direction.

More desirably, arranging the centers of the first actuator, the second actuator and the third actuator at equi-angular intervals (i.e., at intervals of 120 degrees) in the circumferential direction is highly advantageous in terms of weight balance and space efficiency.

The present invention is suitably applicable to a type of imaging apparatus using voice coil motors as actuators.

It is desirable for the first actuator to include a first magnet and a first coil which are aligned and face each other in a first radial direction from the optical axis in the initial state. The second actuator includes a second magnet and a second coil which are aligned and face each other in a second radial direction from the optical axis in the initial state. The third actuator includes a third magnet and a third coil which are aligned and face each other in a third radial direction from the optical axis in the initial state. The first magnet, the second magnet and the third magnet are supported by one of the movable member and the stationary member. The first coil, the second coil and the third coil are supported by the other of the movable member and the stationary member. The first, second and third actuators are provided in at least one of the following arrangements (1) and (2):

(1) each of the first, second and third magnets being formed into a circular-arc shape which is centered on the optical axis in the initial state, and (2) each of the first, second and third coils being formed into a circular-arc shape which is centered on the optical axis in the initial state.

More specifically, it is desirable for the first magnet, the second magnet and the third magnet to include respective coil-facing surfaces which face the first coil, the second coil and the third coil in the first radial direction, the second radial direction and the third radial direction, respectively. The coil-facing surfaces of the first magnet, the second magnet and the third magnet are portions of a first cylindrical surface, centered on the optical axis in the initial state. The first coil, the second coil and the third coil include respective magnet-facing surfaces which face the first magnet, the second magnet and the third magnet in the first radial direction, the second radial direction and the third radial direction, respectively. The magnet-facing surfaces of the first coil, the second coil and the third coil are portions of a second cylindrical surface, centered on the optical axis in the initial state and different in radius from the first cylindrical surface.

This makes it possible to reduce fluctuations in the gap between each magnet and the associated coil when the movable member spherically swings relative to the stationary member.

It is desirable for the first magnet, the second magnet and the third magnet to include respective non-facing surfaces which are positioned on an opposite side of the first magnet, the second magnet and the third magnet from the three coil-facing surfaces in the first radial direction, the second radial direction and the third radial direction, respectively. The non-facing surfaces of the first magnet, the second magnet and the third magnet are portions of a third cylindrical surface, are centered on the optical axis in the initial state and different in radius from each of the first cylindrical surface and the second cylindrical surface.

In this case, it is desirable for the imaging apparatus to include a first yoke, a second yoke and a third yoke which are mounted to the first magnet, the second magnet and the third magnet, respectively. The first yoke includes a support portion which supports the non-facing surface of the first magnet, and a projecting portion which projects from the support portion of the first yoke in a direction to approach the magnet-facing surface of the first coil. The second yoke includes a support portion which supports the non-facing surface of the second magnet, and a projecting portion which projects from the support portion of the second yoke in a direction to approach the magnet-facing surface of the second coil. The third yoke includes a support portion which supports the non-facing surface of the third magnet, and a projecting portion which projects from the support portion of the third yoke in a direction to approach the magnet-facing surface of the third coil. The support portions of the first yoke, the second yoke and the third yoke are curved and lie on a fourth cylindrical surface which is centered on the optical axis in the initial state.

This makes it possible to arrange each yoke in the radial direction with space efficiency in addition to each magnet.

It is desirable for the projecting portion of the first yoke to include two projecting portions which project from respective opposite ends of the support portion of the first yoke, with respect to the circumferential direction, and hold the first magnet therebetween. The projecting portion of the second yoke includes two projecting portions which project from opposite ends of the support portion of the second yoke, with respect the circumferential direction, and hold the second magnet therebetween. The projecting portion of the third yoke includes two projecting portions which project from opposite ends of the support portion of the third yoke, with respect to the circumferential direction, and hold the third magnet therebetween.

It is desirable for the first coil, the second coil and the third coil to include respective non-facing surfaces which are positioned on an opposite side of the first coil, the second coil and the third coil from the three magnet-facing surfaces in the first radial direction, the second radial direction and the third radial direction, respectively. The non-facing surfaces of the first coil, the second coil and the third coil are portions of a fifth cylindrical surface which is centered on the optical axis in the initial state and different in radius from each of the first cylindrical surface and the second cylindrical surface.

It is desirable for the first magnet to be shaped so that a long-side direction and a short-side direction thereof substantially align with the circumferential direction and the optical axis direction, respectively. The second magnet is shaped so that a long-side direction and a short-side direction thereof substantially align with the circumferential direction and the optical axis direction, respectively.

Each of the first magnet, the second magnet and the third magnet can be made of a single magnet or a combination of two or more magnets. As a constructive example, one of the movable member and the stationary member can include a first sandwiched portion, a second sandwiched portion and a third sandwiched portion. The first magnet includes two separate magnets which are parallel-positioned side by side in the optical axis direction with the first sandwiched portion sandwiched therebetween, magnetic poles of the first magnet oriented radially along the first radial direction. The second magnet includes two separate magnets which are parallel-positioned side by side in the optical axis direction with the second sandwiched portion sandwiched therebetween, magnetic poles of the second magnet oriented radially along the second radial direction. The third magnet includes two separate magnets which are parallel-positioned side by side in the circumferential direction with the third sandwiched portion sandwiched therebetween, magnetic poles of the third magnet oriented radially along the third radial direction.

In this constructive example, it is desirable for the first magnet with the first sandwiched portion sandwiched between the two separate magnets of the first magnet, the second magnet with the second sandwiched portion sandwiched between the two separate magnets of the second magnet, and the third magnet with the third sandwiched portion sandwiched between the two separate magnets of the third magnet, to be substantially identical in size in the circumferential direction and the optical axis direction.

This improves the weight balance between the three actuators satisfactory and also space efficiency.

It is desirable for the first sandwiched portion to be flat, elongated in the circumferential direction, and sandwiched between the two separate magnets of the first magnet with respect to the optical axis direction; the second sandwiched portion to be flat, elongated in the circumferential direction, and sandwiched between the two separate magnets of the second magnet with respect to the optical axis direction; and for the third sandwiched portion to be flat, elongated in the optical axis direction, and sandwiched between the two separate magnets of the third magnet with respect to the circumferential direction.

It is desirable for the two separate magnets, of each of the first, second and third magnets, to be arranged so that the north and south poles of one of the two separate magnets are oriented in opposite radial directions relative to the north and south poles of the other of the two separate magnets.

Each of the first coil and the second coil includes an air-core coil including a pair of long-side portions which are substantially parallel to each other, and a pair of short-side portions which connect the pair of long-side portions. The pair of long-side portions of the first coil and the pair of long-side portions of the second coil are elongated in the circumferential direction. Accordingly, it is possible for each actuator to efficiently produce driving force (thrust).

It is desirable for the imaging apparatus to include a first magnetic sensor, a second magnetic sensor and a third magnetic sensor configured to detect variations of magnetic fields of the first magnet, the second magnet and the third magnet, respectively, and are supported by the other of the movable member and the stationary member, which supports the first coil, the second coil and the third coil. The first magnetic sensor, the second magnetic sensor and the third magnetic sensor lie on a cylindrical surface which is centered on the optical axis in the initial state.

This makes it possible to reduce fluctuations of the gap between each magnet and the associated magnetic sensor when each actuator is driven.

Each of the first coil, the second coil and the third coil includes an air-core coil including a pair of circumferentially-extending portions which extend in the circumferential direction; a pair of axially-extending portions which extend in the optical axis direction and connect the pair of circumferentially-extending portions; and a hollow portion which is surrounded by the pair of circumferentially-extending portions and the pair of axially-extending portions. The imaging apparatus further includes a first magnetic sensor, a second magnetic sensor and a third magnetic sensor configured to detect variations of magnetic fields of the first magnet, the second magnet and the third magnet, respectively, and are supported by the other of the movable member and the stationary member, which supports the first coil, the second coil and the third coil. The first magnetic sensor, the second magnetic sensor and the third magnetic sensor are arranged inside the hollow portion of the first coil, the hollow portion of the second coil and the hollow portion of the third coil, respectively, and lie on a cylindrical surface which is centered on the optical axis in the initial state. Accordingly, space efficiency is improved and is also advantageous in regard to the sensor detection sensitivity of each magnetic sensor.

It is desirable for the pair of circumferentially-extending portions of the first coil to be greater in length than the pair of axially-extending portions of the first coil, and it is desirable for the pair of circumferentially-extending portions of the second coil to be greater in length than the pair of axially-extending portions of the second coil.

It is desirable for the first magnet, the second magnet and the third magnet to be supported by the movable member. The first coil, the second coil and the third coil are supported by the stationary member. The first magnet, the second magnet and the third magnet are positioned closer to the optical axis than the first coil, the second coil and the third coil in the first radial direction, the second radial direction and the third radial direction, respectively.

It is desirable for the imaging apparatus to include supporters which support the movable member in a manner to allow the movable member to spherically swing about the predetermined point. The supporters are arranged in three circumferential spaces which are formed between the first actuator, the second actuator and the third actuator in the circumferential direction.

It is desirable for the imaging device to include an image sensor configured to receive light of an object image formed through the optical system. The movable member supports the entirety of the optical system and the image sensor.

According to another aspect of the present invention, an imaging apparatus is provided, including a movable member configured to support at least a part of an imaging device for obtaining object images; a stationary member configured to support the movable member in a manner to allow the movable member to spherically swing about a predetermined point on an optical axis of an optical system of the imaging device; a first actuator including a first magnet and a first coil which are aligned and face each other in a first radial direction from the optical axis in an initial state in which the movable member is positioned at an initial position of the spherical-swinging operation with respect to the stationary member, the first actuator configured to apply a driving force to the movable member in a first tilting direction to vary an inclination of the optical axis in the first tilting direction by a passage of electric current through the first coil; a second actuator including a second magnet and a second coil which are aligned and face each other in a second radial direction from the optical axis in the initial state, the second actuator configured to apply a driving force to the movable member in a second tilting direction to vary the inclination of the optical axis in the second tilting direction by a passage of electric current through the second coil; a third actuator including a third magnet and a third coil which are aligned and face each other in a third radial direction from the optical axis in the initial state, the third actuator configured to apply a driving force to the movable member in a rotational direction about the optical axis by a passage of electric current through the third coil. Part of each of the first magnet, the second magnet and the third magnet lies on a cylindrical surface centered on the optical axis in the initial state. The first magnet, the second magnet and the third magnet are supported by one of the movable member and the stationary member at intervals in the circumferential direction about the optical axis in the initial state. Part of each of the first coil, the second coil and the third coil lies on another cylindrical surface which is different in diameter from the cylindrical surface and centered on the optical axis in the initial state. The first coil, the second coil and the third coil are supported by the other of the movable member and the stationary member at intervals in the circumferential direction about the optical axis in the initial state.

It is desirable for inner peripheral surfaces of the first magnet, the second magnet and the third magnet that face radially inwards in the first radial direction, the second radial direction and the third radial direction, respectively, to define first curved surfaces centered on the optical axis in the initial state. The outer peripheral surfaces of the first magnet, the second magnet and the third magnet that face radially outwards in the first radial direction, the second radial direction and the third radial direction, respectively, define second curved surfaces centered on the optical axis in the initial state. The first curved surfaces and the second curved surfaces are concentrically arranged with respect to the optical axis in the initial state. Inner peripheral surfaces of the first coil, the second coil and the third coil that face radially inwards in the first radial direction, the second radial direction and the third radial direction, respectively, define third curved surfaces centered on the optical axis in the initial state. The outer peripheral surfaces of the first coil, the second coil and the third coil that face radially outwards in the first radial direction, the second radial direction and the third radial direction, respectively, define fourth curved surfaces centered on the optical axis in the initial state. The third curved surfaces and the fourth curved surfaces are concentrically arranged with respect to the optical axis in the initial state.

In an imaging apparatus according to the present invention, the space-saving and well-balanced arrangement of the three actuators, which make the anti-shake optical element (at least a part of the imaging device) perform the tilting operation, which tilts the optical axis of the optical system relative to the anti-shake optical element, and the rolling operation, which rolls the anti-shake optical element about the optical axis of the optical system, makes it possible to strike a balance between compactness of the actuators and the driving performance thereof. In particular, when each actuator is composed of a voice coil motor including a magnet and a coil, it is possible to achieve an ideal anti-shake system which has a large driving force while being small with respect to the radial direction from the optical axis by forming each of the magnet and coil of each actuator into a circular-arc shape, which is curved with its curvature center on the optical axis.

The present disclosure relates to subject matter contained in Japanese Patent Application No. 2015-210066 (filed on Oct. 26, 2015) which is expressly incorporated herein by reference in its entirety.

BRIEF DESCRIPTION OF THE DRAWINGS

The invention will be described below in detail with reference to the accompanying drawings, in which.

DESCRIPTION OF THE EMBODIMENT

Figure 1:
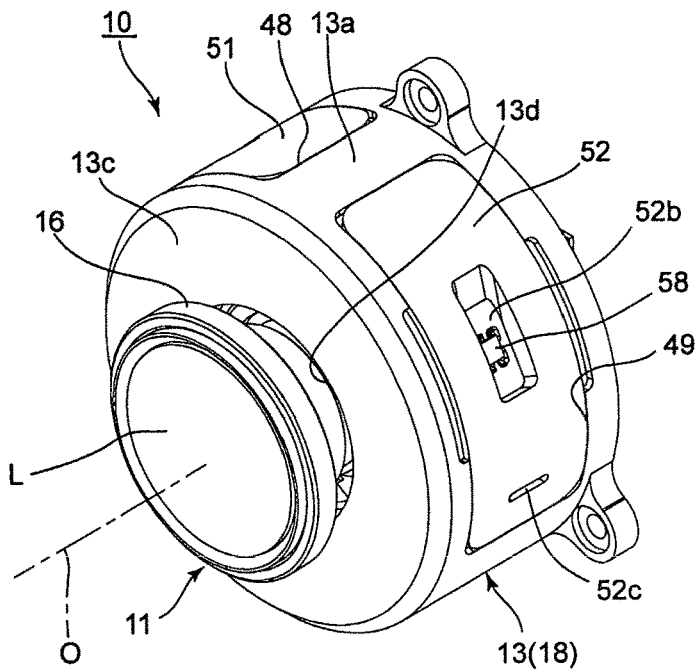
FIG. 1 is a front perspective view of an embodiment of an imaging apparatus according to the present invention, showing an outward appearance thereof.
Figure 2:
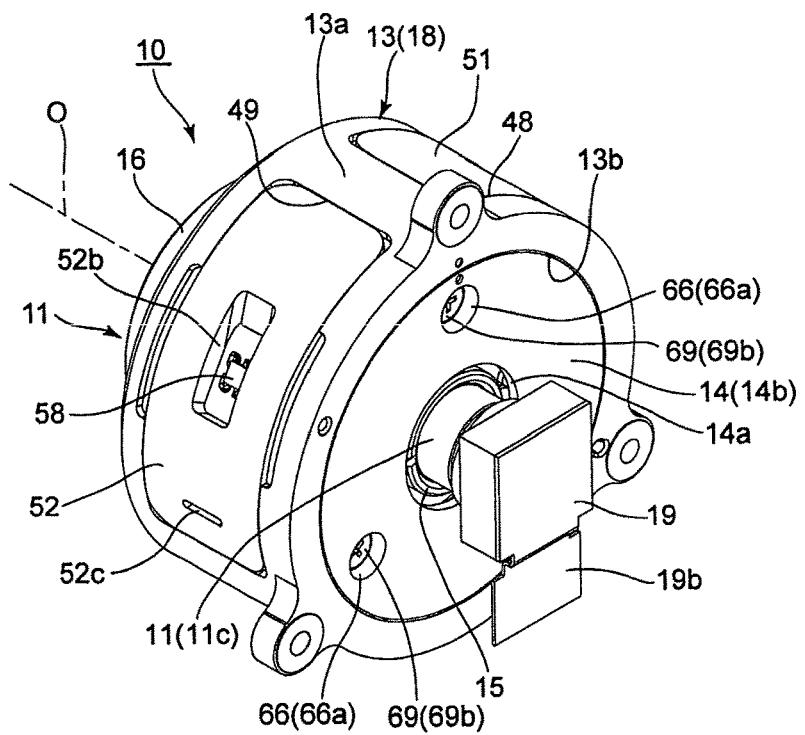
FIG. 2 is a rear perspective view of the imaging apparatus.
Figure 3:
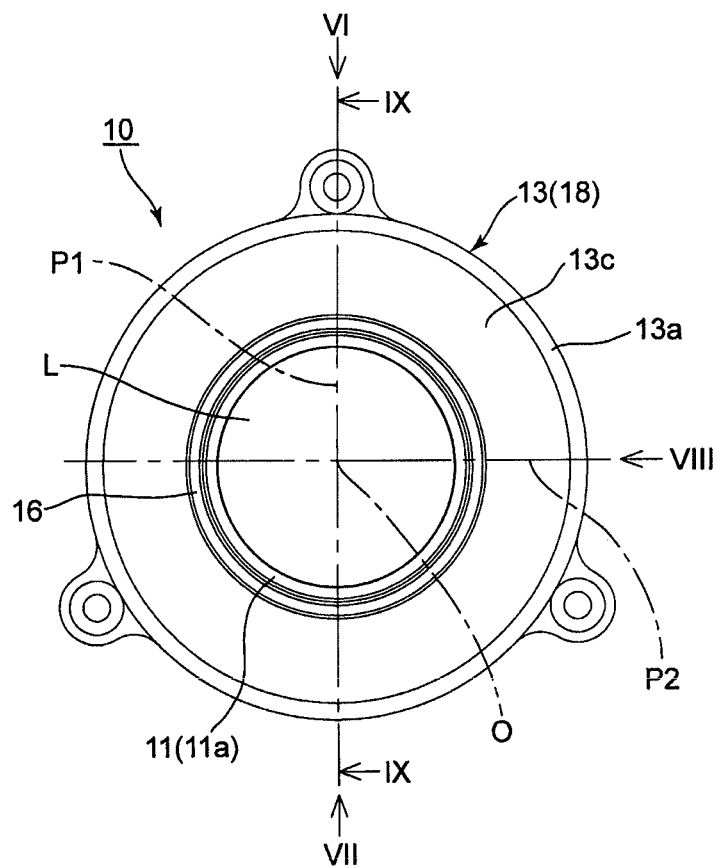
FIG. 3 is a front elevational view of the imaging apparatus.
Figure 4:
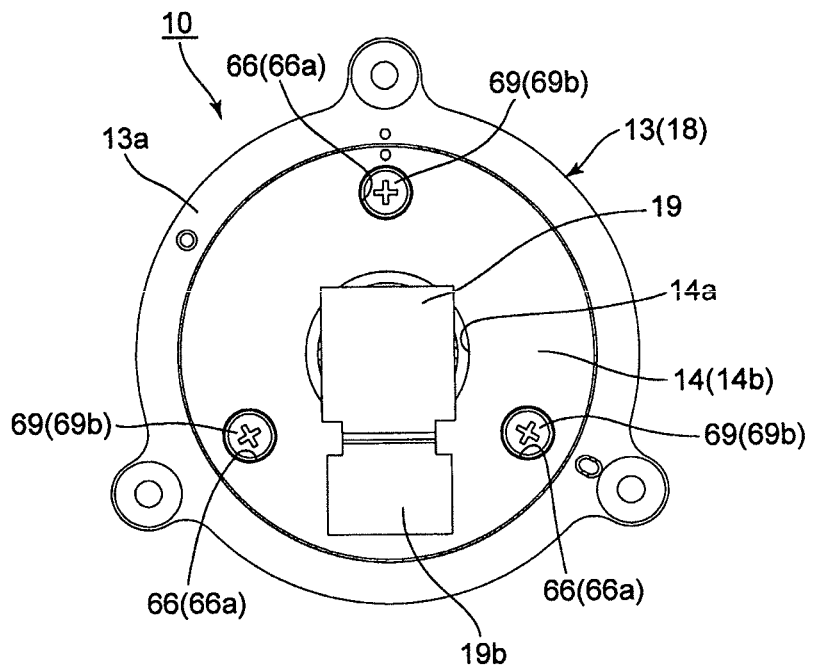
FIG. 4 is a rear elevational view of the imaging apparatus.

An embodiment of an imaging apparatus 10 according to the present invention will be discussed below with reference to the attached drawings. The imaging apparatus 10 is provided with an imaging optical system L and an image sensor unit 19 as components of an imaging device for obtaining object images. The letter "O" shown in the drawings designates the optical axis of an imaging optical system L provided in the imaging apparatus 10. In the following descriptions, the optical axis direction refers to a direction along, or parallel to, the optical axis O (a direction in which the optical axis O and an extension line thereof extend, or a direction in which a straight line parallel to the optical axis O extends), and the "front" refers to the object side and the "rear" refers to the image side with respect to the optical axis direction. In addition, the radial direction refers to the radial direction from the optical axis O (the direction in which a straight line normal to and intersecting the optical axis O extends), and the inward radial direction and the outward radial direction refer to the radial direction toward the optical axis O and the radial direction away from the optical axis O, respectively. Additionally, the circumferential direction refers to the circumferential direction about the optical axis O. The optical axis O refers to the optical axis O in the designed initial state of the imaging apparatus 10 (at an initial position in a spherical-swinging operation), in which the tilting operation of a movable unit 17 and a lens barrel 11 (which is fixedly supported by the movable unit 17) with respect to a stationary unit 18 is not performed (i.e., an anti-shake driving operation is not performed), unless otherwise noted. The lens barrel 11, the movable unit 17 and the stationary unit 18 are components of the imaging apparatus 10 and will be discussed in detail later.

Figure 9:
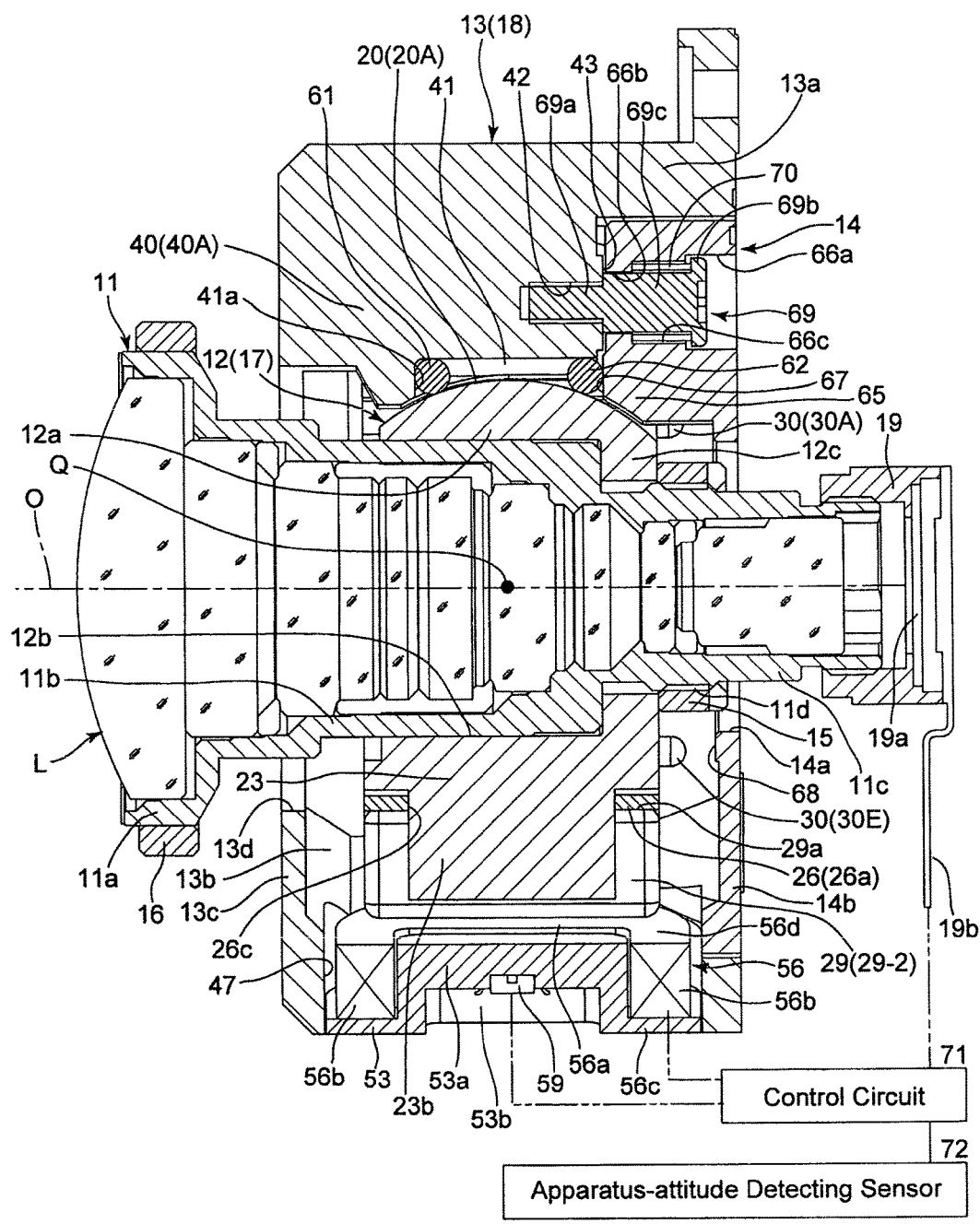
FIG. 9 is a sectional view taken along the line IX-IX shown in FIG. 3.
Figure 10:
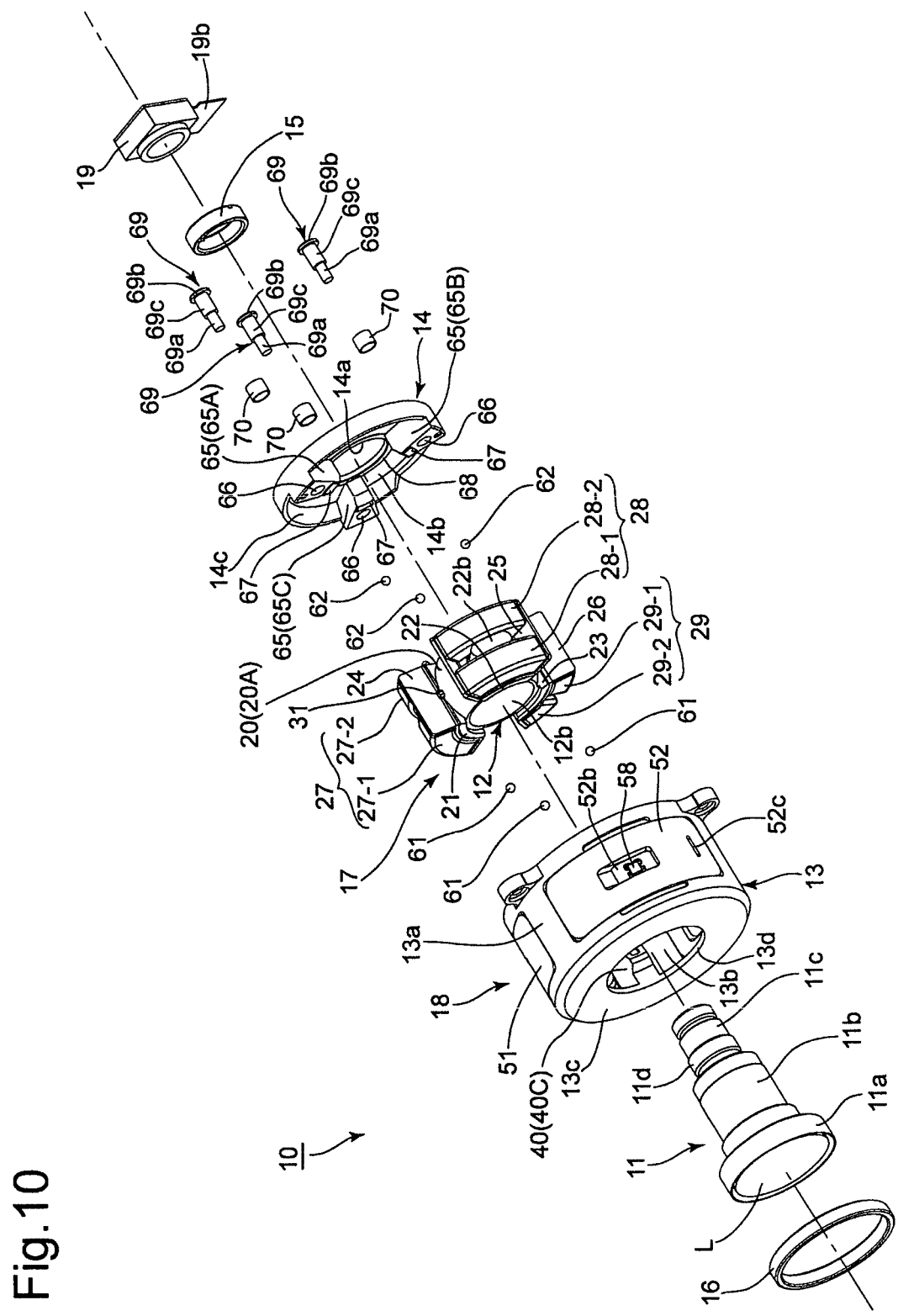
FIG. 10 is an exploded front perspective view of the imaging apparatus.
Figure 11:
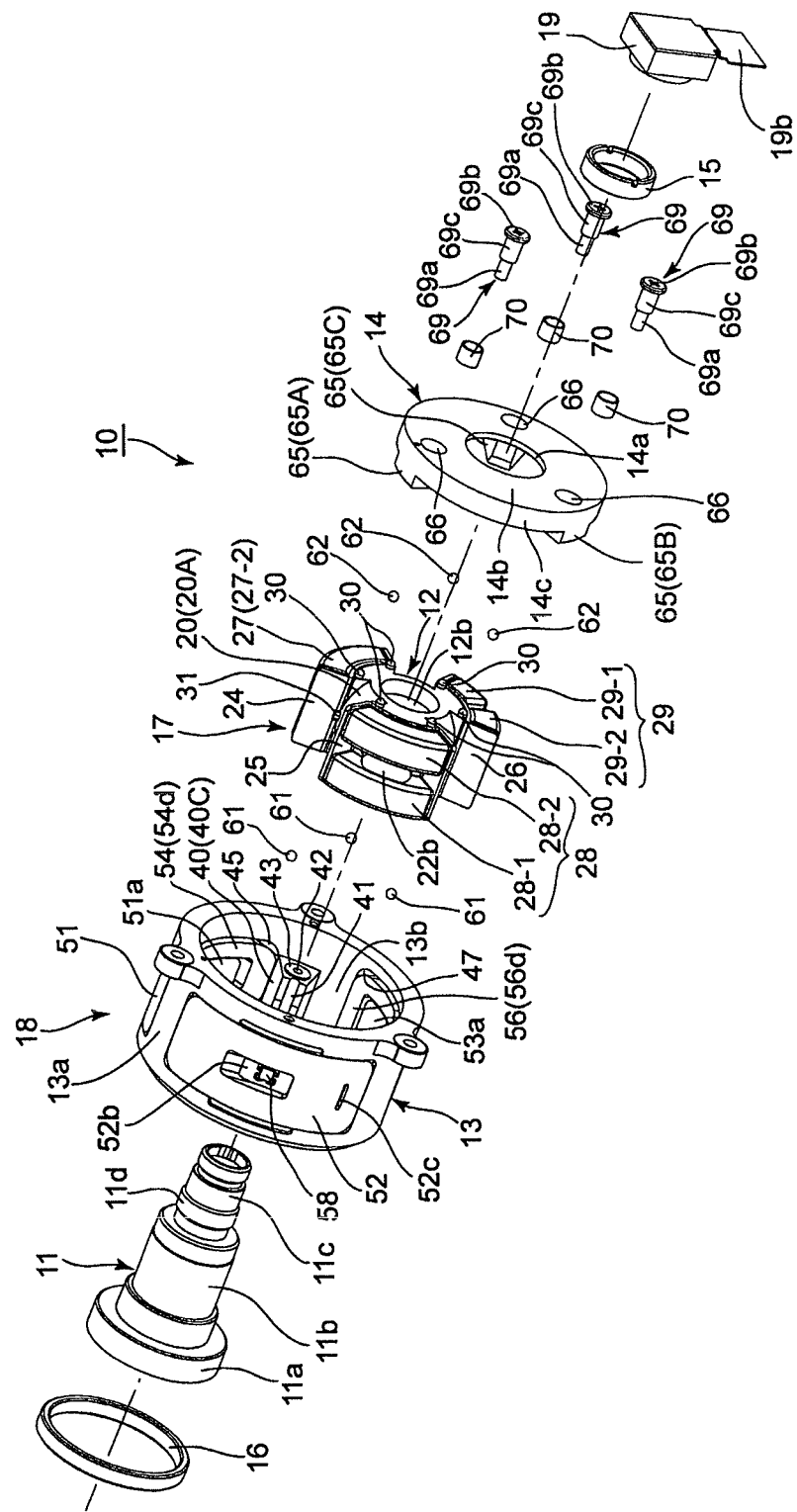
FIG. 11 is an exploded rear perspective view of the imaging apparatus.
Figure 12:
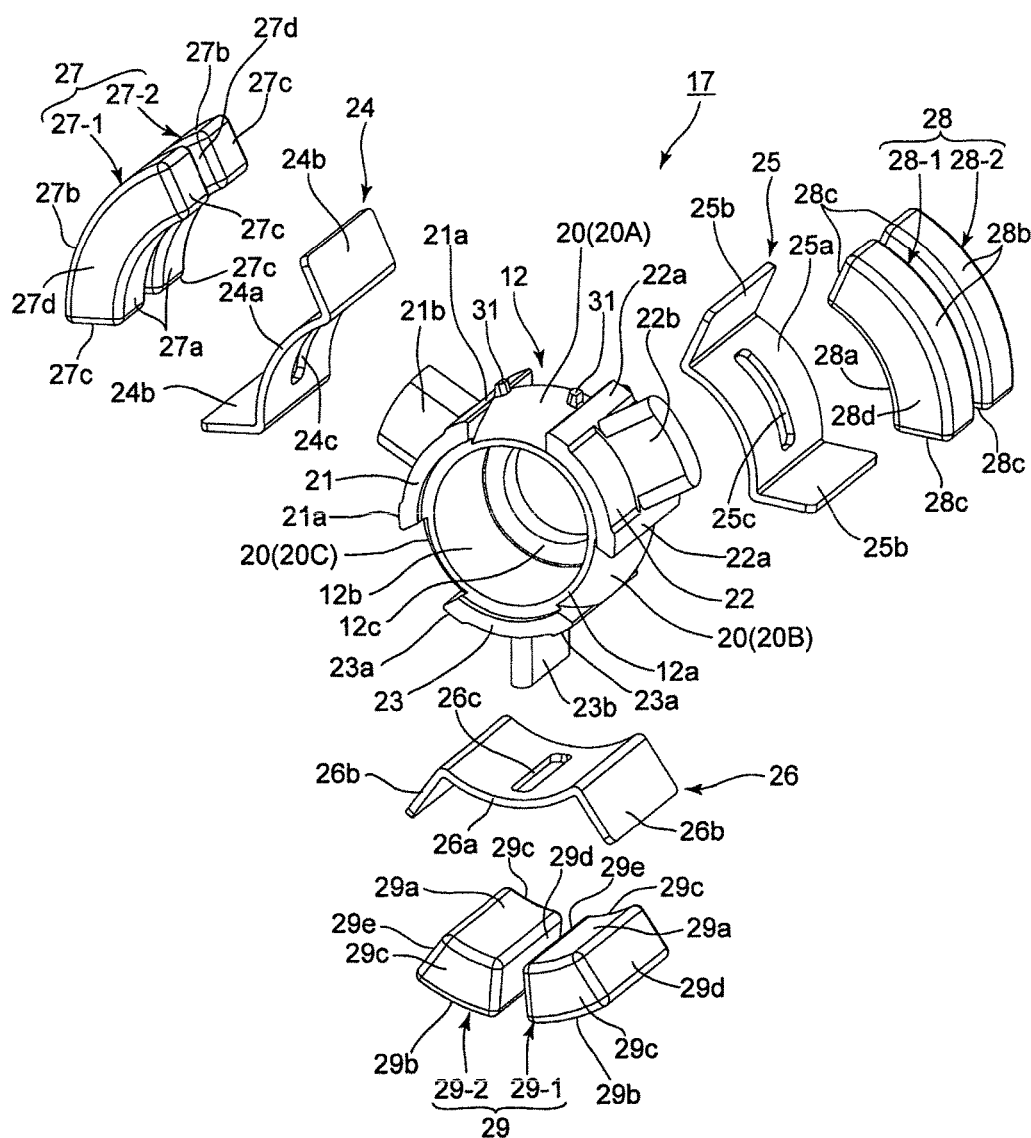
FIG. 12 is an exploded front perspective view of a movable unit shown mainly in FIGS. 9, 10 and 11.
Figure 13:
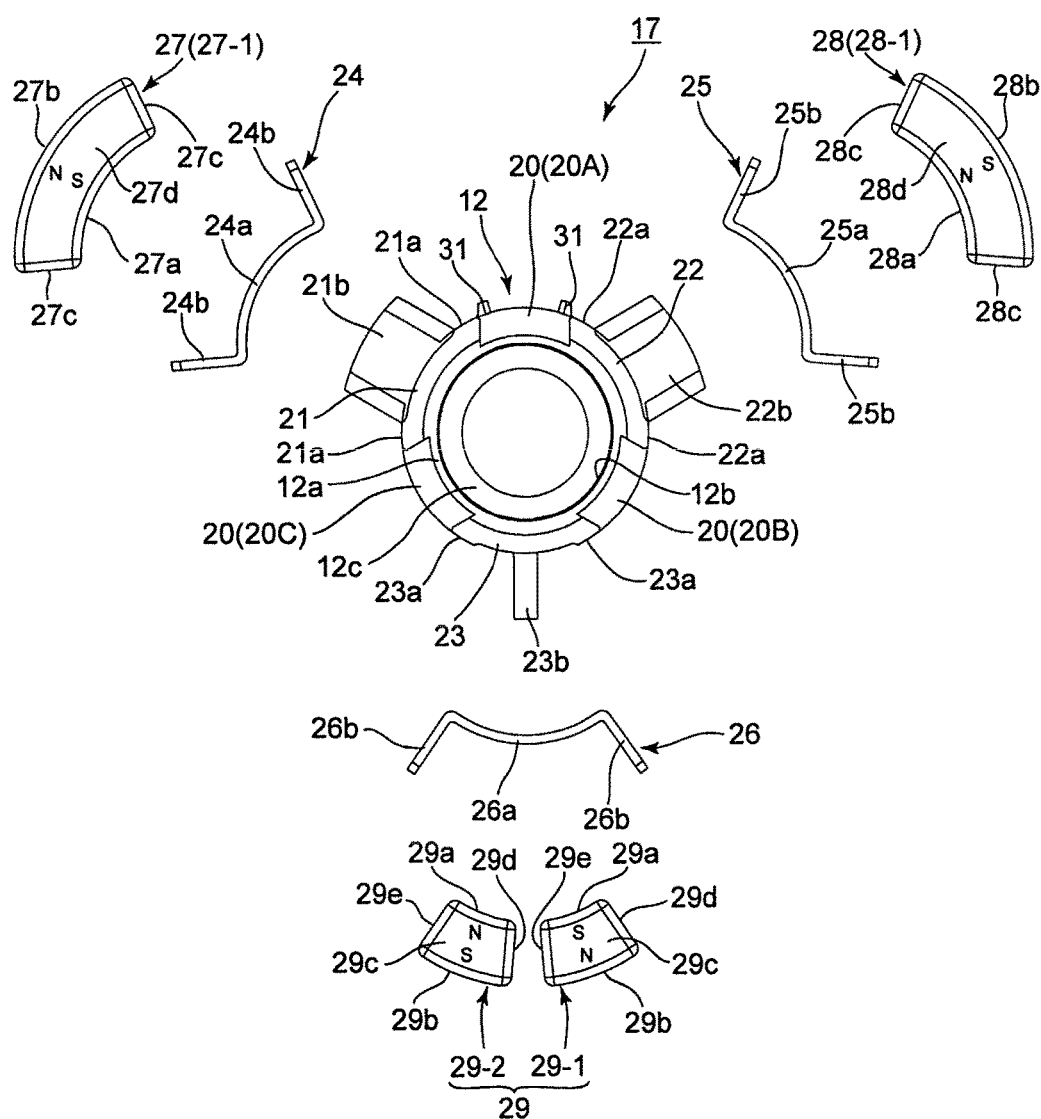
FIG. 13 is an exploded front elevational view of the movable unit.
Figure 14:
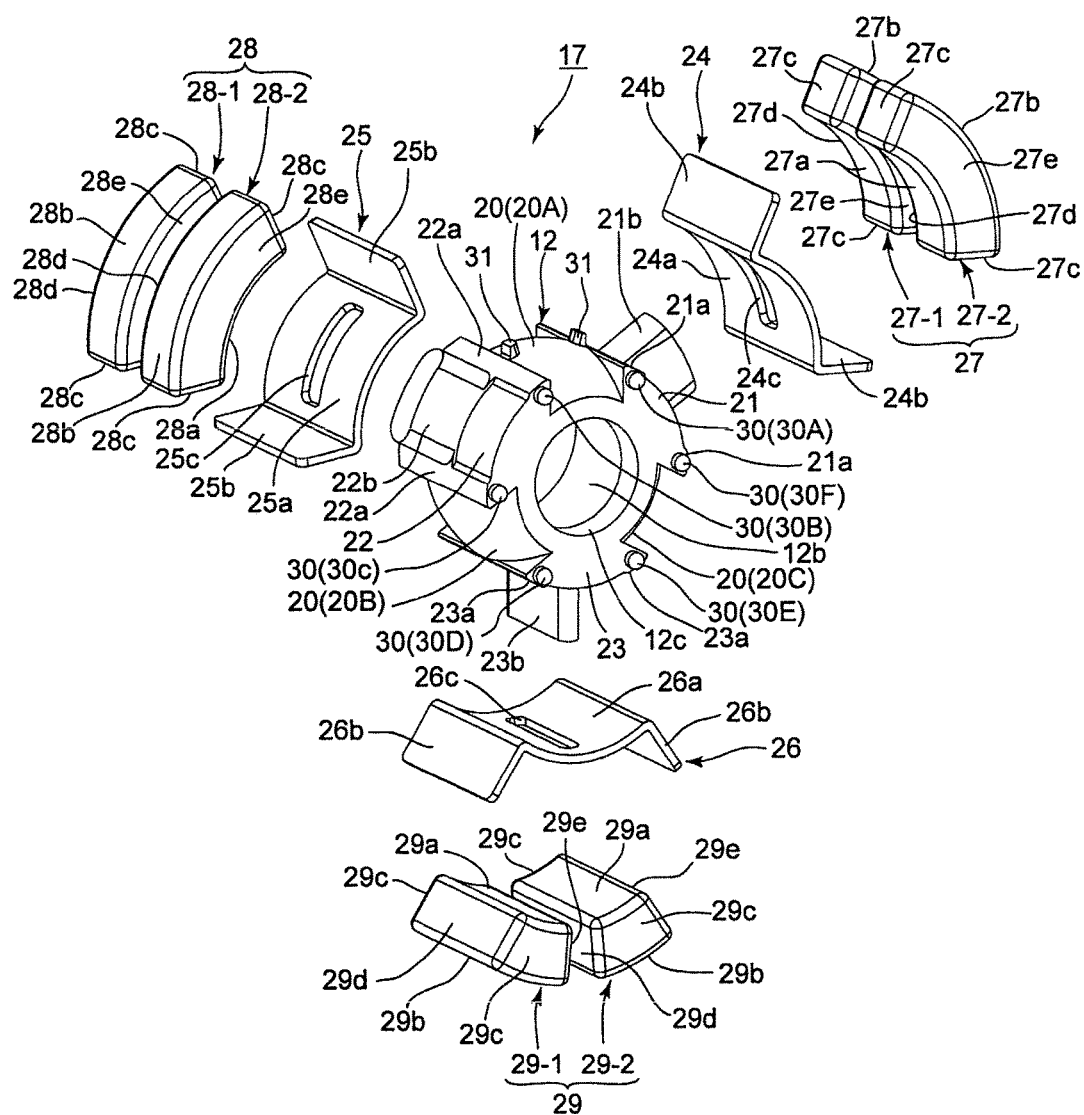
FIG. 14 is an exploded rear perspective view of the movable unit.

FIGS. 1 through 4 and 6 through 8 show the outward appearance of the imaging apparatus 10, viewed from different angles. As shown in FIGS. 9 through 11, the imaging apparatus 10 is provided with the aforementioned lens barrel (movable member) 11 and a barrel holder (movable member) 12, into which the lens barrel 11 is inserted and supported thereby, and has a basic structure in which a combined body of the lens barrel 11 and the barrel holder 12 is movably supported in a housing including a coil holder (stationary member) 13 and a ball holder 14.

As shown in FIGS. 9, 12 through 17, 22, 34 through 36, 40 and 41, the barrel holder 12 is provided with a cylindrical portion 12a which surrounds the optical axis O and an axial through-portion 12b which is formed as a through-hole extending through the cylindrical portion 12a in the optical axis direction. The barrel holder 12 is provided in the vicinity of the rear end of the axial through-portion 12b with an insertion restriction flange 12c, having an annular shape and projecting radially inwards so as to reduce the inner diameter (aperture size) of the axial through-portion 12b.

Figure 22:
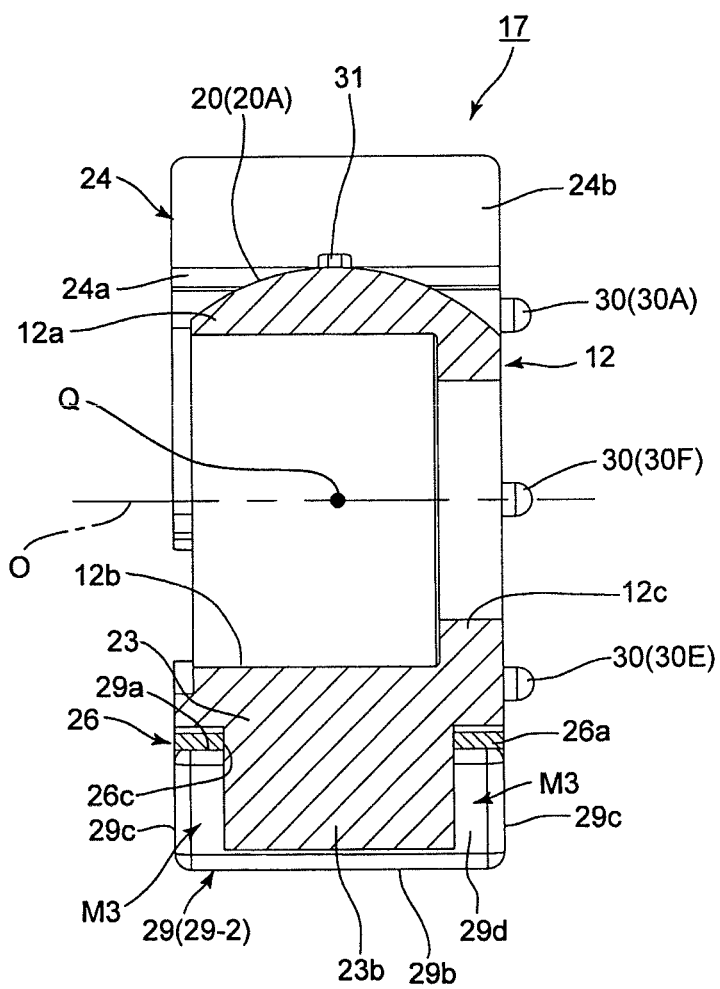
FIG. 22 is a sectional view taken along the line XXII-XXII shown in FIG. 16.
Figure 23:
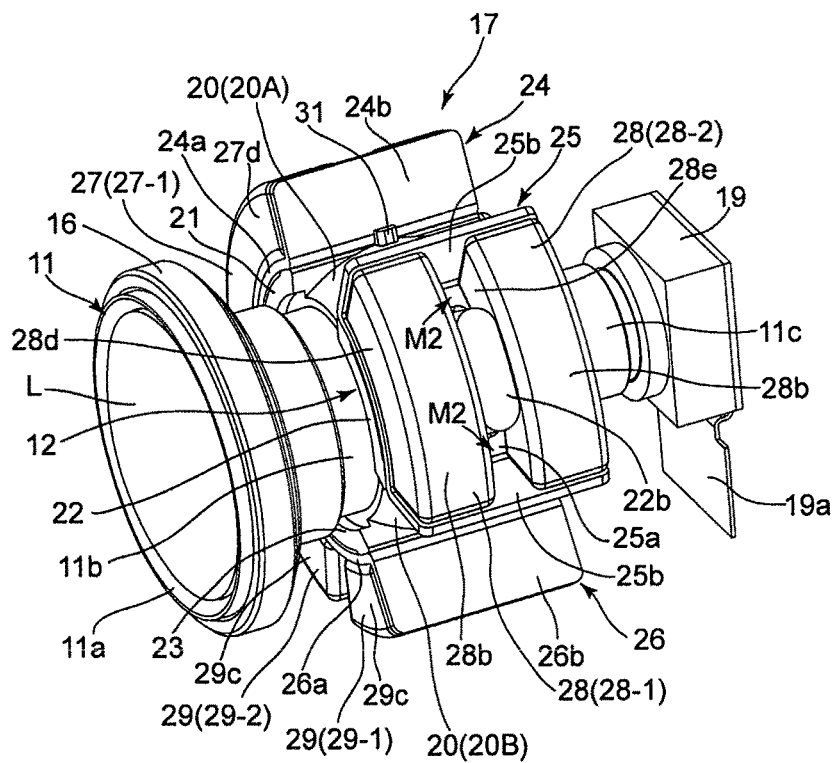
FIG. 23 is a front perspective view of a combination of the movable unit, a lens barrel and an image sensor unit.
Figure 24:
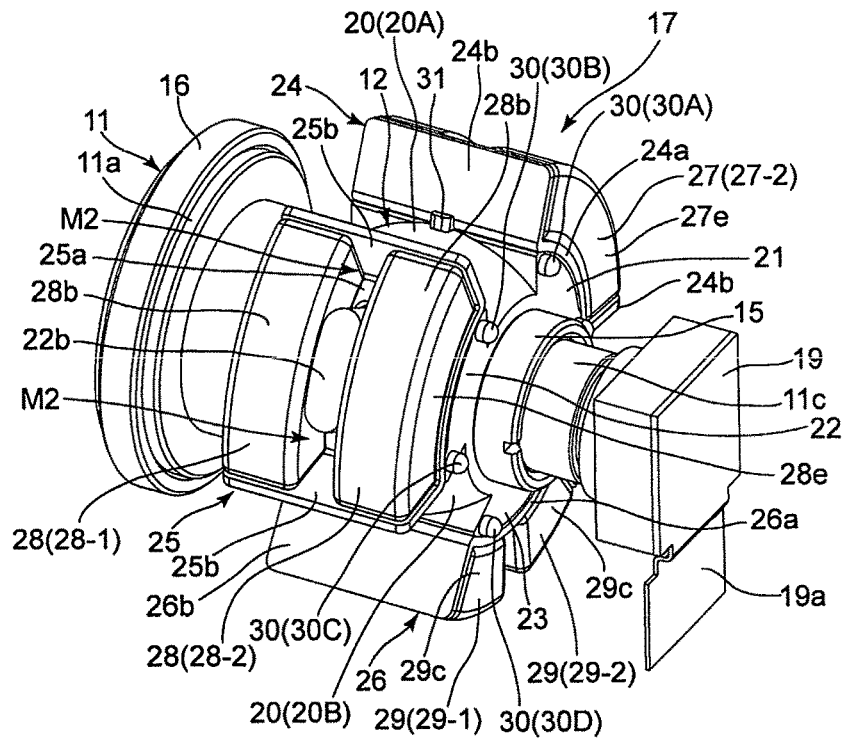
FIG. 24 is a rear perspective view of the combination of the movable unit, the lens barrel and the image sensor unit.
Figure 25:
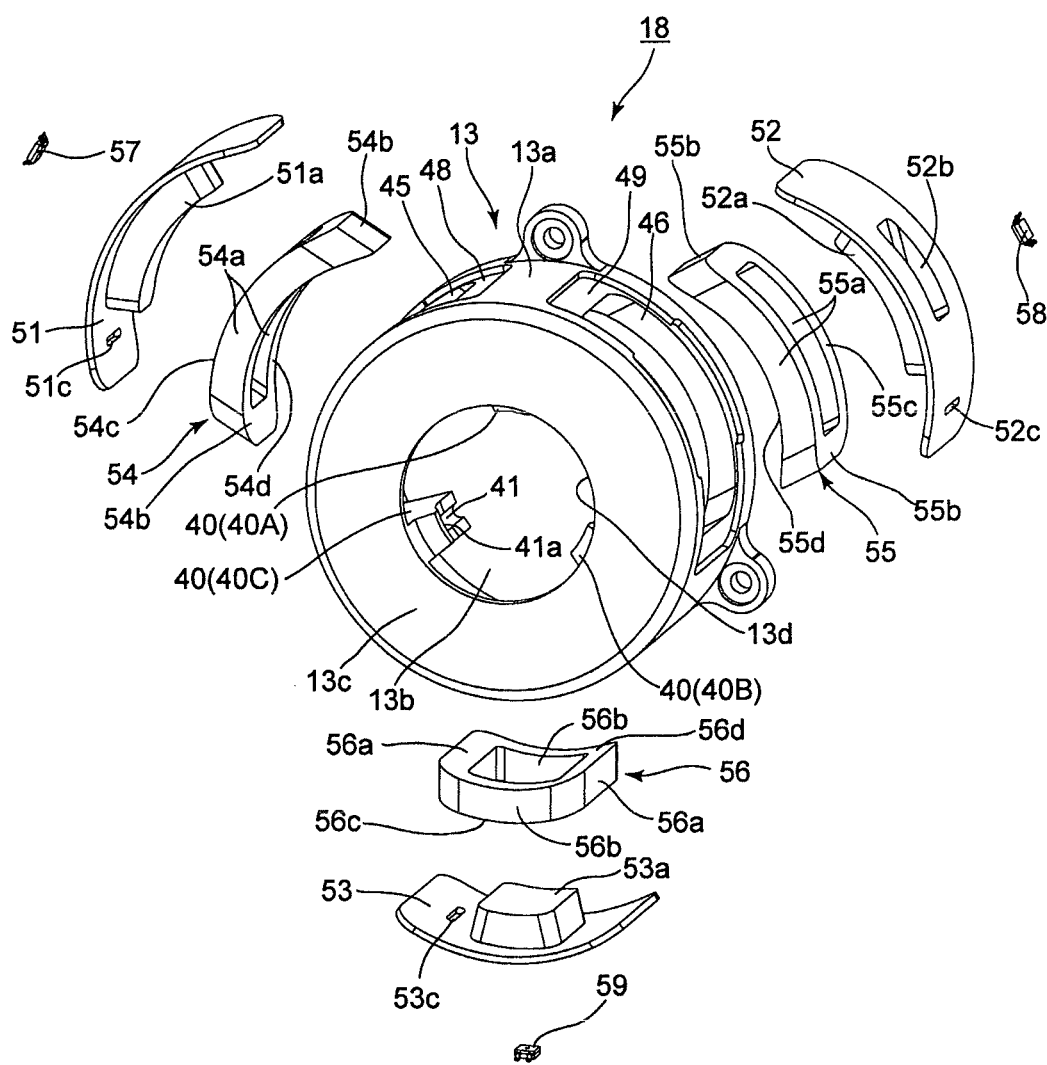
FIG. 25 is an exploded front perspective view of a stationary unit shown mainly in FIGS. 9, 10 and 11.
Figure 26:
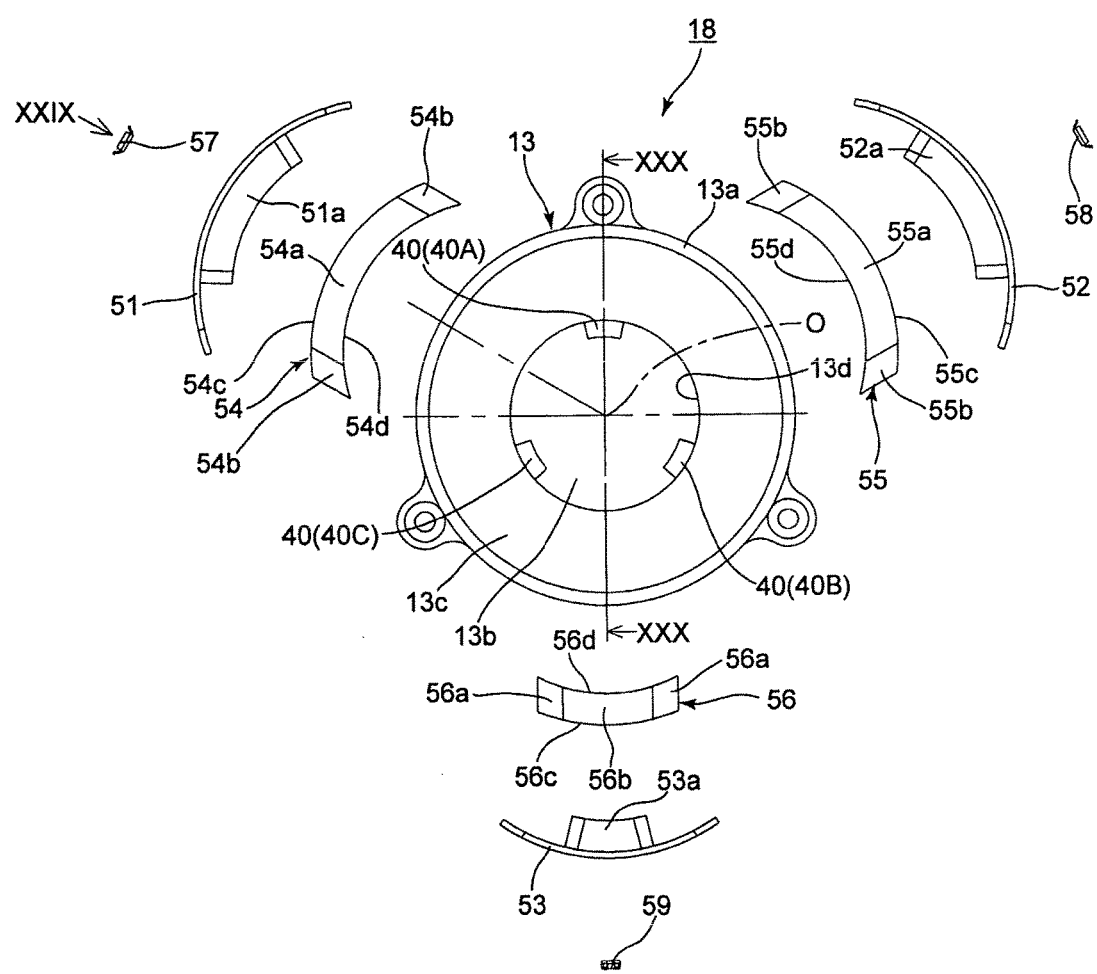
FIG. 26 is an exploded front elevational view of the stationary unit.
Figure 27:
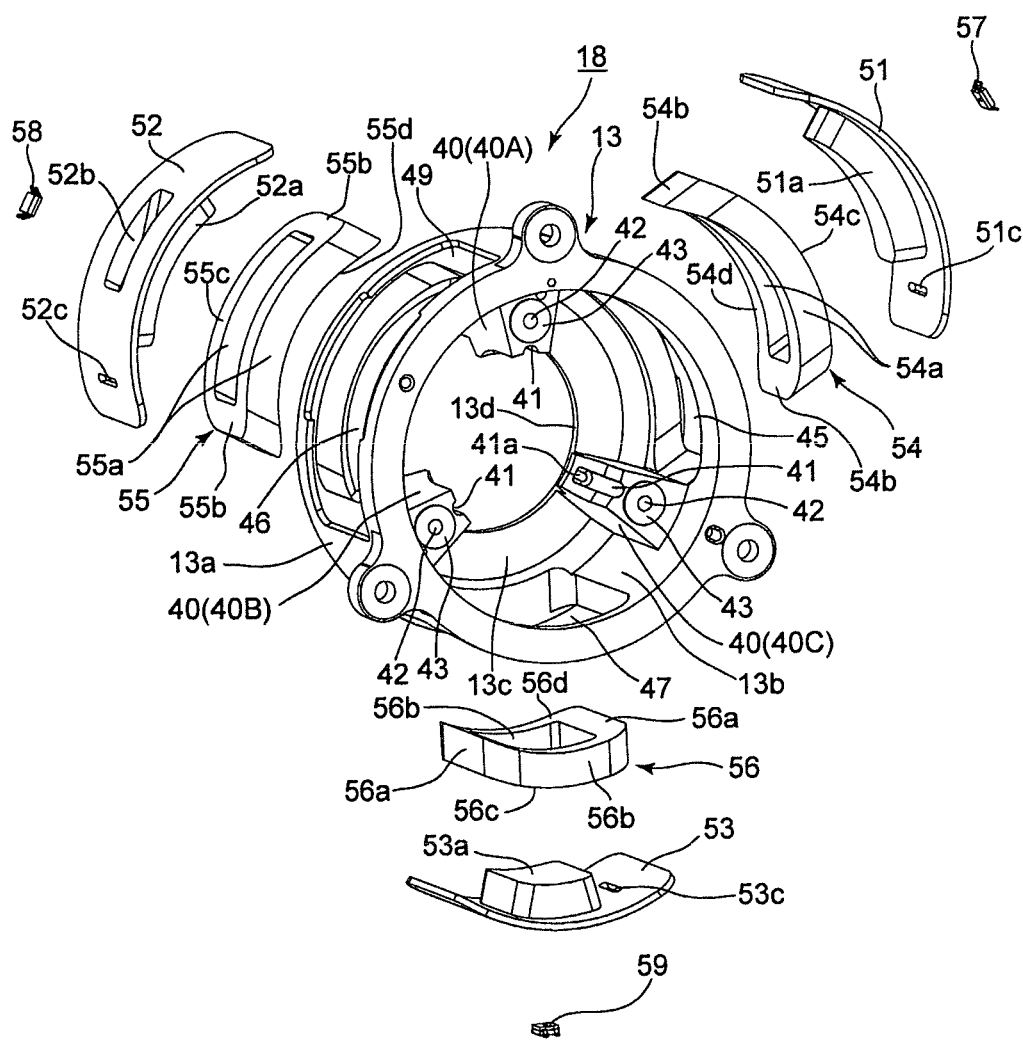
FIG. 27 is an exploded rear perspective view of the stationary unit.
Figure 28:
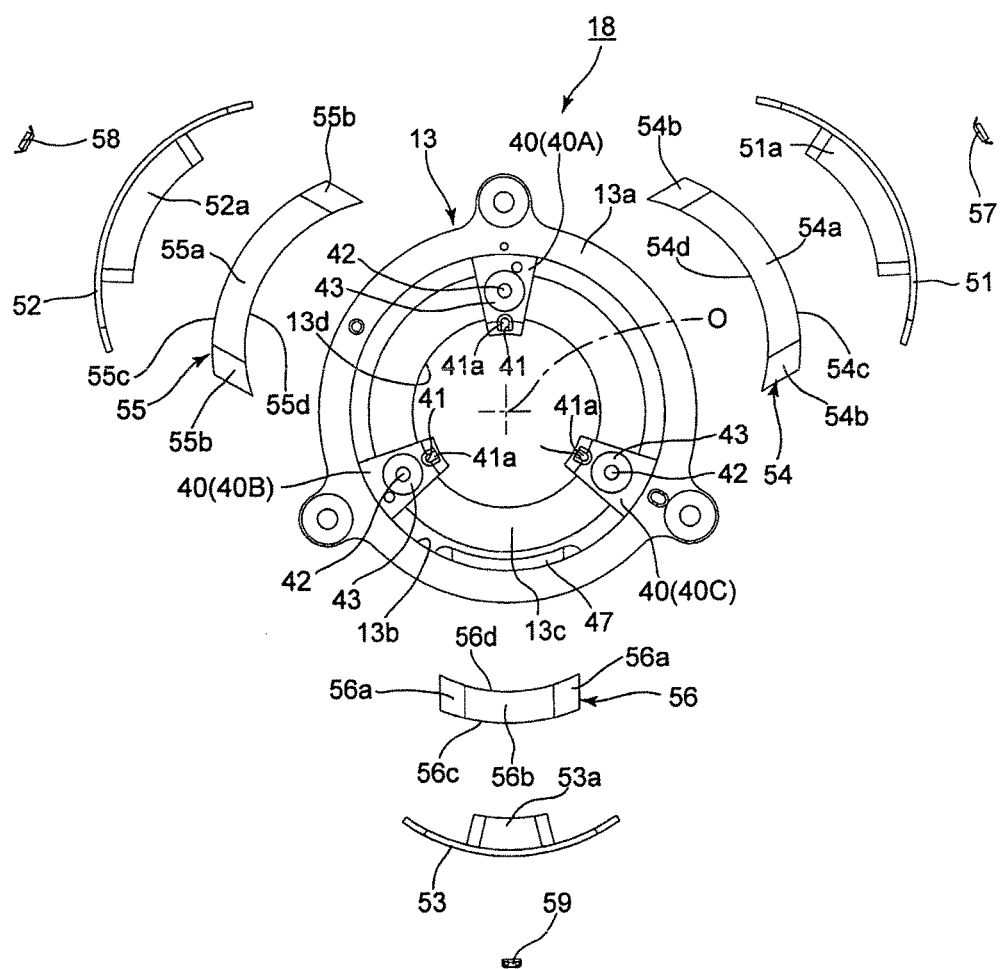
FIG. 28 is an exploded rear elevational view of the stationary unit.

As shown in FIGS. 5, 9, 12 through 18, 20, 22 through 24, 35, 36, 38, 40 and 41, the barrel holder 12 is provided on the outer periphery of the cylindrical portion 12a thereof with three swing guide surfaces (supporters) 20. The three swing guide surfaces are formed at different positions in the circumferential direction and are designated by reference marks 20A, 20B and 20C. Each of the three swing guide surfaces 20A, 20B and 20C constitutes a portion of the surface of a sphere that is centered on a predetermined point on the optical axis O, and the center of this sphere is referred to as the spherical-swinging center Q (FIGS. 9 and 22). The three swing guide surfaces 20A, 20B and 20c have substantially in the same width in the circumferential direction and are arranged at substantially equi-angular intervals (intervals of 120 degrees) in the circumferential direction.

As shown in FIGS. 9, 11, 14, 15, 17 through 22, 24 and 36 through 39, the barrel holder 12 is provided, at the rear end surface thereof, with a plurality of tilting restriction projections 30 which project rearward in the optical axis direction. A total of six tilting restriction projections 30 are provided, specifically, the following three pairs of tilting restriction projections 30: a pair of tilting restriction projections 30A and 30B which are provided at positions at either side of the swing guide surface 20A in the circumferential direction, a pair of tilting restriction projections 30C and 30D which are provided at positions at either side of the swing guide surface 20B in the circumferential direction, and a pair of tilting restriction projections 30E and 30F which are provided at positions at either side of the swing guide surface 20C in the circumferential direction. The end of each tilting restriction projection 30 (i.e., the rear end thereof in the optical axis direction) is semicircular in shape, and all the six tilting restriction projections 30 are substantially identical in the amount of projection from the rear end surface of the barrel holder 12 (see FIGS. 18 through 22 and 37 through 39).

As shown in FIGS. 10 through 18, 21 through 24, 34 through 36, 40 and 41, the barrel holder 12 is provided on the swing guide surface 20A with a pair of rolling-range limit projections 31 which are spaced from each other in the circumferential direction. The swing guide surface 20A, which is formed as a portion of the surface of a sphere centered on the spherical-swinging center Q, becomes increasingly distant from the optical axis O with respect to a direction from either end (front/rear end) of the swing guide surface 20A toward the center thereof (in the optical axis direction). The pair of rolling-range limit projections 31 are formed on the swing guide surface 20A at an approximate center thereof with respect to the optical axis direction which has the greatest distance from the optical axis O (i.e., formed to lie on a plane which is substantially orthogonal to the optical axis O and passes through the spherical-swinging center Q). In other words, the pair of rolling-range limit projections 31 is provided on an area of the swing guide surface 20A which projects radially outwards by the greatest amount.

As shown in FIGS. 12 through 17, 34 through 36, 40 and 41, the barrel holder 12 is provided with three support seats 21, 22 and 23 at positions between the three swing guide surfaces 20A, 20B and 20C in the circumferential direction. Specifically, the support seat 21 is positioned between the two swing guide surfaces 20A and 20C, the support seat 22 is positioned between the two swing guide surfaces 20A and 20B, and the support seat 23 is positioned between the two swing guide surfaces 20B and 20C. The support seat 21 is provided with a pair of support surfaces 21a, each of which is formed as a cylindrical surface with the curvature center thereof located at the optical axis O and a magnet support projection 21b which projects radially outwards by an amount of projection greater than that of each support surface 21a. The support seat 22 is provided with a pair of support surfaces 22a, each of which formed as a cylindrical surface with the curvature center thereof located at the optical axis O and a magnet support projection 22b which projects radially outwards by an amount of projection greater than that of each support surface 22a. The support seat 23 is provided with a pair of support surfaces 23a, each of which formed as a cylindrical surface with the curvature center thereof located at the optical axis O and a magnet support projection 23b which projects radially outwards by an amount of projection greater than that of each support surface 23a. The pair of support surfaces 21a, the pair of support surfaces 22a and the pair of support surfaces 23a are portions of the same cylindrical surface. The pair of support surfaces 21a are provided at either end of the support seat 21 in the circumferential direction, and the portions of the support seat 21 which are positioned between the pair of support surfaces 21a in the circumferential direction and also positioned on the opposite sides of the magnet support projection 21b in the optical axis direction are formed as recessed portions that are recessed radially inwards. Likewise, the pair of support surfaces 22a are provided at either end of the support seat 22 in the circumferential direction, and the portions of the support seat 22 which are positioned between the pair of support surfaces 22a in the circumferential direction and also positioned on the opposite sides of the magnet support projection 22b in the optical axis direction are formed as recessed portions that are recessed radially inwards. Whereas, the pair of support surfaces 23a are provided at either end of the support seat 23 in the circumferential direction, and the portions of the support seat 23 which are positioned between the pair of support surfaces 23a in the circumferential direction and also positioned on the opposite sides of the magnet support projection 23b in the circumferential direction are formed as recessed portions that are recessed radially inwards.

As shown in FIGS. 10 through 15, 18, 20, 21, 23, 24, 34, 38 and 39, the magnet support projection (first sandwiched portion) 21b and the magnet support projection (second sandwiched portion) 22b are plate-like projections which are small in thickness in the optical axis direction, the longitudinal direction of which substantially aligns with the circumferential direction and which are substantially identical in shape. The front surface and the rear surface of each of the two magnet support projections 21b and 22b in the optical axis direction are flat surfaces substantially parallel to each other and each formed into a flat surface lying in a plane substantially orthogonal to the optical axis O. The magnet support projection 21b is positioned at an approximate center of the support seat 21 in the optical axis direction. Likewise, the magnet support projection 22b is positioned at an approximate center of the support seat 22 in the optical axis direction. As shown in FIGS. 5, 9, 12 through 17, 19, 22, 33 through 37, 40 and 41, the magnet support projection (third sandwiched portion) 23b is a plate-like projection which is small in thickness in the circumferential direction, and the longitudinal direction of which substantially aligns with the optical axis direction. Both surfaces of the magnet support projection 23b (with respect to the circumferential direction) are flat surfaces which are substantially parallel to each other and elongated in the optical axis direction. The magnet support projection 23b is positioned at an approximate center of the support seat 23 in the circumferential direction.

The bases of the three support seats 21, 22 and 23 except the magnet support projections 21b, 22b and 23b (i.e., the three pairs of support surfaces 21a, 22a and 23a of the three support seats 21, 22 and 23) are substantially identical in shape, and arranged at substantially equi-angular intervals (intervals of 120 degrees) in the circumferential direction. As shown in FIGS. 12 through 24, 34 through 36, 40 and 41, the imaging apparatus 10 is provided with three yokes: a yoke (first yoke) 24, a yoke (second yoke) 25 and a yoke (third yoke) 26 which are mounted on the three support seats 21, 22 and 23, respectively, and are supported by the barrel holder 12. The yokes 24, 25 and 26 are made of a magnetic metallic material. The yoke 24 is provided with a curved base wall (support portion) 24a which extends along the support surface 21a and a pair of standing walls (projecting portions) 24b which project radially outwards from either end of the base wall 24a in the circumferential direction.

Likewise, the yoke 25 is provided with a curved base wall (support portion) 25a which extends along the support surface 22a and a pair of standing walls (projecting portions) 25b which project radially outwards from either end of the base wall 25a in the circumferential direction, and the yoke 26 is provided with a curved base wall (support portion) 26a which extends along the support surface 23a and a pair of standing walls (projecting portions) 26b which project radially outwards from either end of the base wall 26a in the circumferential direction. The yoke 24 is provided in the base wall 24a with a slot 24c which is formed as a through-hole that is elongated in the circumferential direction, and the yoke 25 is provided in the base wall 25a with a slot 25c which is formed as a through-hole that is elongated in the circumferential direction, whereas the yoke 26 is provided in the base wall 26a with a slot 26c which is formed as a through-hole that is elongated in the optical axis direction. The slots 24c and 25c are shaped to allow the magnet support projection 21b and the magnet support projection 22b to be inserted therethrough, respectively, while the slot 26c is shaped to allow the magnet support projection 23b to be inserted therethrough. Each of the magnet support projections 21b, 22b and 23c is shaped in cross section to be inserted into the associated slot 24c, 25c or 26c without rattling. In this inserted state, the position of each yoke 24, 25 and 26 with respect to the barrel holder 12 in both the optical axis direction and the circumferential direction is fixed. The three yokes 24, 25 and 26 are formed such that the base walls 24a, 25a and 26a are substantially identical in shape, that the pairs of standing walls 24b, 25b and 26b are substantially identical in shape, and with only the slot 26c being different in shape from the slits 24c and 25c.

As shown in FIGS. 16, 17, 34 through 36, 40 and 41, the three yokes 24, 25 and 26 are supported on the three support seats 21, 22 and 23 with the inner peripheral surfaces of the curved base walls 24a, 25a and 26a mounted onto the pairs of support surfaces 21a, 22a and 23a, respectively. In this state, the magnet support projections 21b, 22b and 23b project radially outwards through the slots 24c, 25c and 26c of the yokes 24, 25 and 26, respectively. With the yokes 24, 25 and 26 supported on the support seats 21, 22 and 23, the base walls 24a, 25a and 26a of the yokes 24, 25 and 26 lie on an imaginary cylindrical surface (fourth cylindrical surface) R1 (see FIG. 42) centered on the optical axis O. As shown in FIGS. 18 through 24 and 37 through 39, the yokes 24, 25 and 26 are substantially identical in length in the optical axis direction to the barrel holder 12. Additionally, in a state where the positions of the yokes 24, 25 and 26 relative to the barrel holder 12 are fixed by engagement of the magnet support projections 21b, 22b and 23b in the slots 24c, 25c and 26c, respectively, the front edges of the yokes 24, 25 and 26 and the front end surface of the barrel holder 12 in the optical axis direction are positioned at the same position, with respect to the optical axis direction, and the rear edges of the yokes 24, 25 and 26 and the rear end surface of the barrel holder 12 in the optical axis direction are positioned at the same position, with respect to the optical axis direction.

As shown in FIGS. 10 through 18, 20, 21, 23, 24, 34 through 36 and 38 through 41, the imaging apparatus 10 is provided with a first magnet unit (first magnet) 27 and a second magnet unit (second magnet) 28 which are supported on the yoke 24 and the yoke 25, respectively. The first magnet unit 27 is configured of a set (pair) of circular-arc shaped permanent magnets (split magnets) 27-1 and 27-2 which are elongated in the circumferential direction. Likewise, the second magnet unit 28 is configured of a set (pair)

of circular-arc shaped permanent magnets (split magnets) 28-1 and 28-2 which are elongated in the circumferential direction. The permanent magnets 27-1 and 27-2 are mutually identical in shape and size and are each provided with an inner peripheral surface (non-facing surface) 27a and an outer peripheral surface (coil-facing surface) 27b. The inner peripheral surface 27a is a portion of an imaginary cylindrical surface (third cylindrical surface) R2 (see FIG. 42) centered on the optical axis O, while the outer peripheral surface 27b is a portion of an imaginary cylindrical surface (first cylindrical surface) R3 (see FIG. 42) which is centered on the optical axis O and is concentric with and greater in diameter than the cylindrical surface R2 that includes the inner peripheral surface 27a. In addition, each of the permanent magnets 27-1 and 27-2 is provided with a pair of longitudinal end surfaces 27c which are positioned at either end with respect to the longitudinal direction of the permanent magnet (i.e., in the circumferential direction) and radially connect the inner peripheral surface 27a with the outer peripheral surface 27b, and a pair of side surfaces 27d and 27e which extend between the pair of longitudinal end surfaces 27c in the longitudinal direction of the permanent magnet (i.e., in the circumferential direction) and radially connect the inner peripheral surface 27a with the outer peripheral surface 27b. The permanent magnets 28-1 and 28-2 are magnets identical in shape and size to the permanent magnets 27-1 and 27-2, thus being each provided with an inner peripheral surface (non-facing surface) 28a, an outer peripheral surface (coil-facing surface) 28b, a pair of longitudinal end surfaces 28c and a pair of side surfaces 28d and 28e which respectively correspond to the inner peripheral surface 27a, the outer peripheral surface 27b, the pair of longitudinal end surfaces 27c and the pair of side surfaces 27d and 27e of each permanent magnet 27-1 and 27-2.

The first magnet unit 27 is mounted on the yoke 24 so that the permanent magnet 27-1 and the permanent magnet 27-2 are parallel-positioned side by side in the optical axis direction (the short-side direction of the permanent magnet 27-1 and the permanent magnet 27-2) on the front and rear of the yoke 24, respectively. As shown in FIGS. 16 through 18, 21, 23, 24, 34 through 36, 40 and 41, the inner peripheral surfaces 27a of the permanent magnet 27-1 and the permanent magnet 27-2 are mounted on the base wall 24a with the pair of longitudinal end surfaces 27c facing the pair of standing walls 24b. Since the inner peripheral surfaces 27a of the permanent magnet 27-1 and the permanent magnet 27-2 are curved surfaces along the base wall 24a, the permanent magnet 27-1 and the permanent magnet 27-2 are stably supported radially by engagement between the base wall 24a and the inner peripheral surfaces 27a. In addition, the positions of the permanent magnet 27-1 and the permanent magnet 27-2 in the circumferential direction are determined by the pair of standing walls 24b holding the permanent magnet 27-1 and the permanent magnet 27-2 from either side with respect to the circumferential direction (i.e., by the engagement of the pair of longitudinal end surfaces 27c of each permanent magnet 27-1 and 27-2 with the pair of standing walls 24b). Additionally, the permanent magnet 27-1 and the permanent magnet 27-2 are arranged parallel to each other with a predetermined distance therebetween in the optical axis direction with the magnet support projection 21b, which projects radially outwards through the slot 24c, sandwiched (inserted) between the side surface 27e of the permanent magnet 27-1 and the side surface 27d of the permanent magnet 27-2. The magnet support projection 21b is smaller in length than the permanent magnet 27-1 and the permanent magnet 27-2 in the circumferential direction, and an adhesive injection space M1 is formed between the side surface 27e of the permanent magnet 27-1 and the side surface 27d of the permanent magnet 27-2 by the magnet support projection 21b being sandwiched between central portions of the permanent magnet 27-1 and the permanent magnet 27-2 in the longitudinal direction thereof (see FIGS. 18, 21 and 39). In the above illustrated supported state of the permanent magnet unit 27 by the yoke 24 and the magnet support projection 21b, the side surface 27d of the permanent magnet 27-1 lies at substantially the same position as the front end surface of the barrel holder 12 (the front edge of the yoke 24) in the optical axis direction, and the side surface 27e of the permanent magnet 27-2 lies at substantially the same position as the rear end surface of the barrel holder 12 (the rear edge of the yoke 24) in the optical axis direction (see FIGS. 18, 21, 23, 24 and 39). Accordingly, the sum of the widths of the permanent magnet 27-1, the magnet support projection 21b and the permanent magnet 27-2 in the optical axis direction substantially corresponds to (substantially equal to) the length of each of the barrel holder 12 and the yoke 24 in the optical axis direction, so that the first magnet unit 27 is supported by the barrel holder 12 without jutting out either forwardly or rearwardly from the barrel holder 12.

The second magnet unit 28 is mounted on the yoke 25 so that the permanent magnet 28-1 and the permanent magnet 28-2 are parallel-positioned side by side in the optical axis direction (the short-side direction of the permanent magnet 28-1 and the permanent magnet 28-2) on the front and rear of the yoke 25, respectively. As shown in FIGS. 16 through 18, 20, 23, 24, 34 through 36, 40 and 41, the inner peripheral surfaces 28a of the permanent magnet 28-1 and the permanent magnet 28-2 are mounted on the base wall 25a with the pair of longitudinal end surfaces 28c facing the pair of standing walls 25b. Since the inner peripheral surfaces 28a of the permanent magnet 28-1 and the permanent magnet 28-2 are curved surfaces along the base wall 25a, the permanent magnet 28-1 and the permanent magnet 28-2 are stably supported radially by engagement between the base wall 25a and the inner peripheral surfaces 28a. In addition, the positions of the permanent magnet 28-1 and the permanent magnet 28-2 in the circumferential direction are determined by the pair of standing walls 25b holding the permanent magnet 28-1 and the permanent magnet 28-2 from either side with respect to the circumferential direction (i.e., by the engagement of the pair of longitudinal end surfaces 28c with the pair of standing walls 25b). Additionally, the permanent magnet 28-1 and the permanent magnet 28-2 are arranged parallel to each other with a predetermined distance therebetween in the optical axis direction with the magnet support projection 22b that projects radially outwards through the slot 25c sandwiched (inserted) between the side surface 28e of the permanent magnet 28-1 and the side surface 28d of the permanent magnet 28-2. The magnet support projection 22b is smaller in length than the permanent magnet 28-1 and the permanent magnet 28-2 in the circumferential direction, and an adhesive injection space M2 is formed between the side surface 28e of the permanent magnet 28-1 and the side surface 28d of the permanent magnet 28-2 by the magnet support projection 22b being sandwiched between central portions of the permanent magnet 28-1 and the permanent magnet 28-2 in the longitudinal direction thereof (see FIGS. 18, 20, 23, 24 and 38). In the above illustrated supported state of the permanent magnet unit 28 by the yoke 25 and the magnet support projection 22b, the side surface 28d of the permanent magnet 28-1 lies at substantially the same position as the front end surface of the barrel holder 12 (the front edge of the yoke 25) in the optical axis direction, and the side surface 28*e* of the permanent magnet 28-2 lies at substantially the same position as the rear end surface of the barrel holder 12 (the rear edge of the yoke 25) in the optical axis direction (see FIGS. 18, 20, 23, 24 and 38). Accordingly, the sum of the widths of the permanent magnet 28-1, the magnet support projection 22*b* and the permanent magnet 28-2 in the optical axis direction substantially corresponds to (substantially equal to) the length of each of the barrel holder 12 and the yoke 25 in the optical axis direction, so that the second magnet unit 28 is supported by the barrel holder 12 without jutting out either forwardly or rearwardly from the barrel holder 12.

As shown in FIGS. 9 through 17, 19, 20, 22 through 24, 34 through 37, 40, and 41, the imaging apparatus 10 is provided with a third magnet unit (third magnet) 29 which is supported on the yoke 26. The third magnet unit 29 is configured of a set (pair) of circular-arc shaped permanent magnets (split magnets) 29-1 and 29-2 which are elongated in the optical axis direction. The permanent magnets 29-1 and 29-2 are mutually identical in shape and size and are each provided with an inner peripheral surface (non-facing surface) 29*a* and an outer peripheral surface (coil-facing surface) 29*b*. The inner peripheral surface 29*a* is a portion of the cylindrical surface R2 (see FIG. 42) that is centered on the optical axis O, while the outer peripheral surface 29*b* is a portion of the cylindrical surface R3 (see FIG. 42), which is centered on the optical axis O and is concentric with and greater in diameter than the cylindrical surface R2 that includes the inner peripheral surface 29*a*. In addition, each of the permanent magnets 29-1 and 29-2 is provided with a pair of longitudinal end surfaces 29*c* which are positioned at either end with respect to the longitudinal direction of the permanent magnet (i.e., in the optical axis direction) and radially connect the inner peripheral surface 29*a* with the outer peripheral surface 29*b*, and a pair of side surfaces 29*d* and 29*e* which extend between the pair of longitudinal end surfaces 29*c* in the longitudinal direction of the permanent magnet (i.e., in the optical axis direction) and radially connect the inner peripheral surface 29*a* with the outer peripheral surface 29*b*.

Unlike the first magnet unit 27 and the second magnet unit 28, the third magnet unit 29 is mounted on the yoke 26 so that the permanent magnet 29-1 and the permanent magnet 29-2 are parallel-positioned side by side with respect to the circumferential direction (the short-side direction of the permanent magnet 29-1 and the permanent magnet 29-2), respectively. As shown in FIGS. 9, 16, 17, 19, 22 through 24, 34 through 36, 40 and 41, the inner peripheral surfaces 29*a* of the permanent magnet 29-1 and the permanent magnet 29-2 are mounted on the base wall 26*a* with the side surface 29*d* of the permanent magnet 29-1 facing one of the pair of standing walls 26*b* (the right standing wall 26*b* with respect to FIG. 13) and with the side surface 29*e* of the permanent magnet 29-2 facing the other standing wall 26*b* (the left standing wall 26*b* with respect to FIG. 13). Since the inner peripheral surfaces 29*a* of the permanent magnet 29-1 and the permanent magnet 29-2 are curved surfaces along the base wall 26*a*, the permanent magnet 29-1 and the permanent magnet 29-2 are stably supported radially by engagement between the base wall 26*a* and the inner peripheral surfaces 29*a*. The permanent magnet 29-1 and the permanent magnet 29-2 are arranged parallel to each other with a predetermined distance therebetween in the circumferential direction with the magnet support projection 23*b* that projects radially outwards through the slot 26*c* sandwiched between the side surface 29*e* of the permanent magnet 29-1 and the side surface 29*d* of the permanent magnet 29-2. The magnet support projection 23*b* is smaller in length than the permanent magnet 29-1 and the permanent magnet 29-2 in the optical axis direction, and an adhesive injection space M3 is formed between the side surface 29*e* of the permanent magnet 29-1 and the side surface 29*d* of the permanent magnet 29-2 by the magnet support projection 23*b* being sandwiched between central portions of the permanent magnet 29-1 and the permanent magnet 29-2 in the longitudinal direction thereof (see FIGS. 19, 22 and 37). The position of the third magnet unit 29 in the circumferential direction is determined by the pair of standing walls 26*b* holding the permanent magnet 29-1 and the permanent magnet 29-2 from either side in the circumferential direction with the magnet support projection 23*b* sandwiched between the permanent magnet 29-1 and the permanent magnet 29-2. In other words, the sum of the widths of the permanent magnet 29-1, the magnet support projection 23*b* and the permanent magnet 29-2 in the circumferential direction substantially corresponds with the distance between the pair of standing walls 26*b* in the circumferential direction. In addition, the length of each permanent magnet 29-1 and 29-2 (the distance between the pair of longitudinal end surfaces 29*c* of each permanent magnet 29-1 and 29-2) in the optical axis direction substantially corresponds with the length of each of the barrel holder 12 and the yoke 26 in the optical axis direction. Additionally, the front longitudinal end surface 29*c* of the permanent magnet 29-1 and the front longitudinal end surface 29*c* of the permanent magnet 29-2 lie at the substantially the same position as the front end surface of the barrel holder 12 (the front edge of the yoke 26) in the optical axis direction, and the rear longitudinal end surface 29*c* of the permanent magnet 29-1 and the rear longitudinal end surface 29*c* lie at the substantially the same position as the rear end surface of the barrel holder 12 (the rear edge of the yoke 26) in the optical axis direction, so that the third magnet unit 29 is supported by the barrel holder 12 without jutting out either forwardly or rearwardly from the barrel holder 12 (see FIGS. 19 and 22).

Adhesive is injected into each of the first, second and third adhesive injection spaces M1, M2 and M3. The yoke 24 and the first magnet unit 27 are fixed to the barrel holder 12 (the magnet support projection 21*b*) by the adhesive injected into the first adhesive injection space M1. The yoke 25 and the second magnet unit 28 are fixed to the barrel holder 12 (the magnet support projection 22*b*) by the adhesive injected into the second adhesive injection space M2. The yoke 26 and the third magnet unit 29 are fixed to the barrel holder 12 (the magnet support projection 23*b*) by the adhesive injected into the third adhesive injection space M3. Accordingly, an adhesive-fixing portion at which each permanent magnet 27-1 and 27-2 of the first magnet unit 27 is fixed to the magnet support projection 21*b* and the yoke 24 with an adhesive is formed in the adhesive injection space M1, an adhesive-fixing portion at which each permanent magnet 28-1 and 28-2 of the second magnet unit 28 is fixed to the magnet support projection 22*b* and the yoke 25 with an adhesive is formed in the adhesive injection space M2, and an adhesive-fixing portion at which each permanent magnet 29-1 and 29-2 of the third magnet unit 29 is fixed to the magnet support projection 23*b* and the yoke 26 with an adhesive is formed in the adhesive injection space M3.

The movable unit 17, which is the subassembly that is shown in FIGS. 16 through 22 and 35 through 41, is completed (assembled) by mounting the yokes 24, 25 and 26 and the first, second and third magnet units 27, 28 and 29 to the barrel holder 12 as described above. In the movable unit 17, a combination of the yoke 24 and the first magnet unit 27 (including the magnet support projection 21b), a combination of the yoke 25 and the second magnet unit 28 (including the magnet support projection 22b) and a combination of the yoke 26 and the third magnet unit 29 (including the magnet support projection 23b) are substantially identical in size in the circumferential direction and the optical axis direction, and are arranged at substantially equi-angular intervals (intervals of 120 degrees) in the circumferential direction.

As shown in FIGS. 5, 16, 17, 34 through 36, 40, 41 and 42, the outer peripheral surfaces 27b, 28b and 29b of the first, second and third magnetic units 27, 28 and 29 of the movable unit 17 lie on the cylindrical surface R3 (shown only in FIG. 42) that is centered on the optical axis O, and the inner peripheral surfaces 27a, 28a and 29a of the first, second and third magnetic units 27, 28 and 29 lie on the cylindrical surface R2 (shown only in FIG. 42) that is centered on the optical axis O and different from and smaller in diameter than the cylindrical surface R3, which includes the outer peripheral surfaces 27b, 28b and 29b.

The north and south poles of each permanent magnet 27-1, 27-2, 28-1, 28-2, 29-1 and 29-2 of the first magnet unit 27, the second magnet unit 28 and the third magnet unit 29 in the movable unit 17 are designated conceptually by the reference characters "N" and "S", respectively, in FIGS. 13, 15 through 17, 35, 36, 40, 41 and 42. Each permanent magnet 27-1, 27-2, 28-1, 28-2, 29-1 and 29-2 is magnetized so that the north pole and the south pole are radially aligned. In addition, each permanent magnet 27-1, 28-2 and 29-1 is set so that the south and north poles thereof are positioned on the radially inner side and the radially outer side, respectively, while each permanent magnet 27-2, 28-1 and 29-2 is set so that the north and south poles thereof are positioned on the radially inner side and the radially outer side, respectively. The above described structure in which each of the first, second and third magnetic units 27, 28 and 29 is split into two (two permanent magnets which are parallel-arranged in the short-side direction thereof) facilitates magnetization of the magnets and is also advantageous for the reduction in weight.

As shown in FIGS. 9, 25 through 28 and 30 through 32, the coil holder 13 is provided, inside a cylindrical portion 13a thereof that surrounds the optical axis O, with an axial through-portion 13b which extends through the coil holder 13 in the optical axis direction. The coil holder 13 is provided at the front end thereof with a front wall 13c which projects radially inwards so that the radially inner edge of the front wall 13c forms a circular central aperture 13d. The central aperture 13d is smaller in diameter than the axial through-portion 13b.

Figure 30:
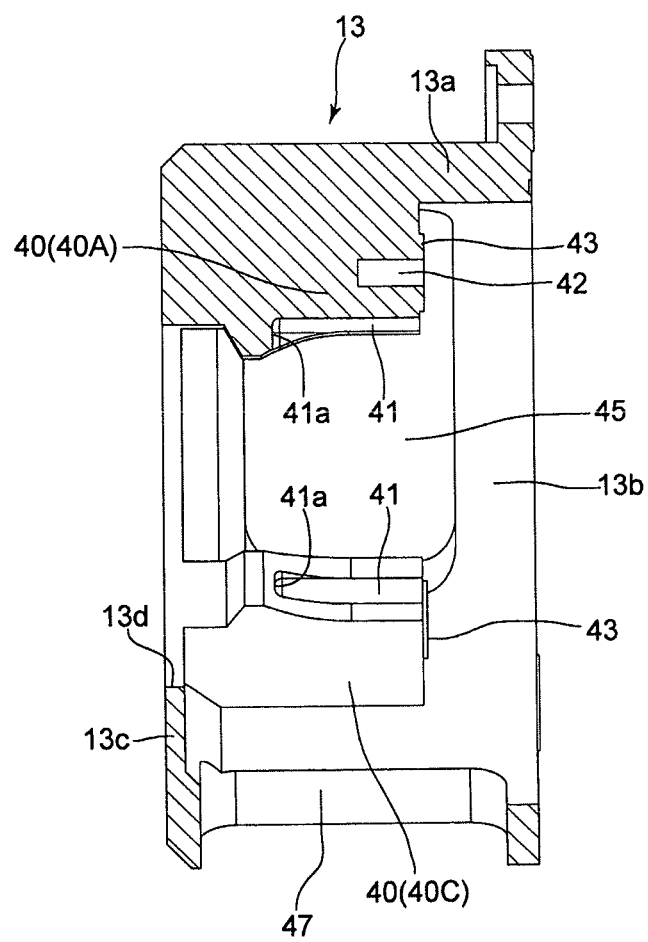
FIG. 30 is a sectional view taken along the line XXX-XXX shown in FIG. 26.

As shown in FIGS. 5, 9 through 11, 25 through 28, 30 through 32 and 34, the coil holder 13 is provided in the axial through-portion 13b with three support seats (supporters) 40 which project radially inwards from the inner peripheral surface of the cylindrical portion 13a. The three support seats 40 are provided at substantially equi-angular intervals (intervals of 120 degrees) in the circumferential direction and are designated by the reference characters 40A, 40B and 40C. Each support seat 40 (40A, 40B and 40C) is in the shape of a wedge in cross section whose width in the circumferential direction narrows with respect to the radially inward direction, and a ball holding groove 41 is formed at the radially inner end of each support seat 40. The ball holding groove 41 of each support seat 40 is formed as a bottomed groove elongated in the optical axis direction. The ball holding groove 41 of each support seat 40 has the bottom thereof at the radially outer end and is open radially inwards. The rear end of the ball holding groove 41 of each support seat 40 in the optical axis direction is open, while the front end of the same is closed by a front restriction wall 41a which is formed on the associated support seat 40 and positioned adjacent to the front wall 13c of the coil holder 13. As shown in FIGS. 9 and 30, a front portion of each support seat 40 in the vicinity of the front end of the associated ball holding groove 41, at which the associated front restriction wall 41a is formed, has a greater radially-inward projecting amount than the portion (rear portion) of the same support seat 40 which is positioned behind the aforementioned front portion in the optical axis direction, and the depth of the ball holding groove 41 in the front portion of each support seat 40 is greater than that in the rear portion of the same. A screw hole 42 that has a female screw thread therein is formed in the rear end surface of each support seat 40. Each support seat 40 is provided, around the screw hole 42 formed in the rear end surface thereof, with an annular abutment surface 43. Each abutment surface 43 is a flat surface which faces rearward and is substantially orthogonal to the optical axis O.

As shown in FIGS. 9, 11, 25, 27, 28, 30, 32 and 34, the cylindrical portion 13a of the coil holder 13 is provided with three through-holes 45, 46 and 47 which are formed radially through the cylindrical portion 13a. The three through-holes 45, 46 and 47 are formed at positions between the three support seats 40 in the circumferential direction. Specifically, the through-hole 45 is formed between the support seats 40A and 40C in the circumferential direction, the through-hole 46 is formed between the support seats 40A and 40B in the circumferential direction, and the through-hole 47 is formed between the support seats 40B and 40C in the circumferential direction. Each of the three through-holes 45, 46 and 47 is a hole elongated in the circumferential direction and has a substantially rectangular shape in a development view when the cylindrical portion 13a is developed on a flat surface. The through-hole 45 and the through-hole 46 are substantially identical in length in the circumferential direction and also in width in the optical axis direction. The through-hole 47 also has a substantially rectangular shape in a development view when the cylindrical portion 13a is developed on a flat surface, however the through-hole 47 is different in ratio between the length in the circumferential direction and the width in the optical axis direction compared to the through-holes 45 and 46. Specifically, the through-hole 47 is smaller in length in the circumferential direction than the through-holes 45 and 46 and greater in length in the optical axis direction than the through-holes 45 and 46. When the centers of the through-holes 45, 46 and 47 in the circumferential direction are referred to as reference positions of the through-holes 45, 46 and 47 in the circumferential direction, these reference positions are positioned at substantially equi-angular intervals (intervals of 120 degrees) in the circumferential direction.

The coil holder 13 is provided, around the three through-holes 45, 46 and 47 on the outer peripheral surface of the cylindrical portion 13a, with three support recesses (hollow bottomed portions) 48, 49 and 50, respectively. The support recesses 48 and 49 are recesses elongated in the circumferential direction and are substantially identical in length in the circumferential direction and in width in the optical axis direction. The support recess 50 is a recess smaller in length in the circumferential direction than the support recesses 48 and 49 and greater in length in the optical axis direction than the support recesses 48 and 49 (see FIG. 33).

Figure 41:
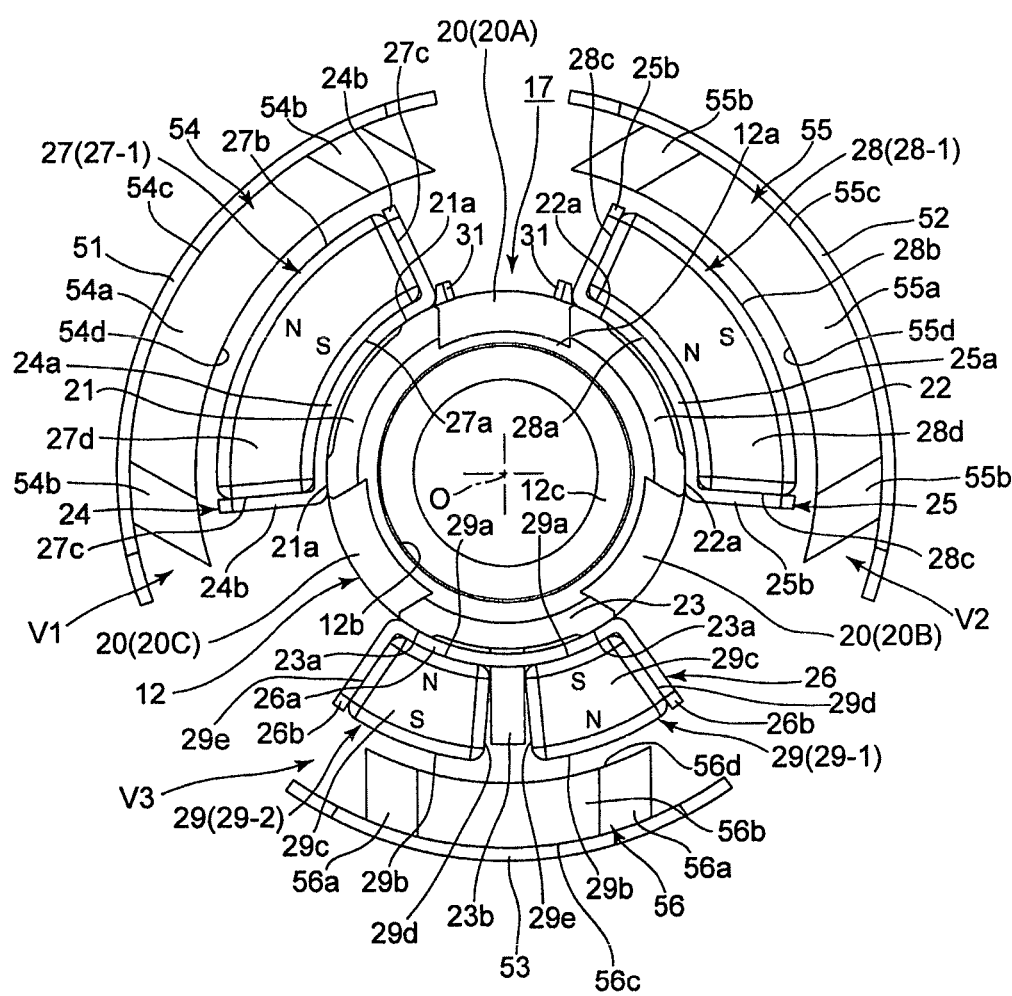
FIG. 41 is a front elevational view of the movable unit, the coils and the coil support plates, illustrating the positional relationship therebetween.
Figure 42:
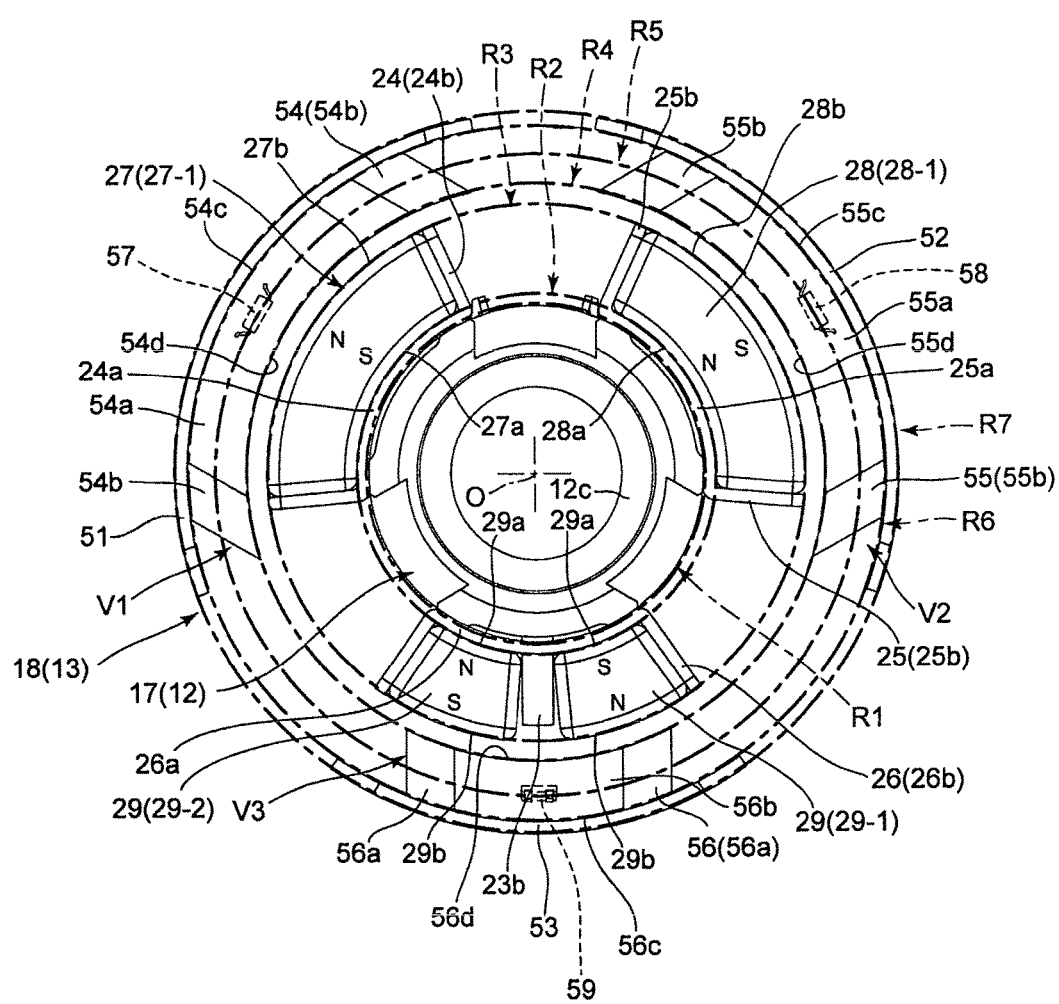
FIG. 42 is a view similar to that of FIG. 41, to which a plurality of imaginary cylindrical surfaces (shown by one-dot chain lines) have been added to illustrate the positional relationship between the elements of the three actuators incorporated in the imaging apparatus.

As shown in FIGS. 1, 2, 6 through 11, 25 through 29, 31 and 32, the imaging apparatus 10 is provided in the support recesses 48, 49 and 50 with three coil support plates 51, 52 and 53, respectively. The coil support plates 51, 52 and 53 are plate-like members which extend along the outer peripheral surface of the cylindrical portion 13a. The outer surfaces of the coil support plates 51, 52 and 53 are substantially flush with the outer peripheral surface of the cylindrical portion 13a when fitted into the support recesses 48, 49 and 50. Namely, the coil support plates 51, 52 and 53 lie on an imaginary cylindrical surface R7 (see FIG. 42) centered on the optical axis O. FIGS. 41 and 42 show the positional relationship between the coil support plates 51, 52 and 53 in this state. The coil support plates 51 and 52 are substantially identical in shape and size. The coil support plate 51 is provided, in the vicinity of the center thereof with respect to both the circumferential direction and the optical axis direction, with a coil support projection 51a which projects radially inwards, and the coil support plate 52 is provided, in the vicinity of the center thereof in both the circumferential direction and the optical axis direction, with a coil support projection 52a which projects radially inwards. A sensor support recess (bottomed hole) 51b and a sensor support recess (bottomed hole) 52b are formed in the coil support projection 51a and the coil support projection 52a, respectively. Each sensor support recess 51b and 52b is open radially outwards. The coil support plate 53 is smaller in length in the circumferential direction than the coil support plates 51 and 52 and greater in width in the optical axis direction than the coil support plates 51 and 52. The coil support plate 53 is provided, in the vicinity of the center thereof with respect to both the circumferential direction and the optical axis direction, with a coil support projection 53a which projects radially inwards, and a sensor support recess (bottomed hole) 53b is formed in the coil support projection 53a. The sensor support recess 53b is open radially outwards. The coil support plates 51, 52 and 53 are further provided with three through-holes 51c, 52c and 53c which extend radially therethrough, respectively.

The first coil 54, the second coil 55 and the third coil 56 are supported by the first support plate 51, the second support plate 52 and the third support plate 53, respectively. The first coil 54 is an air-core coil which includes a pair of long-side portions (circumferentially-extending portions) 54a and a pair of short-side portions (axially-extending portions) 54b. The pair of long-side portions 54a are greater in length than the pair of short-side portions 54b. The pair of long-side portions 54a are spaced from each other in the optical axis direction and are elongated in the circumferential direction, and the pair of short-side portions 54b which are elongated in the optical axis direction connect the pair of long-side portions 54a at the respective ends thereof. Likewise, the second coil 55 is an air-core coil which includes a pair of long-side portions (circumferentially-extending portions) 55a and a pair of short-side portions (axially-extending portions) 55b. The pair of long-side portions 55a are greater in length than the pair of short-side portions 55b. The pair of long-side portions 55a are spaced from each other in the optical axis direction and are elongated in the circumferential direction, and the pair of short-side portions 55b which are elongated in the optical axis direction connect the pair of long-side portions 55a at the respective ends thereof. The third coil 56 is an air-core coil which includes a pair of axially-extending portions 56a and a pair of circumferentially-extending portions 56b. The pair of axially-extending portions 56a and the circumferentially-extending portions 56b are substantially the same in length. The pair of axially-extending portions 56a are spaced from each other in the circumferential direction and are elongated in the optical axis direction, and the pair of circumferentially-extending portions 56b which are elongated in the circumferential direction connect the pair of axially-extending portions 56a at the respective ends thereof.

The first coil 54 and the second coil 55 are substantially identical in shape and size. The pair of long-side portions 54a and the pair of long-side portions 55a are substantially identical in length in the circumferential direction, and the pair of short-side portions 54b and the pair of short-side portions 55b are substantially identical in length in the optical axis direction. The pair of axially-extending portions 56a of the third coil 56 are greater in length in the optical axis direction than the pair of short-side portions 54b and the pair of short-side portions 55b, and the pair of circumferentially-extending portions 56b of the third coil 56 are smaller in length in the circumferential direction than the pair of long-side portions 54a and the pair of long-side portions 55a.

The first coil 54 is provided with a curved outer peripheral surface (non-facing surface) 54c and a curved inner peripheral surface (magnet-facing surface) 54d, the second coil 55 is provided with a curved outer peripheral surface (non-facing surface) 55c and a curved inner peripheral surface (magnet-facing surface) 55d, and the third coil 56 is provided with a curved outer peripheral surface (non-facing surface) 56c and a curved inner peripheral surface (magnet-facing surface) 56d. Each of the outer peripheral surfaces 54c, 55c and 56c is a portion of an imaginary cylindrical surface (fifth cylindrical surface) R6 (see FIG. 42) which is centered on the optical axis O and includes the inner peripheral surfaces of the coil support plates 51, 52 and 53 (i.e., in which the inner peripheral surfaces of the coil support plates 51, 52 and 53 lie), while each of the inner peripheral surfaces 54d, 55d and 56d lies in an imaginary cylindrical surface (second cylindrical surface) R4 (see FIG. 42) which is centered on the optical axis O and smaller in diameter than the imaginary cylindrical surface R6 that includes the outer peripheral surfaces 54c, 55c and 56c.

The first coil 54 has a hollow portion surrounded by the pair of long-side portions 54a and the pair of short-side portions 54b and is mounted to the coil support plate 51 by inserting the coil support projection 51a into the hollow portion of the first coil 54 and bringing the outer peripheral surface 54c into contact with the inner peripheral surface of the coil support plate 51. The coil support plate 51 and the first coil 54 are fixed to each other with an adhesive or the like. With the first coil 54 fixed to the coil support plate 51 in this manner, fitting the coil support plate 51 into the support recess 48 to be supported on the cylindrical portion 13a of the coil holder 13 causes the first coil 54 to be inserted into the through-hole 45, thus causing the inner peripheral surface 54d of the first coil 54 to face toward the radially inner side of the coil holder 13 (see FIGS. 5, 32, 34 through 36, and 41).

The second coil 55 has a hollow portion surrounded by the pair of long-side portions 55a and the pair of short-side portions 55b and is mounted to the coil support plate 52 by inserting the coil support projection 52a into the hollow portion of the second coil 55 and bringing the outer peripheral surface 55c into contact with the inner peripheral surface of the coil support plate 52. The coil support plate 52 and the second coil 55 are fixed to each other with an adhesive or the like. With the second coil 55 fixed to the coil support plate 52 in this manner, fitting the coil support plate 52 into the support recess 49 to be supported on the cylindrical portion 13a of the coil holder 13 causes the second coil 55 to be inserted into the through-hole 46, thus causing the inner peripheral surface 55d of the second coil 55 to face toward the radially inner side of the coil holder 13 (see FIGS. 5, 34 through 36 and 41).

The third coil 56 has a hollow portion surrounded by the pair of axially-extending portions 56a and the pair of circumferentially-extending portions 56b and is mounted to the coil support plate 53 by inserting the coil support projection 53a into the hollow portion of the third coil 56 and bringing the outer peripheral surface 56c into contact with the inner peripheral surface of the coil support plate 53. The coil support plate 53 and the third coil 56 are fixed to each other with an adhesive or the like. With the third coil 56 fixed to the coil support plate 53 in this manner, fitting the coil support plate 53 into the support recess 50 to be supported on the cylindrical portion 13a of the coil holder 13 causes the third coil 56 to be inserted into the through-hole 47, thus causing the inner peripheral surface 56d of the third coil 56 to face toward the radially inner side of the coil holder 13 (see FIGS. 5, 9, 32, 34 through 36 and 41).

FIGS. 34 through 39, 41 and 42 show the positional relationship between the first coil 54, the second coil 55 and the third coil 56 which are mounted to the coil holder 13 via the coil support plates 51, 52 and 53. As can be seen from these drawings, the first coil 54, the second coil 55 and the third coil 56 are positioned so that the outer peripheral surfaces 54c, 55c and 56c lie on an imaginary cylindrical surface R6 (shown only in FIG. 42) that is centered on the optical axis O, and so that the inner peripheral surfaces 54d, 55d and 56d lie on an imaginary cylindrical surface R4 (shown only in FIG. 42) that is centered on the optical axis O and smaller in diameter than the cylindrical surface R6 that includes the outer peripheral surfaces 54c, 55c and 56c.

Figure 34:
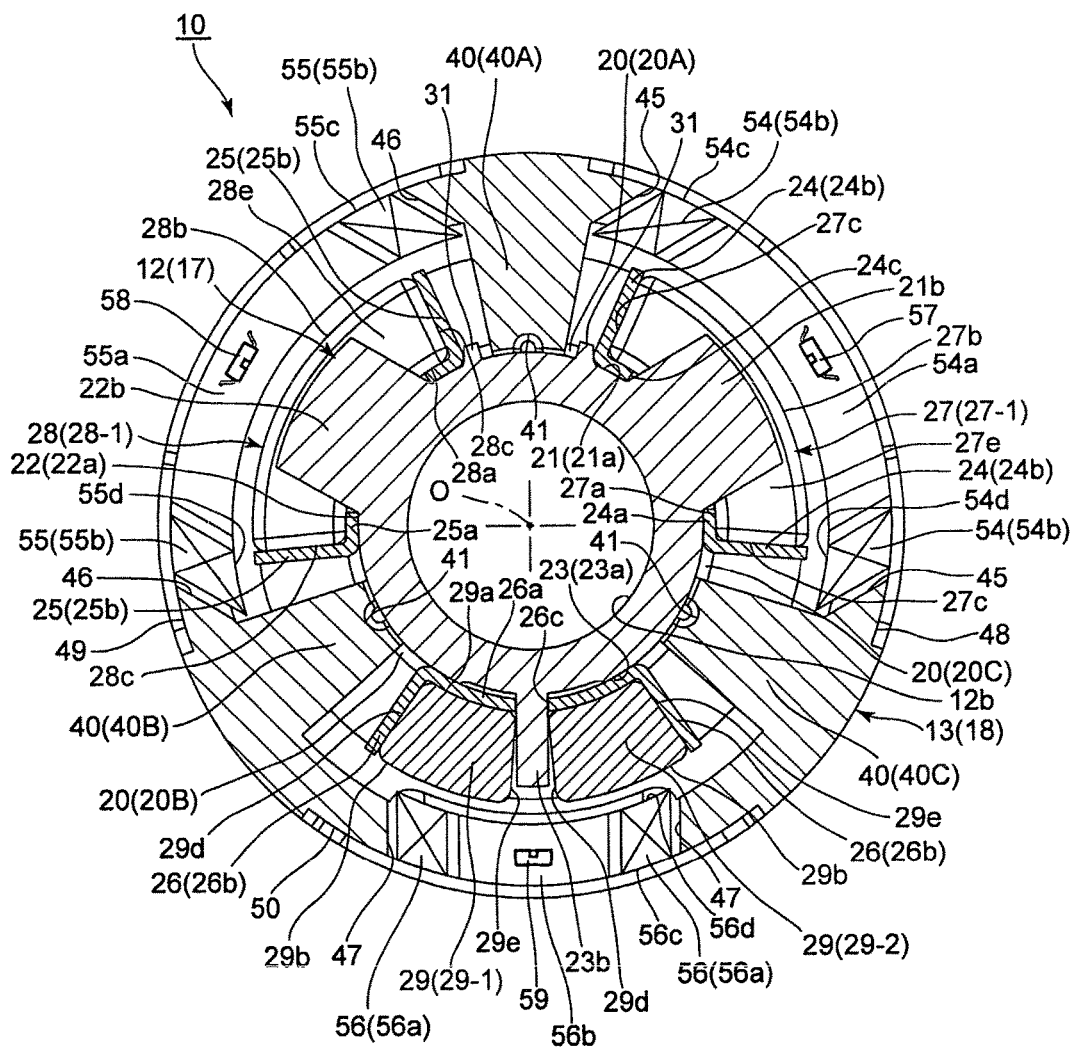
FIG. 34 is a sectional view taken along the line XXXIV-XXXIV shown in FIG. 33.
Figure 40:
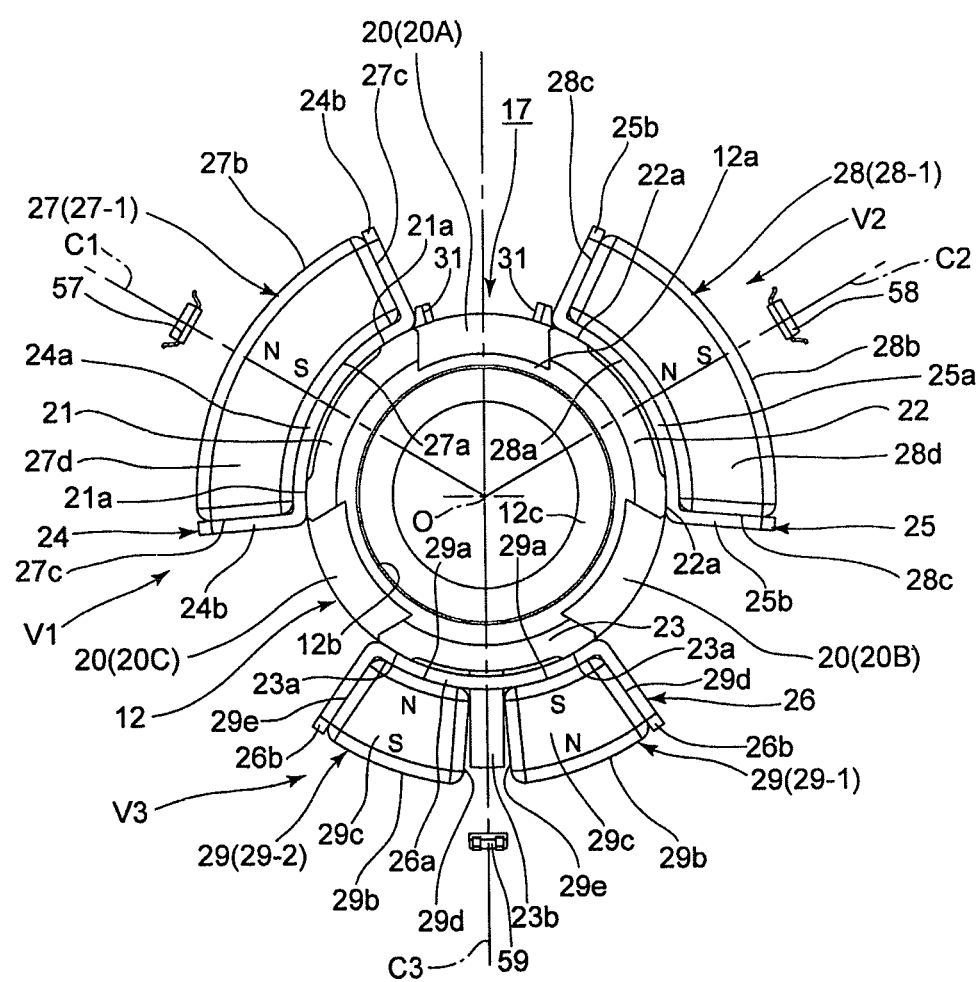
FIG. 40 is a front elevational view of the movable unit and Hall sensors, illustrating the positional relationship therebetween.

As shown in FIGS. 1, 2, 6 through 11, 25 through 29, 31 and 32, a Hall sensor (first magnetic sensor) 57 is provided inside the sensor support recess 51b of the coil support plate 51, a Hall sensor (second magnetic sensor) 58 is provided inside the sensor support recess 52b of the coil support plate 52, and a Hall sensor (third magnetic sensor) 59 is provided inside the sensor support recess 53b of the coil support plate 53. The Hall sensors 57, 58 and 59 are fixed to the bases of the sensor support recesses 51b, 52b and 53b, respectively. The sensor support recesses 51b, 52b and 53b are recesses which are open radially outwards and recessed using the internal spaces of the coil support projections 51a, 52a and 53a that project radially inwards. Accordingly, the Hall sensors 57, 58 and 59, which are installed inside the sensor support recesses 51b, 52b and 53b, are supported in a state of being housed in the hollow spaces of the coils 54, 55 and 56, respectively (see FIGS. 9, 34 and 37 through 39). As shown in FIGS. 34 and 40, the Hall sensors 57, 58 and 59 in this supported state are positioned at substantially equi-angular intervals (intervals of 120 degrees) in the circumferential direction and lie on an imaginary cylindrical surface R5 (see FIG. 42) which is centered on the optical axis O (the radial distances of the Hall sensors 57, 58 and 59 from the optical axis O are substantially the same).

Figure 29:
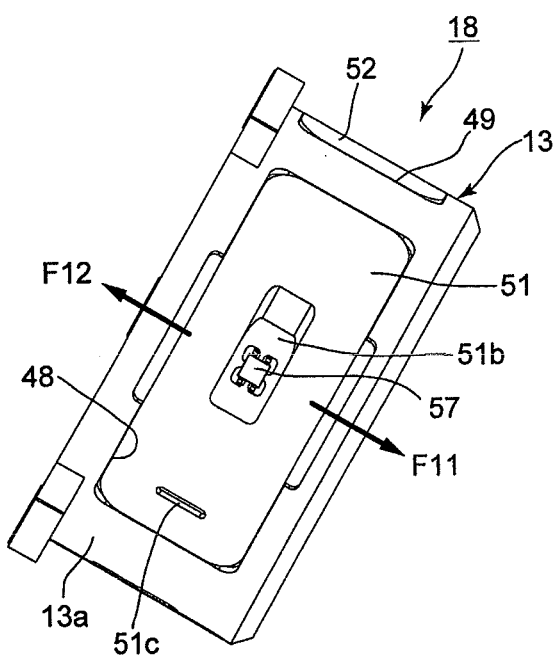
FIG. 29 is a plan view taken in the direction of the arrow XXIX shown in FIG. 26.
Figure 31:
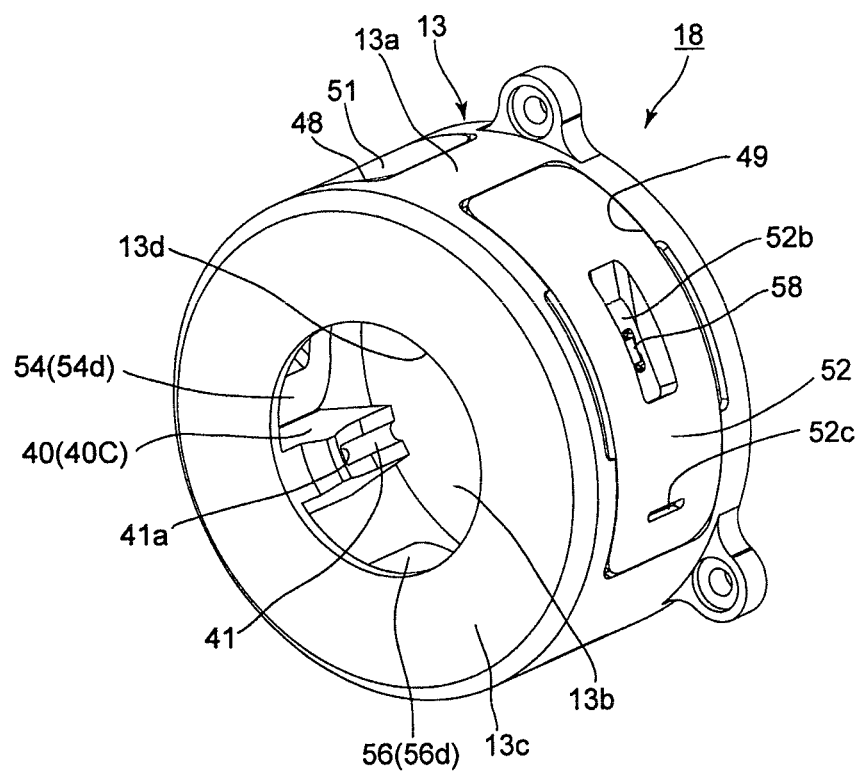
FIG. 31 is a front perspective view of the stationary unit.
Figure 32:
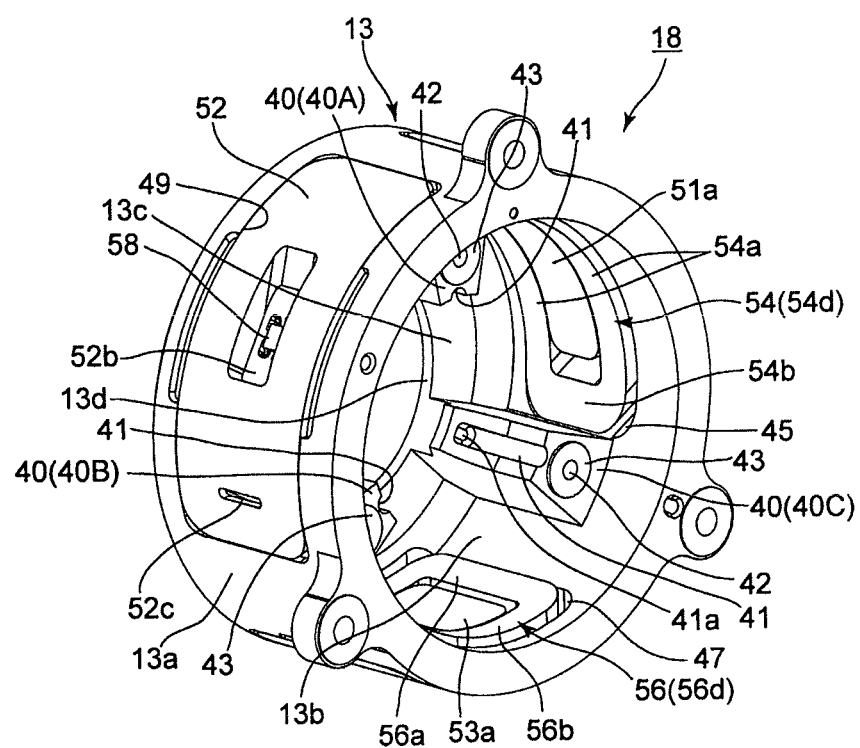
FIG. 32 is a rear perspective view of the stationary unit.

Mounting the first coil 54, the second coil 55 and the third coil 56 and the three Hall sensors 57, 58 and 59 to the coil holder 13 via the three coil support plates 51, 52 and 53 completes the stationary unit 18 that is made as a subassembly shown in FIGS. 29, 31 and 32.

The movable unit 17 (the barrel holder 12) is positioned in the axial through-portion 13b of the stationary unit 18 (the coil holder 13 thereof) to be supported thereby via three fixed-position balls (supporters) 61 and three biasing balls (supporters) 62 (see FIGS. 5 and 9 through 11). The three fixed-position balls 61 and the three biasing balls 62 are all the same metal balls that are substantially identical in diameter. One fixed-position ball 61 and one biasing ball 62 are inserted into each of the three ball holding grooves 41 that are formed in the three support seats 40 (40A, 40B and 40C) of the coil holder 13, so that the barrel holder 12 is supported by the stationary unit 18 via a total of six balls: the three fixed-position balls 61 and the three biasing balls 62. Each fixed-position ball 61 is held in the associated ball holding groove 41 at the front end thereof, at which the front restriction wall 41a is formed, while each biasing ball 62 is held in the associated ball holding groove 41 in the vicinity of the rear end thereof. The diameters of each fixed-position ball 61 and each biasing ball 62 are substantially identical to the width of each ball holding groove 41, which prevents each fixed-position ball 61 and each biasing ball 62 from moving in the circumferential direction relative to the associated ball holding groove 41.

The movable unit 17 is inserted into the axial through-portion 13b of the coil holder 13 with the positions of the three swing guide surfaces 20A, 20B and 20C made coincident with the positions of the three support seats 40A, 40B and 40C with respect to the circumferential direction, respectively (i.e., with the three swing guide surfaces 20A, 20B and 20C made to radially face the three support seats 40A, 40B and 40C, respectively). Thereupon, the swing guide surface 20A comes into contact with the fixed-position ball 61 and the biasing ball 62 which are supported in the ball holding groove 41 of the support seat 40A, the swing guide surface 20B comes into contact with the fixed-position ball 61 and the biasing ball 62 which are supported in the ball holding groove 41 of the support seat 40B, and the swing guide surface 20C comes into contact with the fixed-position ball 61 and the biasing ball 62 which are supported in the ball holding groove 41 of the support seat 40C.

In this state, the three fixed-position balls 61 are sandwiched between the three swing guide surfaces 20A, 20B and 20C and the base surfaces of the ball holding grooves 41 of the three support seats 40A, 40B and 40C, respectively, and the three fixed-position balls 61 engage with the front restriction walls 41a of the corresponding ball holding grooves 41. Accordingly, the three fixed-position balls 61 are prevented from moving in the optical axis direction and in the radial direction (namely, the positions of the three fixed-position balls 61 are determined in the optical axis direction and in the radial direction). More specifically, as can be seen from FIG. 9, the three fixed-position balls 61 are prevented from moving radially outwards by the base surfaces of the ball holding grooves 41 of the three support seats 40A, 40B and 40C and are prevented from moving forward in the optical axis direction by the front restriction walls 41a of the ball holding grooves 41 of the three support seats 40A, 40B and 40C. The area of each swing guide surface 20A, 20B and 20C which faces a front half of the ball holding groove 41 of the associated support seats 40A, 40B or 40C in the optical axis direction is inclined radially outwards in the direction from front to rear in the optical axis direction (see FIGS. 9 and 22). Therefore, the fixed-position balls 61 are prevented from moving radially inwards and also rearward in the optical axis direction by the swing guide surfaces 20A, 20B and 20C. In other words, three wedge-shaped spaces, the radial widths of which reduce with respect to the direction from front to rear in the optical axis direction are defined by the swing guide surfaces 20A, 20B and 20C, the front restriction walls 41a and the bottom surfaces of the ball holding grooves 41 of the three support seats 40A, 40B and 40C, and the three fixed-position ball 61 are inserted into the three wedge-spaced spaces in a state where movements of the three fixed-position balls 61 are restricted. As described above, each fixed-position ball 61 is held at a fixed position, at which each fixed-position ball 61 is prevented from moving in any of the optical axis direction, the circumferential direction and the radial direction. Whereas, each fixed-position ball 61 is allowed to roll at this fixed position (rotate on the spherical center thereof with this spherical center maintained at this fixed position).

The area of each swing guide surface 20A, 20B and 20C which faces a rear half of the ball holding groove 41 of the associated support seats 40A, 40B or 40C in the optical axis direction is inclined radially outwards in the direction from rear to front in the optical axis direction (see FIGS. 9 and 22). Accordingly, each swing guide surface 20A, 20B and 20c is formed so that the front and rear portions thereof, with which one fixed-position ball 61 and one biasing ball 62 are in contact, are opposite in inclination direction to each other. Therefore, in a state where the three biasing balls 62 are sandwiched between the three swing guide surfaces 20A, 20B and 20C and the base surfaces of the ball holding grooves 41 of the three support seats 40A, 40B and 40C, respectively, the three biasing balls 62 are prevented from moving radially outwards by the base surfaces of the corresponding ball holding grooves 41 and are further prevented from moving radially inwards and forward in the optical axis direction by the three swing guide surfaces 20A, 20B and 20C. However, since each biasing ball 62 is positioned in the vicinity of the rear opening of the associated ball holding groove 41, each biasing ball 62 is exposed rearwardly and thus is not prevented from moving rearward in the optical axis direction at a stage at which the ball holder 14 is not yet mounted to the stationary unit 18 (specifically to the coil holder 13 thereof) (see FIG. 5).

The ball holder 14 is fitted into the axial through-hole 13b to be mounted to the coil holder 13. As shown in FIGS. 9 through 11, the ball holder 14 is in the shape of a disk having a diameter allowing the ball holder 14 to be fitted into the inner peripheral portion of the axial through-portion 13b. The ball holder 14 is provided with a center opening 14a, a plate-like lid portion 14b and a ring-shaped outer peripheral flange 14c. The center opening 14a is a circular opening formed at the center of the ball holder 14 in the radial direction, the lid portion 14b is formed to surround the radially outer side of the center opening 14a, and the outer peripheral flange 14c is a ring-shaped flange which projects forward in the optical axis direction from the outer edge of the lid portion 14b. The ball holder 14 is provided, on the front thereof at substantially equi-angular intervals (intervals of 120 degrees) in the circumferential direction, with three forward projections 65. A screw insertion hole 66 is formed in each forward projection 65 to extend therethrough in the optical axis direction, and each forward projection 65 is provided, on the front thereof at a position closer to the radially inner side (where the center opening 14a is formed) than the associated screw insertion hole 66, with a ball retaining surface 67 which faces forward. The ball holder 14 is further provided, in an annular area on the front of the lid portion 14b which surrounds the center opening 14a, with a tilting restriction surface 68. Each of the ball retaining surface 67 and the tilting restriction surface 68 is a flat surface substantially orthogonal to the optical axis O. As shown in FIG. 9, the inner diameter of each screw insertion hole 66 varies in three steps; more specifically, in each screw insertion hole 66 are formed a large-diameter portion 66a, a small-diameter portion 66b and an intermediate-diameter portion 66c between the large-diameter portion 66a and the small-diameter portion 66b. The large-diameter portion 66a has the largest inner diameter, the small-diameter portion 66b has the smallest inner diameter, and the intermediate-diameter portion 66c is larger in inner diameter than the small-diameter portion 66b and smaller in inner diameter than the large-diameter portion 66a. The large-diameter portion 66a and the small-diameter portion 66b are formed at the rearmost position and the frontmost position with respect to the optical axis direction, respectively, and the intermediate-diameter portion 66c is formed at a position between the rearmost position and the frontmost position in the optical axis direction.

The ball holder 14 is inserted into the axial through-portion 13b from the rear in the optical axis direction with the three front projections 65 facing (aligned with) the rear surfaces of the three support seats 40A, 40B and 40C of the coil holder 13 in the optical axis direction, respectively. The three forward projections 65 which face the three support seats 40A, 40B and 40C in the optical axis direction are also referred to as the forward projections 65A, 65B and 65C, respectively. The ball holder 14 inserted into the axial through-portion 13b is fixed to the coil holder 13 with three set screws 69.

As shown in FIGS. 9 through 11, the three set screws 69 are each provided at one end with a screw portion (threaded portion) 69a and at the other end with a head 69b with a shaft portion (non-threaded portion) 69c which connects the screw portion 69a and the head 69b provided therebetween. The screw portion 69a has a male thread on the peripheral surface thereof. The diameter of the head 69b is greater than the inner diameter of the intermediate portion 66c and is smaller than the inner diameter of the large-diameter portion 66a, which are formed in the screw insertion hole 66 of the ball holder 14. The diameter of the shaft portion 69c is substantially identical to the inner diameter of the small-diameter portion 66b. The three set screws 69 are inserted into the three screw insertion holes 66 in the optical axis direction from the rear with the screw portion 69a pointing forward to bring the screw portion 69a into screw-engagement with the screw threads formed in the associated screw hole 42. As shown in FIG. 9, three cylindrical coil springs 70 are fitted into the intermediate portions 66c of the three screw insertion holes 66 to surround the shaft portions 69c of the three set screws 69, respectively, so that the front end of each coil spring 70 comes in contact with the stepped portion formed between the small-diameter portion 66b and the intermediate portion 66c of the associated screw insertion hole 66 and so that the rear end of each coil spring 70 comes in contact with the head 69b of the associated set screw 69. The greater the amount of engagement of the screw portion 69a of each set screw 69 with the screw threads formed in the associated screw hole 42, the more the associated coil spring 70 is compressed by pressure of the head 69b against the associated coil spring 70, which causes the ball holder 14 to be acted upon by a biasing force which tends to move the ball holder 14 forward in the optical axis direction by the coil spring 70 thus compressed.

The position of the set screw 69 shown in FIG. 9 at which the front end of the shaft portion 69c abuts against the associated abutment surface 43 of the coil holder 13 is the tightening limit position of the set screw 69 into the associated screw hole 42. In the state shown in FIG. 9, the ball retaining surface 67 of each front projection 65A, 65B and 65C of the ball holder 14 comes in contact with the associated biasing ball 62 from the rear, so that the three biasing balls 62 receive a forward biasing force in the optical axis direction that acts on the ball holder 14 from the coil springs 70. As shown in FIG. 9, in the vicinity of the rear ends of the ball holding grooves 41 into which the three biasing balls 62 are inserted, three wedge-shaped spaces are formed, the radial widths between the bottoms of the ball holding grooves 41 and the swing guide surfaces 20A, 20B and 20C of which reduce with respect to the direction from rear to front in the optical axis direction; each biasing ball 62 which is acted upon by a biasing force from the associated ball retaining surface 67 is pressed toward the narrow end of the associated wedge-shaped space, thus being supported stably in each of the optical axis direction and the radial direction. In addition, each biasing ball 62 is prevented from coming off rearwardly from the associated ball holding groove 41 by the associated ball retaining surface 67. To ensure engagement between each biasing ball 62 and the associated ball retaining surface 67, a slight clearance is secured in the optical axis direction between the front surface of each forward projecting portion 65A, 65B and 65C and the associated abutment surface 43. Additionally, a slight clearance in the optical axis direction is provided between the head 69b of each set screw 69 and the stepped portion formed between the large-diameter portion 66a and the intermediate portion 66c of the associated screw insertion hole 66. Therefore, the position of the ball holder 14 in the optical axis direction and the inclination of the ball holder 14 with respect to the optical axis O are allowed to vary slightly within the forward/rearward range defined by the abutment surfaces 43 and the heads 69b, which makes it possible to absorb variations in position of the three biasing balls 62, thus making it possible to stably support the three biasing balls 62.

The movable unit 17 (the barrel holder 12), which is supported inside the axial through-portion 13b of the stationary unit 18 (the coil holder 13) via the three fixed-position balls 61 and the three biasing balls 62 as described above, can perform a universal rotation operation in which the movable unit 17 (together with the lens barrel 11) rotates (spherically swings) in any rotational direction about the spherical-swinging center Q, which is the center of a spherical surface in which the swing guide surfaces 20A, 20B and 20C lie, while varying the contact points of the three swing guide surfaces 20A, 20B and 20C with the three fixed-position balls 61 and the three biasing balls 62. In this rotating operation of the movable unit 17 (the barrel holder 12), each fixed-position ball 61 and each biasing ball 62 can roll in accordance with variations in position of the swing guide surfaces 20A, 20B and 20C, or the swing guide surfaces 20A, 20B and 20C can slide without causing each fixed-position ball 61 and each biasing ball 62 to roll. In either case, the movable unit 17 can be made to operate smoothly with low resistance since each swing guide surface 20A, 20B and 20C and the associated fixed-position ball 61 and biasing ball 62 are in point contact with each other.

The lens barrel 11 is fitted into the barrel holder 12, which constitutes an element of the movable unit 17, to be fixedly supported by the barrel holder 12. The lens barrel 11 is a cylindrical body which holds an imaging optical system L thereinside (see FIG. 9) which includes a plurality of lens elements. As shown in FIGS. 9 through 11, the diameter of the lens barrel 11 changes in a stepwise manner with respect to the optical axis direction. The lens barrel 11 is provided with a large-diameter portion 11a, which is the largest in diameter, at the frontmost end of the lens barrel 11; an intermediate-diameter portion 11b, which is smaller in diameter than the large-diameter portion 11a, behind the large-diameter portion 11a; and a small-diameter portion 11c, which is the smallest in diameter, at the rearmost end of the lens barrel 11.

The lens barrel 11 is inserted into the axial through-portion 12b of the barrel holder 12 from front with the small-diameter portion 11c facing rearward, and further insertion of the lens barrel 11 into the axial through-portion 12b is prevented by the stepped portion provided between the intermediate portion 11b and the small-diameter portion 11c engaging with the front of the insertion restriction flange 12c of the barrel holder 12 (see FIG. 9). In this state, as shown in FIGS. 1, 2, 6 through 9, 23 and 24, the small-diameter portion 11c projects rearward from the barrel holder 12 through the inside of the insertion restriction flange 12c, while the large-diameter portion 11a is positioned in front of the barrel holder 12 in the optical axis direction, without being inserted into the axial through-portion 12b. The lens barrel 11 is provided, on the outer peripheral surface of the small-diameter portion 11c that projects rearward from the barrel holder 12, with a peripheral screw (male thread portion) 11d (see FIGS. 9 through 11), and a retainer ring 15 is screwed onto the peripheral screw 11d. The retainer ring 15 is a ring-shaped body provided on the inner peripheral surface thereof with a female screw thread which is screw-engaged with the peripheral screw 11d, and the lens barrel 11 is secured to the barrel holder 12 by tightening the retainer ring 15 until it abuts against the rear surface of the insertion restriction flange 12c. As shown in FIG. 9, the center opening 14a of the ball holder 14 is greater in diameter than the retainer ring 15, so that the retainer ring 15 is allowed to be attached and detached to and from the small-diameter portion 11c through the center opening 14a after the ball holder 14 is mounted to the coil holder 13.

The large-diameter portion 11a of the lens barrel 11 and the barrel holder 12 are larger than the center opening 13d of the front wall 13c of the coil holder 13 in the radial direction (i.e., the large-diameter portion 11a and the barrel holder 12 cannot pass through the center opening 13d in the optical axis direction). Accordingly, the lens barrel 11 is allowed to be inserted into the axial through-portion 13b of the coil holder 13 from the front in the optical axis direction, and the barrel holder 12 is allowed to be inserted into the axial through-portion 13b of the coil holder 13 from rear in the optical axis direction. As a procedure of assembling the imaging apparatus 10, the following steps are performed: firstly mounting the ball holder 14 to the coil holder 13 after movable unit 17 containing the barrel holder 12 is inserted into the axial through-portion 13b of the coil holder 13 from the rear; subsequently inserting the lens barrel 11 into the axial through-portion 12b of the barrel holder 12 from the front; and thereafter screwing the retainer ring 15 onto the peripheral screw 11d through the center opening 14a of the ball holder 14 to fix the lens barrel 11 to the barrel holder 12. When the movable unit 17 is installed into the stationary unit 18 (to the coil holder 13), the circumferential position of the movable unit 17 relative to the coil holder 13 is set so that the support seat 40A is positioned between the pair of rolling-range limit projections 31. In addition, the three fixed-position balls 61 are inserted into the three ball holding grooves 41 before the movable unit 17 is inserted into the axial through-portion 13b of the coil holder 13, and following the insertion of the movable unit 17 into the axial through-portion 13b of the coil holder 13, the three biasing balls 62 are inserted into the rear ends of the three ball holding grooves 41, and the ball holder 14 is mounted to the coil holder 13.

In a state where the lens barrel 11 is inserted into the axial through-portion 12b of the barrel holder 12, the large-diameter portion 11a projects forward from the front of the coil holder 13, and the rear end of the small-diameter portion 11c projects rearward from the rear of the coil holder 13. In this state, an annular balancer 16 is mounted onto the outer periphery of the large-diameter portion 11a, and an image sensor unit 19 is mounted to the rear end of the small-diameter portion 11c. The lens barrel 11 and the movable unit 17 integrally perform the aforementioned universal rotation operation, in which the lens barrel 11 and the movable unit 17 integrally rotate in any rotational direction about the spherical-swinging center Q. Providing the balancer 16 at the front end of the lens barrel 11 achieves an optimum weight balance with respect to the image sensor unit 19, installed at the rear end of the lens barrel 11, so that the center of gravity of the movable portion consisting of the lens barrel 11 and the movable unit 17 substantially coincides with the spherical-swinging center Q.

The image sensor unit 19 is provided with an image sensor (image pickup device) 19a (see FIG. 9). The light receiving surface of the image sensor 19a is positioned on the optical axis O and lies orthogonal thereto. An object image obtained through the imaging optical system L is converted into an electrical signal by the image sensor 19a, and the image signal thus obtained is transmitted to a control circuit 71 (conceptually shown in FIG. 9), which controls the overall operation of the imaging apparatus 10, via a flexible wiring board 19b. The control circuit 71 performs an image-signal processing operation to display the object image on a display (not shown) and store the image data in memory. In addition, a signal from an apparatus-attitude detecting sensor 72 (see FIG. 9) which detects the attitude of the imaging apparatus 10 is input to the control circuit 71.

The installation of each coil 54, 55 and 56 and each Hall sensor 57, 58 and 59 to the coil holder 13 can be carried out at an arbitrary stage before or after the movable unit 17 and the and the lens barrel 11 are mounted to the coil holder 13. As described above, the coils 54, 55 and 56 are inserted into the through-holes 45, 46 and 47 by fixedly fitting the coil support plates 51, 52 and 53 (to which the coils 54, 55 and 56 are mounted) into the support recesses 48, 49 and 50 with an adhesive or the like, respectively. The inner peripheral surface 54d of the first coil 54 that is exposed to the inside of the axial through-hole 13b of the coil holder 13 through the through-hole 45 is positioned to face the outer peripheral surfaces 27b of the permanent magnets 27-1 and 27-2 of the first magnetic unit 27 that constitutes a component of the movable unit 17. Likewise, the inner peripheral surface 55d of the second coil 55 that is exposed to the inside of the axial through-hole 13b of the coil holder 13 through the through-hole 46 is positioned to face the outer peripheral surfaces 28b of the permanent magnets 28-1 and 28-2 of the second magnetic unit 28 that constitutes a component of the movable unit 17, and the inner peripheral surface 56d of the third coil 56 that is exposed to the inside of the axial through-hole 13b of the coil holder 13 through the through-hole 47 is positioned to face the outer peripheral surfaces 29b of the permanent magnets 29-1 and 29-2 of the third magnetic unit 29 that constitutes a component of the movable unit 17. FIGS. 35 through 41 show the positional relationship between each magnet unit 27, 28 and 29, each coil 54, 55 and 56 and each Hall sensor 57, 58 and 59 in the imaging apparatus 10 in the initial state thereof, in which an anti-shake driving operation is not performed. As can be seen from FIGS. 35 through 41, the first coil 54 and the first magnet unit 27 that radially face each other constitute a first actuator V1, the second coil 55 and the second magnet unit 28 that radially face each other constitute a second actuator V2, and the third coil 56 and the third magnet unit 29 that radially face each other constitute a third actuator V3.

Figure 35:
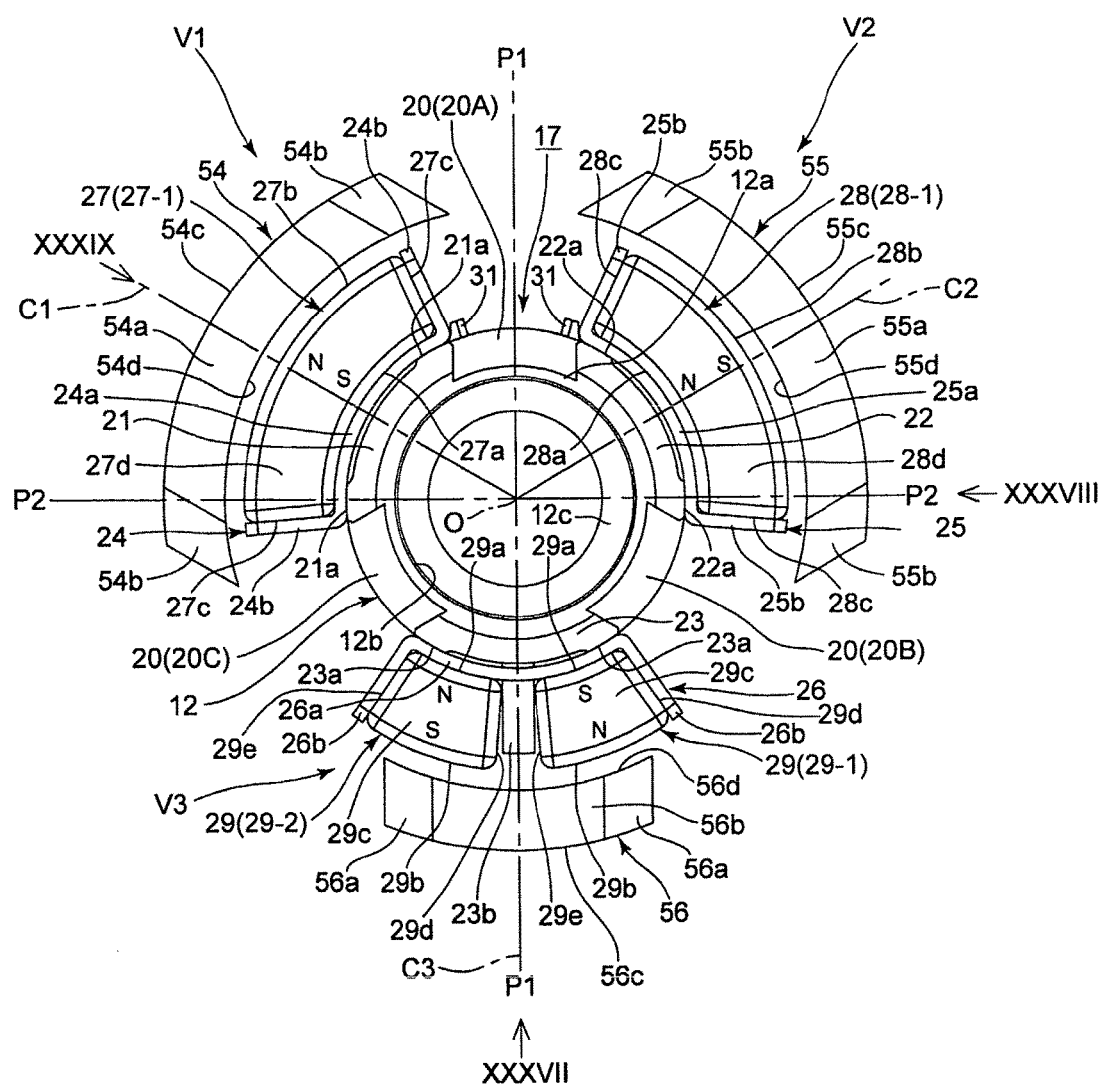
FIG. 35 is a front elevational view of the movable unit and coils, illustrating the positional relationship therebetween.

FIGS. 35 and 40 show center lines C1, C2 and C3 of the actuators V1, V2 and V3 that illustrate the positional relationship between the actuators VI, V2 and V3. The center line C1 of the first actuator V1 is a straight line which extends radially outwards from the optical axis O and passes through the centers (the centers with respect to the circumferential direction and the optical axis direction) of the yoke 24, the first magnet unit 27 and the first coil 54, and the center of the Hall sensor 57 is positioned on the center line C1. The center line C2 of the second actuator V2 is a straight line which extends radially outwards from the optical axis O and passes through the centers (the centers in the circumferential direction and the optical axis direction) of the yoke 25, the second magnet unit 28 and the second coil 55, and the center of the Hall sensor 58 is positioned on the center line C2. The center line C3 of the third actuator V3 is a straight line which extends radially outwards from the optical axis O and passes through the centers (the centers in the circumferential direction and the optical axis direction) of the yoke 26, the third magnet unit 29 and the third coil 56, and the center of the Hall sensor 59 is positioned on the center line C3. The center angle between the center lines C1 and C2, the center angle between the center lines C2 and C3 and the center angle between the center lines C3 and C1 are all 120 degrees.

The yoke 24 and the first magnet unit 27 together form a magnetic circuit in the first actuator V1, the yoke 25 and the second magnet unit 28 together form a magnetic circuit in the second actuator V2, and the yoke 26 and the third magnet unit 29 together form a magnetic circuit in the third actuator V3. The yoke 24 surrounds the first magnet unit 27 with the base wall 24a and the pair of standing walls 24b, and the ends of the pair of standing walls 24b are directed to the coil 54, which is positioned on the radially outside of the yoke 24, to concentrate magnetic field lines of the first magnetic unit 27 on the coil 54 side (on the area between the outer peripheral surface 27b and the ends of the pair of standing walls 24b) to thereby amplify the magnetic force acting on the coil 54. Likewise, the yoke 25 surrounds the second magnet unit 28 with the base wall 25a and the pair of standing walls 25b, and the ends of the pair of standing walls 25b are directed to the coil 55, which is positioned on the radially outside of the yoke 25, to concentrate magnetic field lines of the second magnetic unit 28 on the coil 55 side (on the area between the outer peripheral surface 28b and the ends of the pair of standing walls 25b) to thereby amplify the magnetic force acting on the coil 55, and the yoke 26 surrounds the third magnet unit 29 with the base wall 26a and the pair of standing walls 26b, and the ends of the pair of standing walls 26b are directed to the coil 56, which is positioned on the radially outside of the yoke 26, to concentrate magnetic field lines of the third magnetic unit 29 on the coil 56 side (on the area between the outer peripheral surface 29b and the ends of the pair of standing walls 26b) to thereby amplify the magnetic force acting on the coil 56. As mentioned above, the yokes 24, 25 and 26 have the additional capability of holding the magnetic units 27, 28 and 29, respectively.

The Hall sensors 57, 58 and 59 are positioned with a slight clearance from the outer peripheral surfaces 27b, 28b and 29b of the first, second and third magnetic units 27, 28 and 29 in the radial direction (specifically in the radial directions of the center lines C1, C2 and C3) by installation of the coil support plates 51, 52 and 53 into the sensor support recesses 51*b*, 52*b* and 53*b*, respectively (see FIGS. 9, 34 and 40). As shown in FIGS. 33, 34 and 37 through 40, each Hall sensor 57, 58 and 59 is positioned at substantially the center of the associated coil 54, 55 or 56 in the long-side direction and the short-side direction (the center of the outer shape of the associated coil 54, 55 or 56 in a plan view as viewed along a radially-extending straight line). Variations of the magnetic field in the first actuator V1 (the first magnet unit 27) are detected with the Hall sensor 57, variations of the magnetic field in the second actuator V2 (the second magnet unit 28) are detected with the Hall sensor 58 and variations of the magnetic field in the third actuator V3 (the third magnet unit 29) are detected with the Hall sensor 59. Since the sensor support recesses 51*b*, 52*b* and 53*b* are recessed using the internal spaces of the coil support projections 51*a*, 52*a* and 53*a* that project radially inwards, the Hall sensors 57, 58 and 59 can be disposed in a superior space-efficient manner. In addition, it is possible to enhance the detection accuracy by positioning the Hall sensors 57, 58 and 59 close to the first, second and third magnet units 27, 28 and 29, respectively.

The imaging apparatus 10 is provided on the outer peripheral surfaces of the coil support plates 51, 52 and 53 with a flexible wiring board (not shown). This flexible wiring board is provided with a sensor connecting portion which is connected to the Hall sensors 57, 58 and 59 and a coil connecting portion which is connected to the first, second and third coils 54, 55 and 56 through the through-holes 51*c*, 52*c* and 53*c*, respectively. This flexible wiring board is connected to the control circuit 71 (see FIG. 9) so that magnetic field information obtained from the Hall sensors 57, 58 and 59 is transmitted to the control circuit 71 via this flexible wiring board, and the attitude of the lens barrel 11 that is held by the movable unit 17 is detected based on the aforementioned magnetic field information obtained from the Hall sensors 57, 58 and 59. In addition, the power distribution to the first coil 54, the second coil 55 and the third coil 56 is controlled by the control circuit 71. Although the electrical connections of only the third coil 56 and the Hall sensor 59 to the control circuit 71 are shown in FIG. 9, the first coil 54 and the second coil 55 and the Hall sensors 57 and 58 are also electrically connected to the control circuit 71 in a like manner.

In the first actuator V1, the longitudinal direction of each long-side portion 54*a* of the first coil 54 and the longitudinal direction of each permanent magnet 27-1 and 27-2 of the first magnet unit 27 coincide with the circumferential direction, the front long-side portion 54*a* and the permanent magnet 27-1 radially face each other, and the rear long-side portion 54*a* and the permanent magnet 27-2 radially face each other. Since each of the permanent magnets 27-1 and 27-2 is magnetized as shown in FIGS. 13, 15 through 17, 35, 36, 40 and 41, energizing the first coil 54 causes a driving force to be generated in either of opposite directions substantially orthogonal to both the direction of the passage of electric current through the pair of long-side portions 54*a* of the first coil 54 and the direction of the magnetic field of the permanent magnets 27-1 and 27-2 around the pair of long-side portions 54*a* according to Fleming's left-hand rule. This driving force generated by the first actuator V1 is conceptually shown by arrows F11 and F12 in FIGS. 6, 18, 21, 29 and 39. The direction of action of the driving force is switched between the directions of the arrows F11 and F12 depending on the direction of the passage of electric current through the first coil 54. In the first actuator V1, the longitudinal direction of the first magnet unit 27 (the permanent magnets 27-1 and 27-2) and the pair of long-side portions 54*a* of the first coil 54 extend in the circumferential direction, which makes it possible to efficiently generate the driving forces F11 and F12.

In the second actuator V2, the longitudinal direction of each long-side portion 55*a* of the second coil 55 and the longitudinal direction of each permanent magnet 28-1 and 28-2 of the second magnet unit 28 substantially align with the circumferential direction, the front long-side portion 55*a* and the permanent magnet 28-1 radially face each other, and the rear long-side portion 55*a* and the permanent magnet 28-2 radially face each other. Since each of the permanent magnets 28-1 and 28-2 is magnetized as shown in FIGS. 13, 15 through 17, 35, 36, 40 and 41, energizing the second coil 55 causes a driving force to be generated in either of opposite directions substantially orthogonal to both the direction of the passage of electric current through the pair of long-side portions 55*a* of the second coil 55 and the direction of the magnetic field of the permanent magnets 28-1 and 28-2 around the pair of long-side portions 55*a* according to Fleming's left-hand rule. This driving force generated by the second actuator V2 is conceptually shown by arrows F21 and F22 in FIGS. 6, 8, 18, 20 and 38. The direction of action of the driving force is switched between the directions of the arrows F21 and F22 depending on the direction of the passage of electric current through the second coil 55. In the second actuator V2, the longitudinal direction of the second magnet unit 28 (the permanent magnets 28-1 and 28-2) and the pair of long-side portions 55*a* of the second coil 55 extend in the circumferential direction, which makes it possible to efficiently generate the driving forces F21 and F22.

In the third actuator V3, the longitudinal direction of each axially-extending portion 56*a* of the third permanent magnet 56 and the longitudinal direction of each permanent magnet 29-1 and 29-2 of the third magnet unit 29 substantially align with the optical axis direction, one of the axially-extending portions 56*a* and the permanent magnet 29-1 radially face each other, and the other axially-extending portion 56*a* and the permanent magnet 29-2 radially face each other. Since each of the permanent magnets 29-1 and 29-2 is magnetized as shown in FIGS. 13, 15 through 17, 35, 36, 40, 41 and 42, energizing the third coil 56 causes a driving force to be generated in either of opposite directions substantially orthogonal to both the direction of the passage of electric current through the pair of axially-extending portions 56*a* of the third coil 56 and the direction of the magnetic field of the permanent magnets 29-1 and 29-2 around the pair of axially-extending portions 56*a* according to Fleming's left-hand rule. This driving force generated by the third actuator V3 is conceptually shown by arrows F31 and F32 in FIGS. 7, 8, 19, 20, 33, 37 and 38. The direction of action of the driving force is switched between the directions of the arrows F31 and F32 depending on the direction of the passage of electric current through the third coil 56. In the third actuator V3, the longitudinal direction of the permanent magnets 29-1 and 29-2 of the third magnet unit 29 and the pair of axially-extending portions 56*a* of the third coil 56 extend in the optical axis direction, not the circumferential direction, which makes it possible to efficiently generate the driving forces F31 and F32 in the rolling direction.

Since each coil 54, 55 and 56 is fixedly supported by the coil holder 13, the driving force of each actuator V1, V2 and V3 acts as a force to move the movable unit 17 that includes the first, second and third magnetic units 27, 28 and 29. The movable unit 17 is supported to be freely rotatable about the spherical-swinging center Q as described above, and accordingly, the movable unit 17 and the lens barrel 11 perform a tilting operation which tilts the optical axis O about the spherical-swinging center Q by the driving forces F11 and F12 of the first actuator V1 and the driving forces F21 and F22 of the second actuator V2. For instance, an imaginary plane P1 (shown in FIGS. 3 and 35) which passes through the midpoint between the first actuator V1 and the second actuator V2 in the circumferential direction (the equidistant point between the center line C1 and the center line C2 in the circumferential direction) and includes the optical axis O before it is tilted and an imaginary plane P2 (shown in FIGS. 3 and 35) which is orthogonal to the imaginary plane P1 and includes the optical axis O before it is tilted defined, and with the tilting of the movable unit 17 and the lens barrel 11 along the imaginary plane P1 defined as movement of the movable unit 17 and the lens barrel 11 in the pitching direction and with the tilting of the movable unit 17 and the lens barrel 11 along the imaginary plane P2 defined as movement of the movable unit 17 and the lens barrel 11 in the yawing direction, the movable unit 17 and the lens barrel 11 can be made to perform the tilting operation in all directions including the pitching direction and the yawing direction by the driving forces F11 and F12 of the first actuator V1 and the driving forces F21 and F22 of the second actuator V2.

In addition, the movable unit 17 and the lens barrel 11 can be made to perform a rolling operation, specifically a rotating operation about the optical axis O in the rolling direction (i.e., to vary the angle about the optical axis O in the circumferential direction) with the driving forces F31 and F32 of the third actuator V3. When the movable unit 17 and the lens barrel 11 are in a tilted state from the initial state thereof due to operations of the first actuator V1 and the second actuator V2, the rotating operation of the movable unit 17 and the lens barrel 11 is performed by driving force components of the driving forces F31 and F32 of the third actuator V3 in the rotating direction about the optical axis, which is tilted with respect to the coil holder 13.

Figure 15:
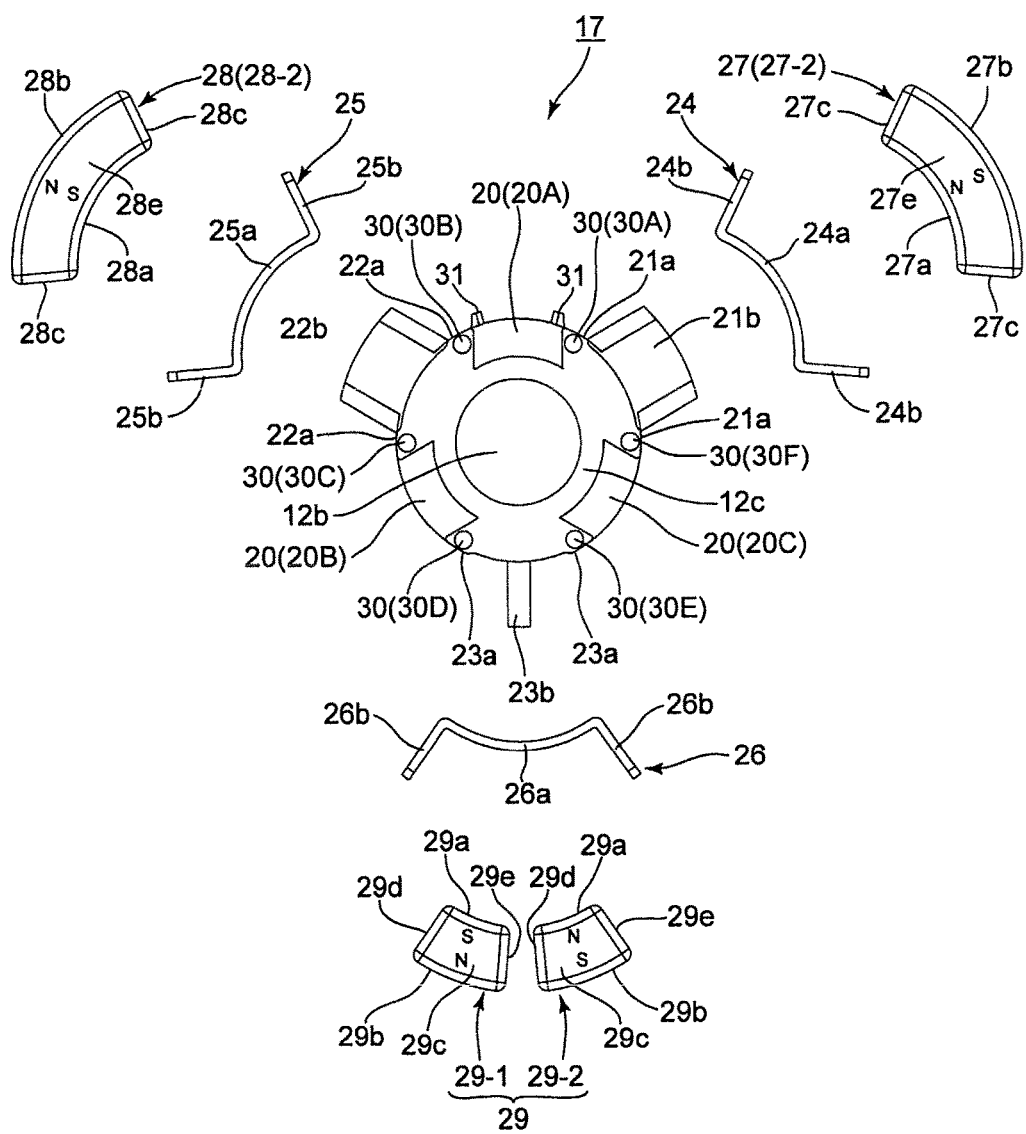
FIG. 15 is an exploded rear elevational view of the movable unit.
Figure 16:
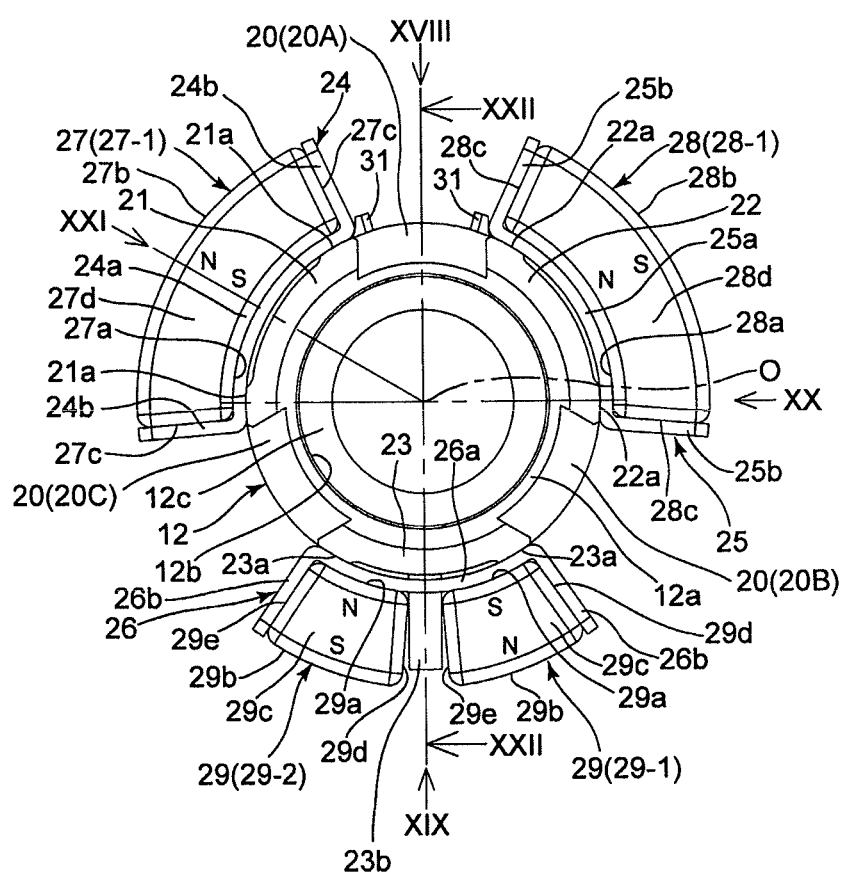
FIG. 16 is a front elevational view of the movable unit.
Figure 17:
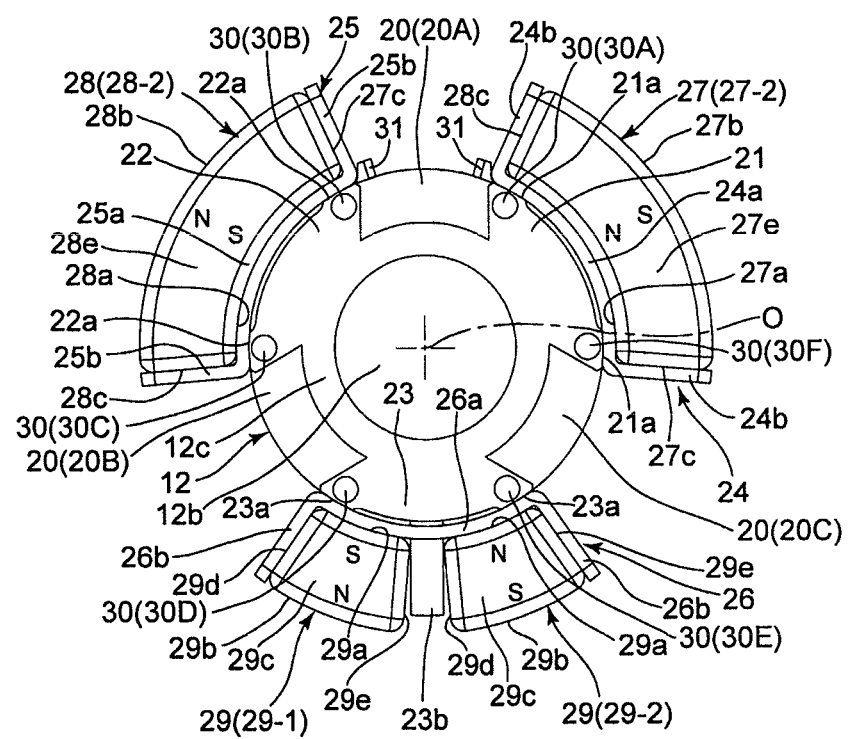
FIG. 17 is a rear elevational view of the movable unit.
Figure 18:
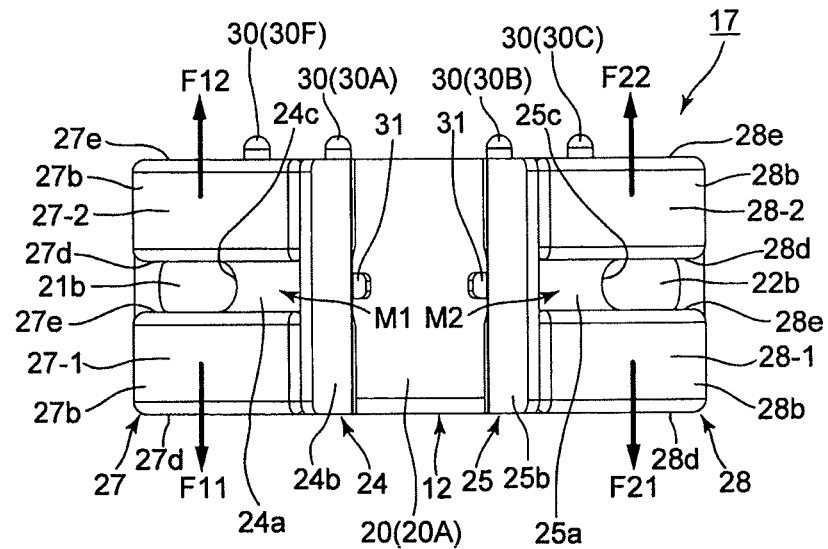
FIG. 18 is a plan view taken in the direction of the arrow XVIII shown in FIG. 16.
Figure 19:
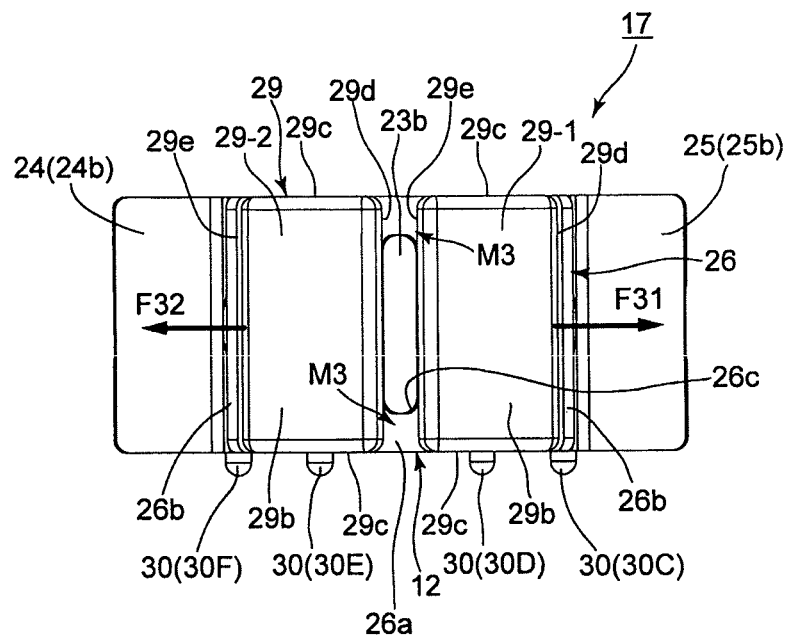
FIG. 19 is a plan view taken in the direction of the arrow XIX shown in FIG. 16.
Figure 20:
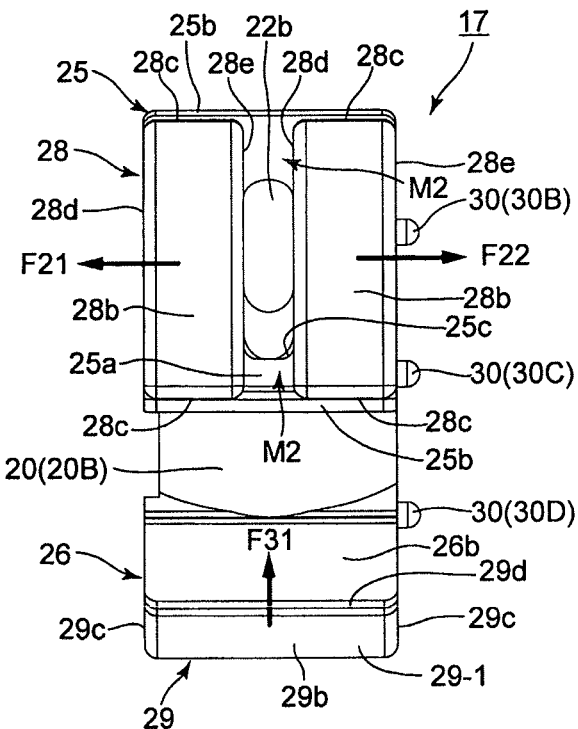
FIG. 20 is a plan view taken in the direction of the arrow XX shown in FIG. 16.
Figure 21:
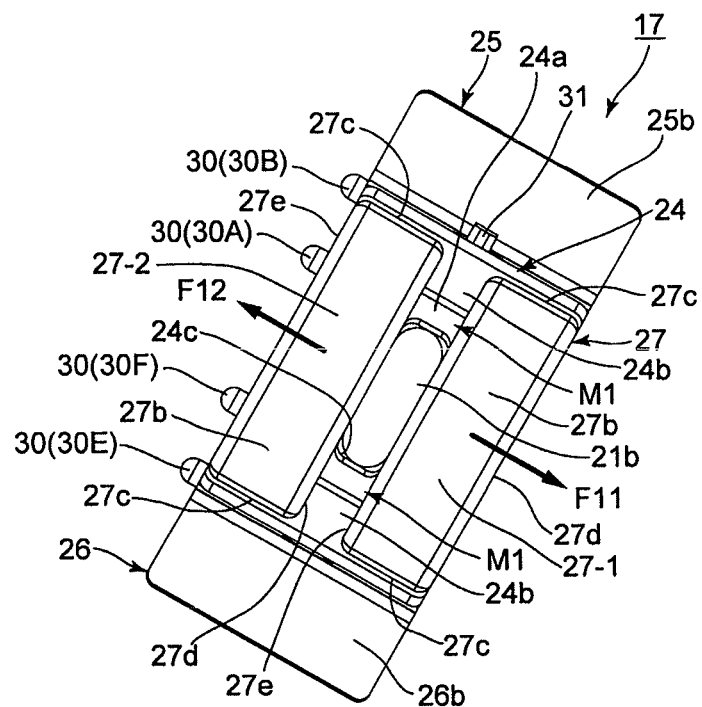
FIG. 21 is a plan view taken in the direction of the arrow XXI shown in FIG. 16.
Figure 36:
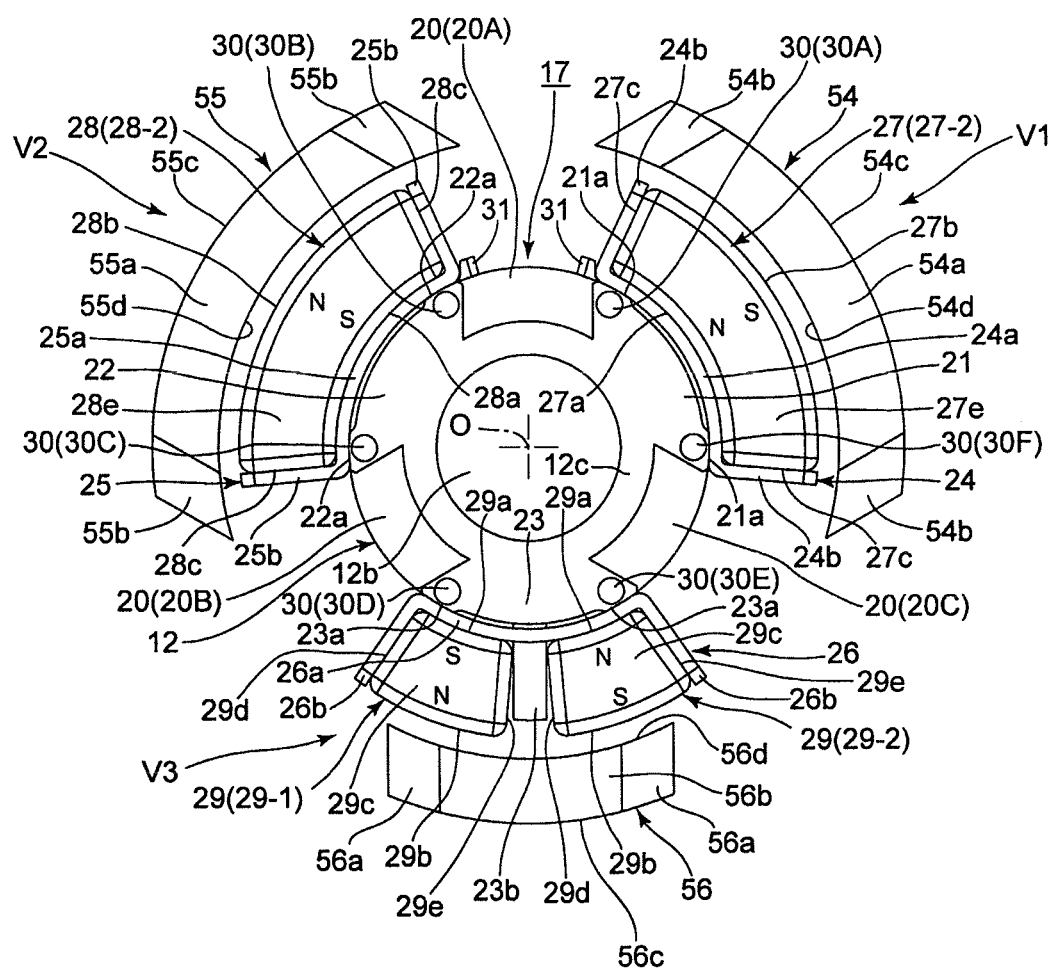
FIG. 36 is a rear elevational view of the movable unit and the coils, illustrating the positional relationship therebetween.

Upon the tilting operation of the movable unit 17 that includes components in the pitching direction and the yawing direction reaching a predetermined amount, one or two of the total of six tilting restriction projections 30A, 30B, 30C, 30D, 30E and 30F that are provided on the barrel holder 12 come into contact with the tilting restriction surface 68 of the ball holder 14 to mechanically prevent the movable unit 17 from further tilting. The radial distances of the six tilting restriction projections 30A, 30B, 30C, 30D, 30E and 30F from the optical axis O are substantially the same, and also the positions of the six tilting restriction projections 30A, 30B, 30C, 30D, 30E and 30F in the optical axis direction are the same. Additionally, the distances between the six tilting restriction projections 30A, 30B, 30C, 30D, 30E and 30F in the circumferential direction are substantially the same (i.e., the six tilting restriction projections 30A, 30B, 30C, 30D, 30E and 30F are arranged at substantially equi-angular intervals in the circumferential direction). In other words, as viewed along the optical axis O as shown in FIGS. 15, 17 and 36, connecting the center points between all adjacent pairs of the six tilting restriction projections 30A, 30B, 30C, 30D, 30E and 30F by straight lines forms a regular hexagon. This arrangement of the six tilting restriction projections 30A, 30B, 30C, 30D, 30E makes it possible to restrict the amount of tilting of the movable unit 17 to be substantially uniform, without biasing the amount of tilting of the movable unit 17 to a specific direction. Specifically when the movable unit 17 tilts along a plane which includes the optical axis O and passes through the equidistant point between adjacent two of the six tilting restriction projections 30A, 30B, 30C, 30D, 30E and 30F, both of these adjacent two tilting restriction projections 30 come into contact with the tilting restriction surface 68. For instance, when the movable unit 17 tilts along a plane including the center line C1 and the optical axis O, the pair of tilting restriction projections 30A and 30F or the pair of tilting restriction projections 30C and 30D come into contact with the tilting restriction surface 68. When the movable unit 17 tilts along a plane including the center line C2 and the optical axis O, the pair of tilting restriction projections 30B and 30C or the pair of tilting restriction projections 30E and 30F come into contact with the tilting restriction surface 68. When the movable unit 17 tilts along a plane (the imaginary plane P1) including the center line C3 and the optical axis O, the pair of tilting restriction projections 30A and 30B or the pair of tilting restriction projections 30D and 30E come into contact with the tilting restriction surface 68. In any of these states where two of the six tilting restriction projections 30 come into contact with the tilting restriction surface 68, a higher stability and accuracy of the movable unit 17 is achieved than when only one tilting restriction projection 30 comes into contact with the tilting restriction surface 68, and detection of the tilting operation using the Hall sensors 57, 58 and 59 (especially the Hall sensors 57 and 58) is initialized with reference to the mechanical moving ends (limits) of the above described tiltings of the movable unit 17 upon, e.g., actuation of the imaging apparatus 10 or upon the anti-shake capability being enabled from a disabled state. Since variation of magnetic flux density detected using the Hall sensors 57 and 58 is great especially when the movable unit 17 tilts along a plane including the center line C1 and the optical axis O (when the pair of tilting restriction projections 30A and 30F or the pair of tilting restriction projections 30C and 30D come into contact with the tilting restriction surface 68) and when the movable unit 17 tilts along a plane including the center line C2 and the optical axis O (when the pair of tilting restriction projections 30B and 30C or the pair of tilting restriction projections 30E and 30F come into contact with the tilting restriction surface 68), it is effective to perform the initialization in the tilting directions along these two planes.

Equal projecting amounts of the six tilting restriction projections 30A, 30B, 30C, 30D, 30E and 30F in the optical axis direction yields the advantage of facilitating the calculation of the amount of movement of the movable unit 17 (the lens barrel 11) and facilitates parts management. However, it is possible to make the projecting amounts of the six tilting restriction projections 30A, 30B, 30C, 30D, 30E and 30F in the optical axis direction mutually different.

Figure 5:
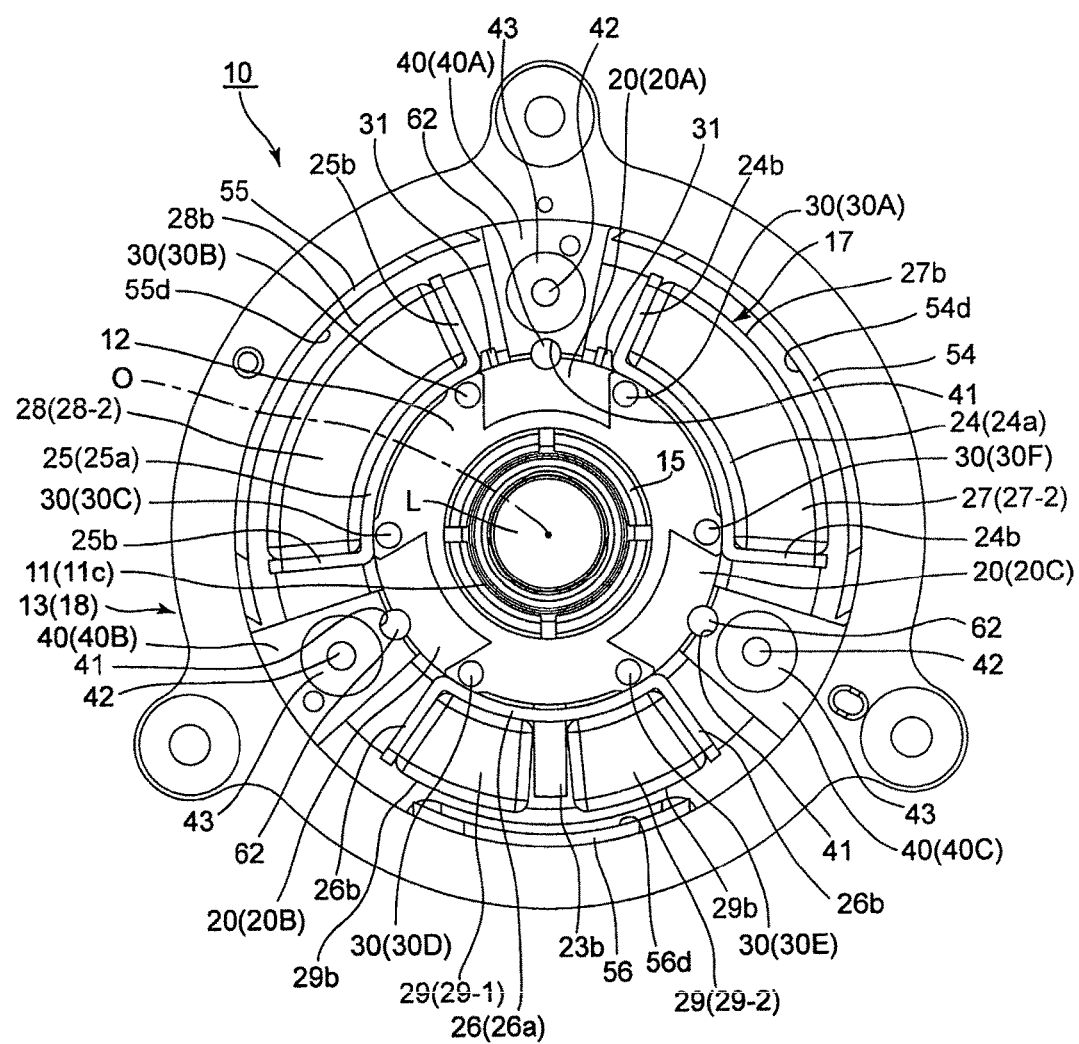
FIG. 5 is a rear elevational view of the imaging apparatus, from which a ball holder is removed for clarity of illustration.
Figure 6:
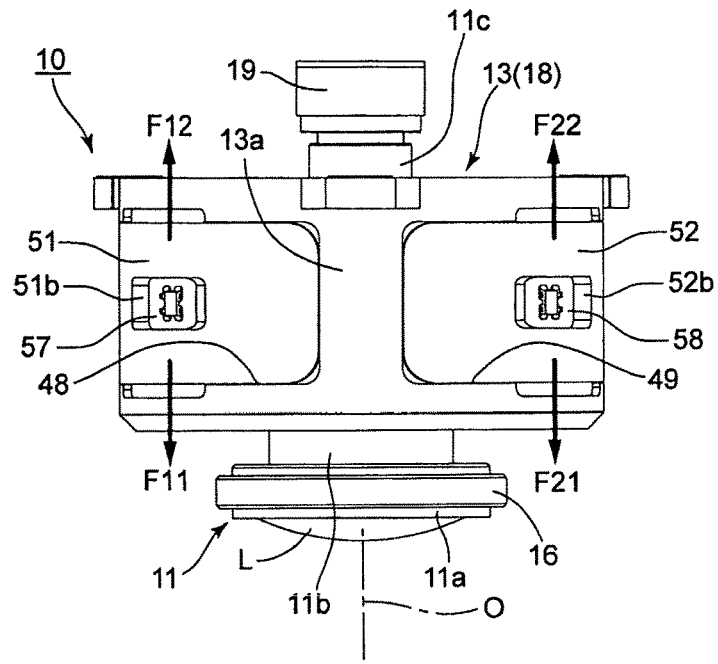
FIG. 6 is a plan view taken in the direction of the arrow VI shown in FIG. 3.
Figure 7:
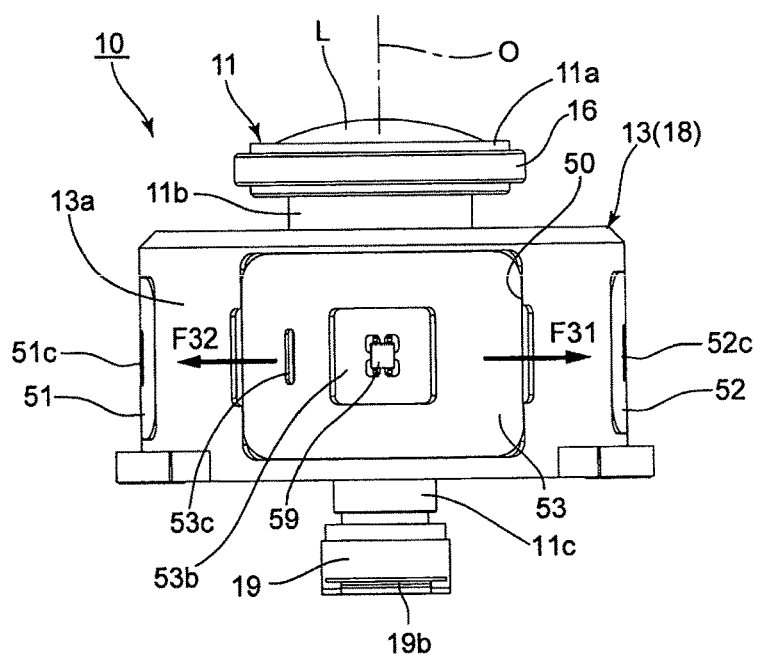
FIG. 7 is a plan view taken in the direction of the arrow VII shown in FIG. 3.
Figure 8:
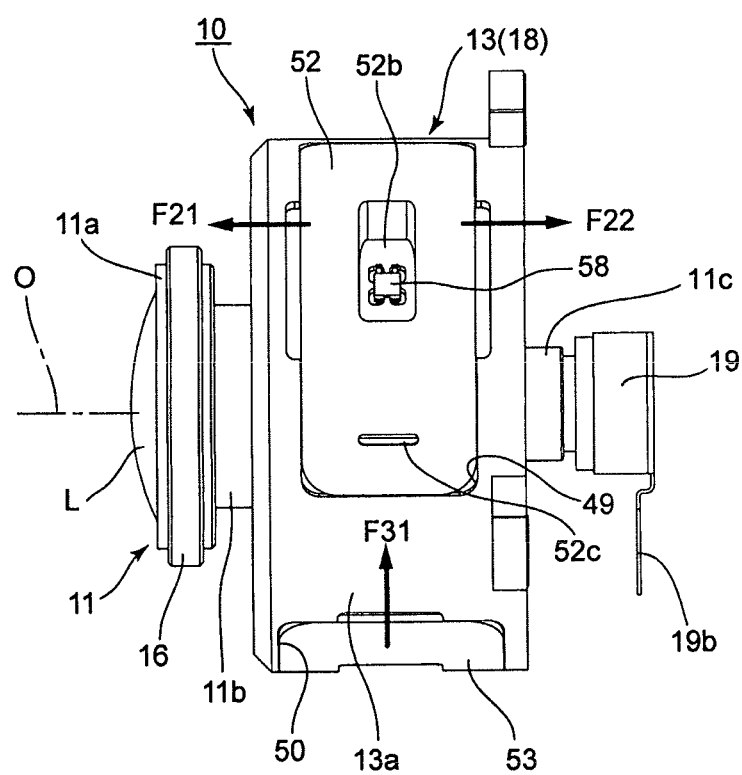
FIG. 8 is a plan view taken in the direction of the arrow VIII shown in FIG. 3.

When the movable unit 17 rotates in the rolling direction, the range of this rotation is limited by contact of one of the pair of rolling-range limit projections 31 (provided on the swing guide surface 20A of the barrel holder 12) with one of the opposite sides of the support seat 40A in the circumferential direction or by contact of the other rolling-range limit projection 31 with the other side of the support seat 40A in the circumferential direction. As shown in FIGS. 5 and 34, the distance between the pair of rolling-range limit projections 31 in the circumferential direction is greater than the width of the support seat 40A in the circumferential direction, and the distance between each rolling-range limit projection 31 and the support seat 40A in the circumferential direction corresponds to the movable amount of the movable unit 17 (the barrel holder 12) in the rolling direction. Upon, e.g., actuation of the imaging apparatus 10 or upon the anti-shake capability being enabled from a disabled state, an initialization operation of the detection by the Hall sensors 57, 58 and 59 (the Hall sensor 59 in particular) for the rolling operation is carried out with reference to the mechanical moving ends at which one and the other of the pair of rolling-range limit projections 31 come into contact with the support seat 40A, respectively.

As described above, the movable unit 17 and the lens barrel 11 can be made to produce motion including rolling, pitching and yawing motion (rotate about the spherical-swinging center Q) flexibly in any rotational direction using the three actuators: the first actuator V1, the second actuator V2 and the third actuator V3. This operation of the movable unit 17 and the lens barrel 11 makes it possible to vary the direction of the optical axis O (the inclination of the light receiving surface of the image sensor 19a) and the position of the image sensor 19a in the rotational direction about the optical axis O. For instance, when vibrations caused by hand shake are exerted on the imaging apparatus 10, an anti-shake (image shake correction/image stabilizing/shake reduction) control in which the movable unit 17 and the lens barrel 11 are moved by an amount and in a direction to reduce image shake on the imagen sensor 19a that is caused by variations in attitude of the imaging apparatus 10 to thereby reduce deterioration of photographed image quality can be performed. The anti-shake control is performed by the control circuit 71 controlling the passage of electric current through the first, second and third coils 54, 55 and 56 in accordance with information on the attitude of the imaging apparatus 10 that is obtained using the apparatus-attitude detecting sensor 72 (see FIG. 9) and positional information on the movable unit 17 and the lens barrel 11 that is obtained via the Hall sensors 57, 58 and 59. Specifically, in the present embodiment of the imaging apparatus 10, since the lens barrel 11 that supports the imaging optical system L and the image sensor unit 19 is supported to be rotatable in any rotational direction, it is possible to increase the maximum vibration angle that an image-stabilizing operation can accommodate even though the imaging apparatus 10 is compact in structure compared with a type of imaging apparatus in which an optical system is moved along a plane orthogonal to an optical axis corresponding to the optical axis O. Accordingly, the present embodiment of the imaging apparatus 10 can obtain a superior shake reduction (image-shake correction) effect in not only a camera designed for handheld photography but also an imaging apparatus used under conditions where large image shake tends to occur such as in a wearable camera mountable to a body part or a camera mounted onto a transportation machine such as a motor vehicle.

In addition, since the center of gravity of the movable portion including the lens barrel 11 and the movable unit 17 is substantially coincident with the spherical-swinging center Q, load fluctuations caused when the movable unit 17 and the lens barrel 11 are driven are small, and the operation of the movable unit 17 and the lens barrel 11 can be controlled with good responsiveness and high accuracy by the small and light-weight first, second and third actuators V1, V2 and V3.

As described above, in the imaging apparatus 10, the movable portion including the imaging device (the imaging optical system L and the image sensor unit 19) can be driven with a high degree of flexibility by applying driving forces in three different directions, specifically triaxial directions (two tilting directions and one rolling direction) by the first actuator V1, the second actuator V2 and the third actuator V3. The first actuator V1, the second actuator V2 and the third actuator V3 are arranged at predetermined intervals in the circumferential direction so that the projecting amounts of the first actuator V1, the second actuator V2 and the third actuator V3 in the radially outward direction from the optical axis O are equal, thus being housed with high space efficiency radially outside the optical path of the imaging apparatus 10.

More specifically, as shown in FIG. 42, the first magnet unit 27, the second magnet unit 28 and the third magnet unit 29, which are elements of the first actuator V1, the second actuator V2 and the third actuator V3 that are each constructed as a voice coil motor (VCM), are arranged so that the inner peripheral surfaces 27a, 28a and 29a lie on the imaginary cylindrical surface R2 centered on the optical axis O, and so that the outer peripheral surfaces 27b, 28b and 29b lie on the imaginary cylindrical surface R3 centered on the optical axis O (see FIGS. 5, 16, 17, 34 through 36, 40 and 41 in addition to FIG. 42). The first coil 54, the second coil 55 and the third coil 56 are arranged so that the inner peripheral surfaces 54d, 55d and 56d lie on the imaginary cylindrical surface R4 centered on the optical axis O, and so that the outer peripheral surfaces 54c, 55c and 56c lie on the imaginary cylindrical surface R6 centered on the optical axis O (see FIGS. 5, 34 through 36, 41 and 42). In addition, the three yokes 24, 25 and 26, which form magnetic circuits with the first magnet unit 27, the second magnet unit 28 and the third magnet unit 29, are arranged so that the base walls 24a, 25a and 26a lie on the imaginary cylindrical surface R1 centered on the optical axis O, and the three coil support plates 51, 52 and 53 that support the three coils 54, 55 and 56 are arranged to lie on the imaginary cylindrical surface R7 centered on the optical axis O (see FIGS. 5, 16, 17, 34 through 36, 40, 41 and 42). Additionally, the three Hall sensors 57, 58 and 59 lie on the imaginary cylindrical surface R5 centered on the optical axis O (see FIGS. 34, 40 and 42). All of these imaginary cylindrical surfaces: the cylindrical surfaces R1, R2, R3, R4, R5, R6 and R7 are each mutually different from each other in radius centered on the optical axis O and are positioned in that order from the radially inner side, from the position closest to the optical axis O. In the imaging apparatus 10 in the initial state thereof, in which an anti-shake driving operation is not performed, all the cylindrical surfaces R1, R2, R3, R4, R5, R6 and R7 are concentrically positioned about the optical axis O.

As shown in FIG. 42, the three magnetic units 27, 28 and 29 and the three coils 54, 55 and 56, which are main parts of the three actuators V1, V2 and V3 that are for generating driving forces, and the three Hall sensors 57, 58 and 59, which are for detecting the state of anti-shake driving operation, are all fitted into an annular space (annular installation space) between the imaginary cylindrical surface R2 and the imaginary cylindrical surface R6. Even further adding the three yokes 24, 25 and 26 to these elements merely enlarges the annular installation space up to the position of the imaginary cylindrical surface R1, which slightly bulges in the radially inner direction by the amount of the wall thickness of each base wall 24a, 25a and 26a, which does not exert a substantial influence on the space utilization for the arrangement of the three actuators V1, V2 and V3. Additionally, even further adding the three coil support plates 51, 52 and 53 merely enlarges the annular installation space up to the position of the imaginary cylindrical surface R7, which slightly bulges in the radially outer direction by the amount of the wall thickness of each coil support plate 51, 52 and 53, which does not exert a substantial influence on the space utilization for the arrangement of the three actuators V1, V2 and V3.

As described above, the configuration of the imaging apparatus 10 in which the components of the three actuators V1, V2 and V3 are shaped into circular arcs (cylinders) which are substantially concentrically arranged enables the application of strong driving force against the movable unit 17 while allowing the first, second and third magnetic units 27, 28 and 29 and the first, second and third coils 54, 55 and 56 to be fitted at positions outside of the optical path of the imaging optical system L in a space-saving manner. Unlike the present embodiment of the imaging apparatus 10, if one of the three actuators is configured to have a substantially different radial position from the other actuators or positioned in an extension of the optical path in the optical axis direction or if an excessive number of actuators (i.e., more than three actuators) are used to drive an optical system in the triaxial directions, the imaging apparatus would inevitably be substantially increased in size and that the drive mechanism for the movable unit 17 (the lens barrel 11) will be complicated in structure.

Even if three actuators are arranged to be aligned in the circumferential direction around an optical path like the three actuators V1, V2 and V3 of the above described embodiment of the imaging apparatus, in the case where the three actuators are of a type using flat (noncurved) magnets and coils, in order to obtain driving forces equivalent to the driving forces of the first, second and third actuators V1, V2 and V3 (in other words, in order to use magnets and coils equivalent in surface area and radial thickness to the magnet units 27, 28 and 29 and the coils 54, 55 and 56 of the above described embodiment of the imaging apparatus), each actuator would inevitably protrude radially outwards beyond the cylindrical surface R7 (shown in FIG. 42) or radially inwards beyond the cylindrical surface R1 (shown in FIG. 42) to thereby deteriorate the space efficiency. On the other hand, to fit the above-mentioned type of actuators (using flat (non-curved) magnets and coils) into an installation space equivalent to that of the present embodiment of the imaging apparatus 10, magnets and coils smaller in surface area and radial thickness compared to those of the magnet units 27, 28 and 29 and the coils 54, 55 and 56 are required to be used, which imposes limitations on the driving forces. Accordingly, if the three actuators are of a type using flat (non-curved) magnets and coils, either the space efficiency or the driving specifications of the actuators is required to be sacrificed. Whereas, according to the configuration of the present embodiment of the imaging apparatus, the first actuator V1, the second actuator V2 and the third actuator V3, each of which can generate a large driving force, can be achieved while saving space in the radial direction.

In addition, the formation of the magnet units 27, 28 and 29 and the coils 54, 55 and 56 into circular arcs (cylinders), which are substantially concentrically arranged, reduces fluctuations of the gaps (radial distances) between the first magnet unit 27 (the outer peripheral surface 27b) and the first coil 54 (the inner peripheral surface 54d), between the second magnet unit 28 (the outer peripheral surface 28b) and the second coil 55 (the inner peripheral surface 55d), and between the third magnet unit 29 (the outer peripheral surface 29b) and the third coil 56 (the inner peripheral surface 56d) which are caused when anti-shake driving operation is performed. Since the mutually facing surfaces of each magnet unit 27, 28 and 29 and the associated coil 54, 55 or 56 (i.e., each of the outer peripheral surfaces 27b, 28b and 29b and the associated inner peripheral surface 54d, 55d or 56d) are portions of cylindrical surfaces centered on the optical axis O, the gap between each of the outer peripheral surfaces 27b, 28b and 29b and the associated inner peripheral surface 54d, 55d or 56d hardly fluctuates when the movable unit 17 and the lens barrel 11 are made to perform a rolling operation about the optical axis O by the third actuator V3. Less fluctuations of the aforementioned gaps between the first magnet unit 27 and the first coil 54, between the second magnet unit 28 and the second coil 55 and between the third magnet unit 29 and the third coil 56 curb undesired fluctuations of the driving forces of the first, second and third actuators V1, V2 and V3 that are generated upon a predetermined value of electric current being passed through each coil 54, 55 and 56, which makes it possible to increase the effective output of each actuator V1, V2 and V3 through the effective use of magnetic power. In other words, a required driving performance can be achieved with the use of actuators which are compact in structure, without the use of large-size high-output actuators to deal with large fluctuations of driving forces caused by variations of the aforementioned gaps.

The aforementioned formation of the magnet units 27, 28 and 29 into circular arcs (cylinders) which are substantially concentrically arranged also reduces fluctuations of the gaps (radial distances) between the first magnet unit 27 (the outer peripheral surface 27b) and the Hall sensor 57, between the second magnet unit 28 (the outer peripheral surface 28b) and the Hall sensor 58 and between the third magnet unit 29 (the outer peripheral surface 29b) and the Hall sensor 59 which are caused when anti-shake driving operation is performed. Less fluctuations of the aforementioned gaps between the first magnet unit 27 and the Hall sensor 57, between the second magnet unit 28 and the Hall sensor 58 and between the third magnet unit 29 and the Hall sensor 59 can minimize the influence on the detection sensitivity of each Hall sensor 57, 58 and 59, which makes it possible to reduce loads on control over anti-shake driving operation and improve the accuracy of anti-shake driving operation.

In the first actuator V1, the first magnet unit 27 is arranged so that the longitudinal direction (long-side direction) of each permanent magnet 27-1 and 27-2, which connects the pair of longitudinal end surfaces 27c, extends in the circumferential direction, and so that the short-side direction of each permanent magnet 27-1 and 27-2, which connects the pair of side surfaces 27d and 27e, extends in the optical axis direction. Similarly, in the second actuator V2, the second magnet unit 28 is arranged so that the longitudinal direction (long-side direction) of each permanent magnet 28-1 and 28-2, which connects the pair of longitudinal end surfaces 28c, extends in the circumferential direction, and so that the short-side direction of each permanent magnet 28-1 and 28-2, which connects the pair of side surfaces 28d and 28e, extends in the optical axis direction. Additionally, the first coil 54 and the second coil 55 are arranged so that each long-side portion 54a and each long-side portion 55a extend in the circumferential direction and so that each short-side portion 54b and each short-side portion 55b extend in the optical axis direction. These arrangements enable the first actuator V1 and the second actuator V2 to generate the driving forces F11, F12, F21 and F22, which are used to perform the tilting operation, with efficiency.

In contrast, in the third actuator V3, the third magnet unit 29 is arranged so that the longitudinal direction (long-side direction) of each permanent magnet 29-1 and 29-2, which connects the pair of longitudinal end surfaces 29c, extends in the optical axis direction and so that the short-side direction of each permanent magnet 29-1 and 29-2, which connects the pair of side surfaces 29d and 29e, extends in the circumferential direction. The third coil 56 is arranged so that the pair of axially-extending portions 56a extend in the optical axis direction and so that the pair of circumferentially-extending portions 56b extend in the circumferential direction. These arrangements enable the third actuator V3 to efficiently generate the driving forces F31 and F32, which are used to perform the rolling operation.

Accordingly, as shown in FIGS. 34 through 36 and 41, the third actuator V3 has a different configuration to that of the first actuator V1 and the second actuator V2 as viewed along the optical axis O and the center lines C1, C2 and C3. Specifically, the first coil 54 and the second coil 55 (the pair of long-side portions 54a and the pair of long-side portions 55a) are greater in length in the circumferential direction than the third coil 56 (the pair of circumferentially-extending portions 56b). Additionally, as shown in FIGS. 25, 27, 33 and 37 through 39, the third coil 56 (the pair of axially-extending portions 56a) is greater in length in the optical axis direction than the first coil 54 (the pair of short-side portions 54b) and the second coil 55 (the pair of short-side portions 55b).

However, the portions of the first actuator V1 other than the first coil 54, the portions of the second actuator V2 other than the second coil 55 and the portions of the third actuator V3 other than the third coil 56 are substantially identical in size and weight. As shown in FIGS. 5, 12 through 17, 34 through 36, 40 and 41, the distance between the pair of standing walls 24b of the yoke 24 in the circumferential direction, the distance between the pair of standing walls 25b of the yoke 25 in the circumferential direction and the distance between the pair of standing walls 26b of the yoke 26 in the circumferential direction are substantially identical, so that the space occupied by a combination of the first magnet unit 27 and the yoke 24 in the circumferential direction, the space occupied by a combination of the second magnet unit 28 and the yoke 25 in the circumferential direction, and the space occupied by a combination of the third magnet unit 29 (with the magnet support projection 23b sandwiched between the permanent magnets 29-1 and 29-2) and the yoke 26 in the circumferential direction are substantially identical. Additionally, as shown in FIGS. 18 through 21, 23, 24 and 37 through 39, the front end of the first magnetic unit 27 (with the magnet support projection 21b sandwiched between the permanent magnets 27-1 and 27-2), the front end of the second magnetic unit 28 (with the magnet support projection 22b sandwiched between the permanent magnets 28-1 and 28-2), and the front end of the third magnet unit 29 lie at substantially at the same position as the front end of the barrel holder 12 with respect to the optical axis direction. Furthermore, the rear end of the first magnetic unit 27 (with the magnet support projection 21b sandwiched between the permanent magnets 27-1 and 27-2), the rear end of the second magnetic unit 28 (with the magnet support projection 22b sandwiched between the permanent magnets 28-1 and 28-2), and the rear end of the third magnet unit 29 lie at substantially at the same position as the rear end of the barrel holder 12 with respect to the optical axis direction. Accordingly, the spaces occupied by the first magnet unit 27, the second magnet unit 28 and the third magnet unit 29 with respect to the optical axis direction are substantially identical. Additionally, the three magnet units 27, 28 and 29 and the three yokes 24, 25 and 26 that support the three magnet units 27, 28 and 29 are arranged at substantially equi-angular intervals (intervals of 120 degrees) in the circumferential direction. Therefore, the three magnet units 27, 28 and 29 that include the three yokes 24, 25 and 26 are substantially equally balanced in weight with respect to the spherical-swinging center Q. Such a configuration and arrangement of the moving parts (the three magnet units 27, 28 and 29 and the three yokes 24, 25 and 26) of the three actuators V1, V2 and V3 that are balanced in weight makes it possible to minimize load fluctuations caused when an anti-shake driving operation is performed. As a result, the loads on the actuators V1, V2 and V3 are lightened (reduced), and the actuators V1, V2 and V3 are also superior in controllability.

The first actuator V1, the second actuator V2 and the third actuator V3 are arranged so that the center lines C1, C2 and C3 (see FIGS. 35 and 40) are positioned at substantially equi-angular intervals (angular intervals of 120 degrees) in the circumferential direction, and the spaces between the first actuator V1, the second actuator V2 and the third actuator V3 in the circumferential direction are utilized as the installation spaces for the three support seats 40A, 40B and 40C, the three swing guide surfaces 20A, 20B and 20C, the three fixed-position balls 61 and the three biasing balls 62 (all of which are supporters which cooperatively movably-support the movable unit 17 via the stationary unit 18). As shown in FIGS. 5, 34 through 36, 41 and 42, the imaging apparatus 10 is provided (at positions between the three actuators V1, V2 and V3 in the circumferential direction) with three sector-shaped spaces, each of which progressively increases the circumferential width thereof in the radial direction from the radially inner side toward the radially outer side, and the three support seats 40A, 40B and 40C are wedge-shaped (trapezoidal in shape) and respectively accommodated in the three sector-shaped spaces at predetermined intervals in the circumferential direction (see FIGS. 5 and 34). Additionally, the three support seats 40A, 40B and 40C support the movable unit 17 (the barrel holder 12) at substantially equi-angular intervals (intervals of 120 degrees) in the circumferential direction which correspond to the intervals of the three actuators V1, V2 and V3 in the circumferential direction, which ensures the stability of support of the movable unit 17 (the barrel holder 12). These factors, including the aforementioned supporters that movably support the movable unit 17 in addition to the three actuators V1, V2 and V3, achieve the structure of the imaging apparatus 10 that is superior in space efficiency, support accuracy and weight balance.

The anti-shake system of the imaging apparatus 10 is a so-called moving-magnet type, in which the first magnet unit 27, the second magnet unit 28 and the third magnet unit 29 and the yokes 24, 25 and 26 are supported by a movable member (the barrel holder 12) which moves during anti-shake driving operation while the first coil 54, the second coil 55 and the third coil 56 are supported by a stationary member (the coil holder 13) which does not move during anti-shake driving operation. Therefore, the actuators V1, V2 and V3 are configured so that the first magnet unit 27, the second magnet unit 28 and the third magnet unit 29, which move with the barrel holder 12, are positioned on the radially inner side, at which the barrel holder 12 is positioned, and so that the first coil 54, the second coil 55 and the third coil 56 are positioned on the radially outer side, at which the coil holder 13 that surrounds the barrel holder 12 is positioned. Since the first coil 54, the second coil 55 and the third coil 56 are greater in size than the first magnet unit 27, the second magnet unit 28 and the third magnet unit 29 (the first coil 54 and the second coil 55 are particularly great in length in the circumferential direction) as shown in FIGS. 32 through 42, the arrangement of the first coil 54, the second coil 55 and the third coil 56 on the radially outer side, on which a wider space can be secured than the radially inner side, is superior also in space utilization.

Although the present invention has been described based on the above illustrated embodiment, the present invention is not limited solely thereto; various modifications to the above illustrated embodiment are possible without departing from the scope of the invention. As described above, forming each of the magnetic units 27, 28 and 29 and each of the coils 54, 55 and 56 of the actuators V1, V2 and V3 to have a circular-arc shape centered on the optical axis O is optimum in various respects, such as space efficiency, drive efficiency and drive accuracy in the case where the magnetic units 27, 28 and 29 and the coils 54, 55 and 56 of the actuators V1, V2 and V3 are all housed in a cylindrical chassis; however, the shape of each magnet of each magnet unit and each coil can be modified. For instance, in the case where there is enough space on the radially outer side in the illustrated embodiment of the imaging apparatus 10, flat (non-curved) coils can be used instead of curved coils. In this modified structure, by satisfying the requirement that part of each of the three actuators (used to perform a tilting operation and a rolling operation) lie on an imaginary cylindrical surface centered on the optical axis, the triaxial drive type anti-shake system incorporated in the imaging apparatus 10 can also achieve miniaturization and improve the driving performance compared with existing triaxial drive type anti-shake systems.

Although the above-described arrangement of the three actuators V1, V2 and V3 at the same position with respect to the optical axis direction makes it possible to save space in the optical axis direction and obtain an excellent effect in weight balance in the optical axis direction, the present invention is also applicable to the case where the three actuators are somewhat mutually different in position in the optical axis direction.

In terms of securement of installation space for the aforementioned supporters that movably support the movable unit 17 and the achievement of proper weight balance in the circumferential direction, it is desirable that the three actuators V1, V2 and V3 be arranged at substantially equi-angular intervals in the circumferential direction, as in the above illustrated embodiment. However, it is possible to achieve an anti-shake system which applies driving forces in triaxial directions while achieving effects according to the present invention providing that the center (the center line C3) of the third actuator V3 (used to perform a rolling operation) with respect to the circumferential direction is positioned within an angular range of 60 through 180 degrees about the optical axis O with respect to each of the centers (the center lines C1 and C2) of the first actuator V1 and the second actuator V2 (used to perform a tilting operation).

Although the pair of permanent magnets 27-1 and 27-2, the pair of permanent magnets 28-1 and 28-2, and the pair of permanent magnets 29-1 and 29-2 constitute the first magnet unit 27, the second magnet unit 28 and the third magnet 29, respectively, in the above illustrated embodiment of the imaging apparatus, it is also possible for the first actuator V1, the second actuator V2 and the third actuator V3 to be each configured of a single magnet and a single coil.

Figure 33:
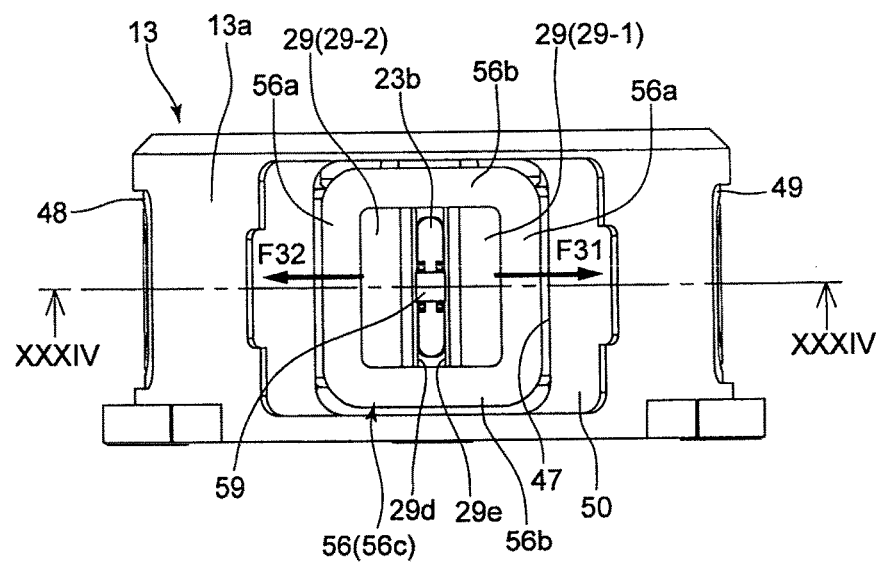
FIG. 33 is a view similar to that of FIG. 7 from which the lens barrel, the image sensor unit and coil support plates are removed for clarity of illustration.
Figure 37:
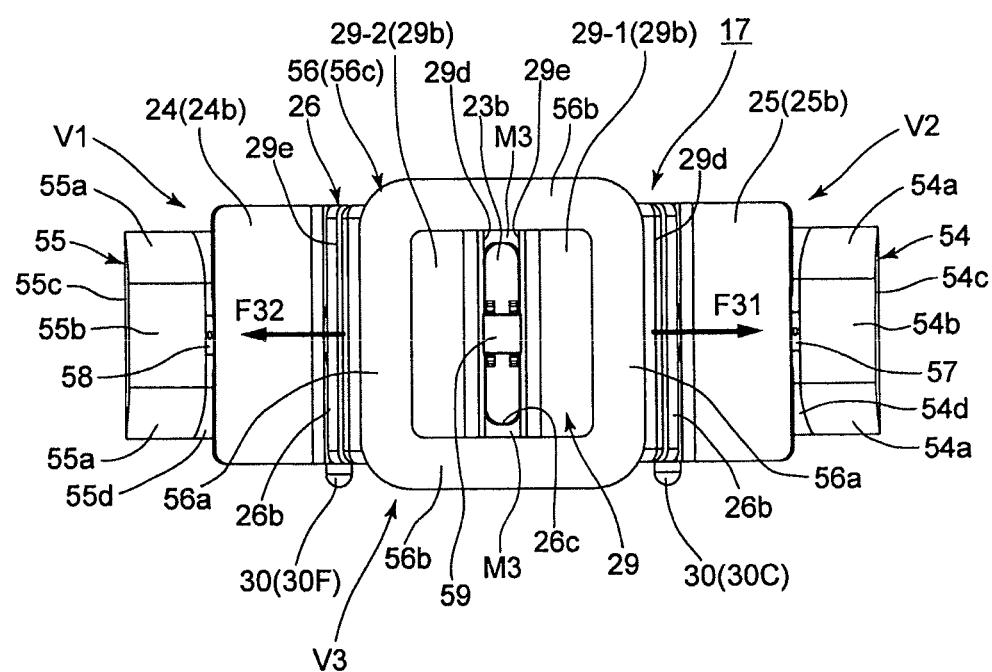
FIG. 37 is a plan view taken in the direction of the arrow XXXVII shown in FIG. 35.
Figure 38:
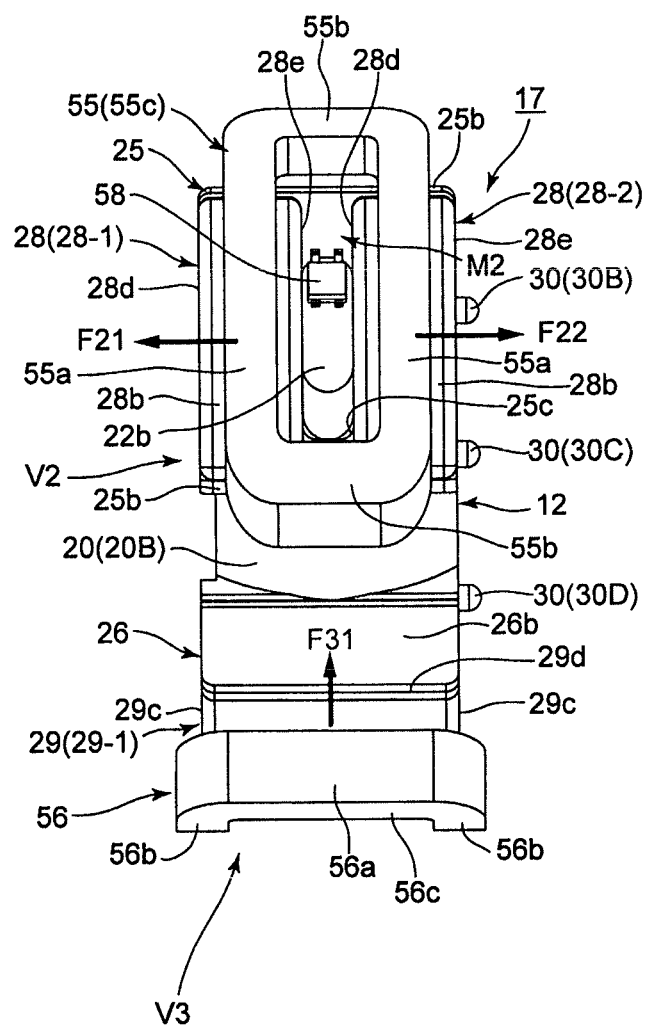
FIG. 38 is a plan view taken in the direction of the arrow XXXVIII shown in FIG. 35.
Figure 39:
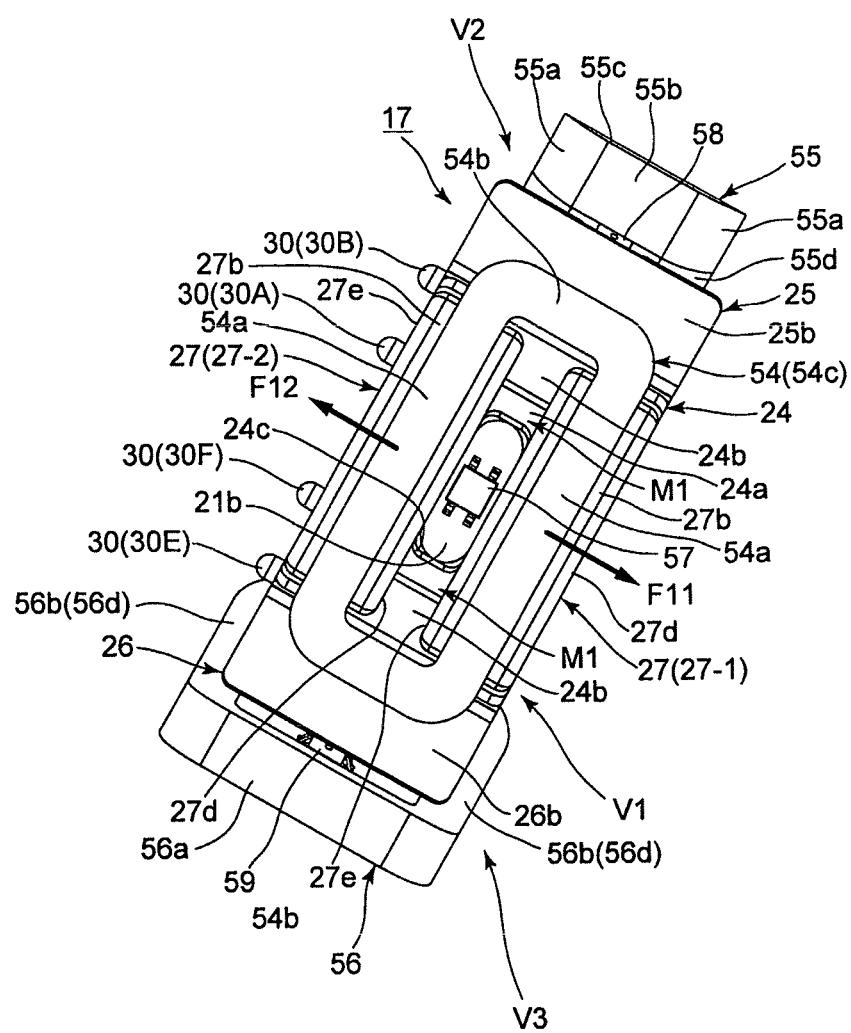
FIG. 39 is a plan view taken in the direction of the arrow XXXIX shown in FIG. 35.

In the illustrated embodiment, the axially-extending portions 56a and the circumferentially-extending portions 56b of the third coil 56 have substantially the same length with respect to a plan view as shown in FIGS. 33 and 37. However, unlike the illustrated embodiment, it is possible for the present invention to be applied to a configuration in which the axially-extending portions 56a are longer than the circumferentially-extending portions 56b, or to a configuration in which the circumferentially-extending portions 56b are longer than the axially-extending portions 56a.

As discussed above, the above illustrated embodiment of the imaging apparatus incorporates a moving-magnet type of anti-shake system according to the present invention, in which magnets and yokes are supported on a movable member (the barrel holder 12) which moves during anti-shake driving operation while coils are supported on a stationary member (the coil holder 13) which does not move during anti-shake driving operation. Since the coils 54, 55 and 56 and the Hall sensors 57, 58 and 59, all of which are required to be electrically connected to a controller via a flexible wiring board or the like, are immovable in the moving-magnet type of anti-shake system, this type of anti-shake system has the advantage of the load caused by an electrical connector such as a flexible wiring board not imposing on the movement of a movable member such as the movable member 12. However, the present invention is also applicable to a moving-coil type of anti-shake system. In the case of a modified embodiment of the imaging apparatus 10 which incorporates a moving-coil type of anti-shake system according to the present invention, the anti-shake system would need to be configured in a manner such that the magnet units 27, 28 and 29 which are supported by the coil holder 13 are positioned on the radially outer side to face the coils 54, 55 and 56 which are supported by the barrel holder 12, and such that the yokes 24, 25 and 26 are supported by the coil holder 13 with each pair of standing walls 24b, 25b and 26b being projected radially inwards. In this case, the Hall sensors 57, 58 and 59 would be supported by the barrel holder 12.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An imaging apparatus comprising:
    a movable member configured to support at least a part of an imaging device, for obtaining object images;
    a stationary member configured to support said movable member in a manner to allow said movable member to spherically swing about a predetermined point on an optical axis of an optical system of said imaging device;
    a first actuator and a second actuator which apply two driving forces to said movable member in different tilting directions to vary an inclination of said optical axis; and
    a third actuator which applies a driving force to said movable member in a rotational direction about said optical axis,
    wherein said first actuator, said second actuator and said third actuator are provided as three separate actuators installed at intervals in a circumferential direction about said optical axis, in an initial state in which said movable member is positioned at an initial position in said spherical-swinging operation with respect to said stationary member, and
    wherein part of each of said first actuator, said second actuator and said third actuator lies on a cylindrical surface centered on said optical axis in said initial state.

2. The imaging apparatus according to claim 1, wherein, in said initial state, a center of said third actuator in said circumferential direction is positioned within an angular range of 60 through 180 degrees about said optical axis with respect to each center of said first actuator and said second actuator in said circumferential direction.

3. The imaging apparatus according to claim 1, wherein said first actuator comprises a first magnet and a first coil which are aligned and face each other in a first radial direction from said optical axis in said initial state,
wherein said second actuator comprises a second magnet and a second coil which are aligned and face each other in a second radial direction from said optical axis in said initial state,
wherein said third actuator comprises a third magnet and a third coil which are aligned and face each other in a third radial direction from said optical axis in said initial state,
wherein said first magnet, said second magnet and said third magnet are supported by one of said movable member and said stationary member,
wherein said first coil, said second coil and said third coil are supported by the other of said movable member and said stationary member, and
wherein said first, second and third actuators are provided in at least one of the following arrangements (1) and (2):
(1) each of said first, second and third magnets is formed into a circular-arc shape which is centered on said optical axis in said initial state, and
(2) each of said first, second and third coils is formed into a circular-arc shape which is centered on said optical axis in said initial state.

4. The imaging apparatus according to claim 3, wherein said first magnet, said second magnet and said third magnet comprise respective coil-facing surfaces which face said first coil, said second coil and said third coil in said first radial direction, said second radial direction and said third radial direction, respectively,
wherein said coil-facing surfaces of said first magnet, said second magnet and said third magnet are portions of a first cylindrical surface, centered on said optical axis in said initial state,
wherein said first coil, said second coil and said third coil comprise respective magnet-facing surfaces which face said first magnet, said second magnet and said third magnet in said first radial direction, said second radial direction and said third radial direction, respectively, and
wherein said magnet-facing surfaces of said first coil, said second coil and said third coil are portions of a second cylindrical surface, centered on said optical axis in said initial state and different in radius from said first cylindrical surface.

5. The imaging apparatus according to claim 4, wherein said first magnet, said second magnet and said third magnet comprise respective non-facing surfaces which are positioned on an opposite side of said first magnet, said second magnet and said third magnet from said three coil-facing surfaces in said first radial direction, said second radial direction and said third radial direction, respectively, and
wherein said non-facing surfaces of said first magnet, said second magnet and said third magnet are portions of a third cylindrical surface, centered on said optical axis in said initial state and different in radius from each of said first cylindrical surface and said second cylindrical surface.

6. The imaging apparatus according to claim 5, further comprising a first yoke, a second yoke and a third yoke which are mounted to said first magnet, said second magnet and said third magnet, respectively,
wherein said first yoke comprises:
a support portion which supports said non-facing surface of said first magnet; and
a projecting portion which projects from said support portion of said first yoke in a direction to approach said magnet-facing surface of said first coil,
wherein said second yoke comprises:
a support portion which supports said non-facing surface of said second magnet; and
a projecting portion which projects from said support portion of said second yoke in a direction to approach said magnet-facing surface of said second coil,
wherein said third yoke comprises:
a support portion which supports said non-facing surface of said third magnet; and
a projecting portion which projects from said support portion of said third yoke in a direction to approach said magnet-facing surface of said third coil, and
wherein said support portions of said first yoke, said second yoke and said third yoke are curved and lie on a fourth cylindrical surface which is centered on said optical axis in said initial state.

7. The imaging apparatus according to claim 6, wherein said projecting portion of said first yoke includes two projecting portions which project from respective opposite ends of said support portion of said first yoke, with respect to said circumferential direction, and hold said first magnet therebetween,
wherein said projecting portion of said second yoke includes two projecting portions which project from opposite ends of said support portion of said second yoke, with respect said circumferential direction, and hold said second magnet therebetween, and
wherein said projecting portion of said third yoke includes two projecting portions which project from opposite ends of said support portion of said third yoke, with respect to said circumferential direction, and hold said third magnet therebetween.

8. The imaging apparatus according to claim 4, wherein said first coil, said second coil and said third coil comprise respective non-facing surfaces which are positioned on an opposite side of said first coil, said second coil and said third coil from said three magnet-facing surfaces in said first radial direction, said second radial direction and said third radial direction, respectively, and
wherein said non-facing surfaces of said first coil, said second coil and said third coil are portions of a fifth cylindrical surface which is centered on said optical axis in said initial state and different in radius from each of said first cylindrical surface and said second cylindrical surface.

9. The imaging apparatus according to claim 3, wherein said first magnet is shaped so that a long-side direction and a short-side direction thereof substantially align with said circumferential direction and said optical axis direction, respectively, and
wherein said second magnet is shaped so that a long-side direction and a short-side direction thereof substantially align with said circumferential direction and said optical axis direction, respectively.

10. The imaging apparatus according to claim 3, wherein one of said movable member and said stationary member comprises a first sandwiched portion, a second sandwiched portion and a third sandwiched portion,
wherein said first magnet includes two separate magnets which are parallel-positioned side by side in said optical axis direction with said first sandwiched portion sandwiched therebetween, magnetic poles of said first magnet oriented radially along said first radial direction, wherein said second magnet includes two separate magnets which are parallel-positioned side by side in said optical axis direction with said second sandwiched portion sandwiched therebetween, magnetic poles of said second magnet oriented radially along said second radial direction, and wherein said third magnet includes two separate magnets which are parallel-positioned side by side in said circumferential direction with said third sandwiched portion sandwiched therebetween, magnetic poles of said third magnet oriented radially along said third radial direction.

11. The imaging apparatus according to claim 10, wherein said first magnet with said first sandwiched portion sandwiched between said two separate magnets of said first magnet, said second magnet with said second sandwiched portion sandwiched between said two separate magnets of said second magnet, and said third magnet with said third sandwiched portion sandwiched between said two separate magnets of said third magnet, are substantially identical in size in said circumferential direction and said optical axis direction.

12. The imaging apparatus according to claim 10, wherein the two separate magnets, of each of said first, second and third magnets, are arranged so that the north and south poles of one of the two separate magnets are oriented in opposite radial directions relative to the north and south poles of the other of the two separate magnets.

13. The imaging apparatus according to claim 10, wherein said first sandwiched portion is flat, elongated in said circumferential direction, and sandwiched between said two separate magnets of said first magnet with respect to said optical axis direction, wherein said second sandwiched portion is flat, elongated in said circumferential direction, and sandwiched between said two separate magnets of said second magnet with respect to said optical axis direction, and wherein said third sandwiched portion is flat, elongated in said optical axis direction, and sandwiched between said two separate magnets of said third magnet with respect to said circumferential direction.

14. The imaging apparatus according to claim 3, wherein each of said first coil and said second coil includes an air-core coil comprising:

a pair of long-side portions which are substantially parallel to each other; and a pair of short-side portions which connect said pair of long-side portions, and wherein said pair of long-side portions of said first coil and said pair of long-side portions of said second coil are elongated in said circumferential direction.

15. The imaging apparatus according to claim 3, further comprising a first magnetic sensor, a second magnetic sensor and a third magnetic sensor configured to detect variations of magnetic fields of said first magnet, said second magnet and said third magnet, respectively, and are supported by said other of said movable member and said stationary member, which supports said first coil, said second coil and said third coil, and wherein said first magnetic sensor, said second magnetic sensor and said third magnetic sensor lie on a cylindrical surface which is centered on said optical axis in said initial state.

16. The imaging apparatus according to claim 3, wherein each of said first coil, said second coil and said third coil includes an air-core coil comprising:

a pair of circumferentially-extending portions which extend in said circumferential direction;

a pair of axially-extending portions which extend in said optical axis direction and connect said pair of circumferentially-extending portions; and a hollow portion which is surrounded by said pair of circumferentially-extending portions and said pair of axially-extending portions, wherein said imaging apparatus further includes a first magnetic sensor, a second magnetic sensor and a third magnetic sensor configured to detect variations of magnetic fields of said first magnet, said second magnet and said third magnet, respectively, and are supported by said other of said movable member and said stationary member, which supports said first coil, said second coil and said third coil, wherein said first magnetic sensor, said second magnetic sensor and said third magnetic sensor are arranged inside said hollow portion of said first coil, said hollow portion of said second coil and said hollow portion of said third coil, respectively, and lie on a cylindrical surface which is centered on said optical axis in said initial state.

17. The imaging apparatus according to claim 16, wherein said pair of circumferentially-extending portions of said first coil are greater in length than said pair of axially-extending portions of said first coil, and wherein said pair of circumferentially-extending portions of said second coil are greater in length than said pair of axially-extending portions of said second coil.

18. The imaging apparatus according to claim 3, wherein said first magnet, said second magnet and said third magnet are supported by said movable member, wherein said first coil, said second coil and said third coil are supported by said stationary member, and wherein said first magnet, said second magnet and said third magnet are positioned closer to said optical axis than said first coil, said second coil and said third coil in said first radial direction, said second radial direction and said third radial direction, respectively.

19. The imaging apparatus according to claim 1, further comprising supporters which support said movable member in a manner to allow said movable member to spherically swing about said predetermined point, wherein said supporters are arranged in three circumferential spaces which are formed between said first actuator, said second actuator and said third actuator in said circumferential direction.

20. The imaging apparatus according to claim 1, said imaging device comprising an image sensor configured to receive light of an object image formed through said optical system, and wherein said movable member supports the entirety of said optical system and said image sensor.

21. An imaging apparatus comprising:

a movable member configured to support at least a part of an imaging device for obtaining object images;

a stationary member configured to support said movable member in a manner to allow said movable member to spherically swing about a predetermined point on an optical axis of an optical system of said imaging device;

a first actuator including a first magnet and a first coil which are aligned and face each other in a first radial direction from said optical axis in an initial state in which said movable member is positioned at an initial position of said spherical-swinging operation with respect to said stationary member, said first actuator configured to apply a driving force to said movable member in a first tilting direction to vary an inclination of said optical axis in said first tilting direction by a passage of electric current through said first coil;

a second actuator including a second magnet and a second coil which are aligned and face each other in a second radial direction from said optical axis in said initial state, said second actuator configured to apply a driving force to said movable member in a second tilting direction to vary said inclination of said optical axis in said second tilting direction by a passage of electric current through said second coil;

a third actuator including a third magnet and a third coil which are aligned and face each other in a third radial direction from said optical axis in said initial state, said third actuator configured to apply a driving force to said movable member in a rotational direction about said optical axis by a passage of electric current through said third coil, wherein part of each of said first magnet, said second magnet and said third magnet lies on a cylindrical surface centered on said optical axis in said initial state, wherein said first magnet, said second magnet and said third magnet are supported by one of said movable member and said stationary member at intervals in said circumferential direction about said optical axis in said initial state, wherein part of each of said first coil, said second coil and said third coil lies on another cylindrical surface which is different in diameter from said cylindrical surface and centered on said optical axis in said initial state, and wherein said first coil, said second coil and said third coil are supported by the other of said movable member and said stationary member at intervals in said circumferential direction about said optical axis in said initial state.

22. The imaging apparatus according to claim 21, wherein inner peripheral surfaces of said first magnet, said second magnet and said third magnet that face radially inwards in said first radial direction, said second radial direction and said third radial direction, respectively, define first curved surfaces centered on said optical axis in said initial state, wherein said outer peripheral surfaces of said first magnet, said second magnet and said third magnet that face radially outwards in said first radial direction, said second radial direction and said third radial direction, respectively, define second curved surfaces centered on said optical axis in said initial state, wherein said first curved surfaces and said second curved surfaces are concentrically arranged with respect to said optical axis in said initial state, wherein inner peripheral surfaces of said first coil, said second coil and said third coil that face radially inwards in said first radial direction, said second radial direction and said third radial direction, respectively, define third curved surfaces centered on said optical axis in said initial state, wherein said outer peripheral surfaces of said first coil, said second coil and said third coil that face radially outwards in said first radial direction, said second radial direction and said third radial direction, respectively, define fourth curved surfaces centered on said optical axis in said initial state, and wherein said third curved surfaces and said fourth curved surfaces are concentrically arranged with respect to said optical axis in said initial state.

* * * * *